(12) United States Patent
Henderson, Jr. et al.

(10) Patent No.: US 12,336,551 B2
(45) Date of Patent: Jun. 24, 2025

(54) PURIFIED PROTEIN COMPOSITION

(71) Applicant: Impossible Foods Inc., Redwood City, CA (US)

(72) Inventors: Carl Allen Henderson, Jr., Brisbane, CA (US); Ratnayake Mudiyanselage Dunilka Nishani Ratnayake, San Mateo, CA (US); Ian Guiles Ronningen, San Francisco, CA (US); Laila Dafik, Belmont, CA (US)

(73) Assignee: Impossible Foods Inc., Redwood City, CA (US)

( * ) Notice: Subject to any disclaimer, the term of this patent is extended or adjusted under 35 U.S.C. 154(b) by 0 days.

(21) Appl. No.: 18/456,939

(22) Filed: Aug. 28, 2023

(65) Prior Publication Data

US 2024/0016182 A1 Jan. 18, 2024

Related U.S. Application Data

(60) Continuation of application No. 17/350,508, filed on Jun. 17, 2021, now Pat. No. 11,771,111, which is a division of application No. 16/138,876, filed on Sep. 21, 2018, now Pat. No. 11,051,532.

(60) Provisional application No. 62/670,478, filed on May 11, 2018, provisional application No. 62/562,298, filed on Sep. 22, 2017.

(51) Int. Cl.
*A23J 3/20* (2006.01)
*A23J 1/00* (2006.01)
*B01D 61/14* (2006.01)

(52) U.S. Cl.
CPC .............. *A23J 3/20* (2013.01); *A23J 1/008* (2013.01); *B01D 61/145* (2013.01); *B01D 61/147* (2013.01)

(58) Field of Classification Search
CPC .......... A23J 3/20; A23J 1/008; B01D 61/145; B01D 61/147
See application file for complete search history.

(56) References Cited

U.S. PATENT DOCUMENTS

| | | | |
|---|---|---|---|
| 3,043,826 A | 7/1962 | Beaber et al. | |
| 3,821,080 A | 6/1974 | Kalina et al. | |
| 3,959,246 A | 5/1976 | Bickoff et al. | |
| 4,006,078 A | 2/1977 | Bickoff et al. | |
| 4,334,024 A | 6/1982 | Johal | |
| 4,340,676 A | 7/1982 | Bourque | |

(Continued)

FOREIGN PATENT DOCUMENTS

| | | |
|---|---|---|
| CN | 101617736 B | 12/2011 |
| CN | 102550795 A | 7/2012 |

(Continued)

OTHER PUBLICATIONS

Anonymous, "Cytochrome c from equine heart", Sigma Product Information, Aug. 28, 2008, retrieved on May 17, 2021, retrieved from URL :https://www.sigmaaldri ch.com/content/dam/sigma-aldrich/docs/Sigma/Data sheet/3/c2867dat.pdf, 1 page.

(Continued)

*Primary Examiner* — Anthony J Weier
(74) *Attorney, Agent, or Firm* — Fish & Richardson P.C.

(57) ABSTRACT

Described herein are methods for purifying protein, and more particularly to methods for purifying protein that minimize the development of undesirable odors and flavors in the purified protein and increase protein yield.

20 Claims, 8 Drawing Sheets

Specification includes a Sequence Listing.

(56) References Cited

U.S. PATENT DOCUMENTS

| | | |
|---|---|---|
| 4,427,580 A | 1/1984 | Kinsella et al. |
| 4,588,691 A | 5/1986 | Johal |
| 4,683,294 A | 1/1987 | Van Wijnendaele et al. |
| 5,151,358 A | 9/1992 | Heinsohn |
| 5,328,841 A | 7/1994 | Lorch et al. |
| 5,407,810 A | 4/1995 | Builder et al. |
| 5,760,189 A | 6/1998 | Vicik et al. |
| 6,132,795 A | 10/2000 | Holbrook et al. |
| 6,174,704 B1 | 1/2001 | Chu et al. |
| 7,387,884 B2 | 6/2008 | Suzuki et al. |
| 9,011,949 B2 | 4/2015 | Brown et al. |
| 9,593,143 B2 | 3/2017 | Colaco et al. |
| 9,700,067 B2 | 7/2017 | Fraser et al. |
| 9,765,112 B2 | 9/2017 | Oliver et al. |
| 10,039,306 B2 | 8/2018 | Vrljic et al. |
| 10,087,434 B2 | 10/2018 | Kale et al. |
| 10,093,913 B2 | 10/2018 | Kale et al. |
| 10,287,568 B2 | 5/2019 | Kale et al. |
| 11,051,532 B2 | 7/2021 | Henderson, Jr. et al. |
| 11,771,111 B2 | 10/2023 | Henderson, Jr. et al. |
| 12,011,016 B2 | 6/2024 | Henderson, Jr. et al. |
| 2004/0101947 A1 | 5/2004 | Engel et al. |
| 2004/0151817 A1 | 8/2004 | Fukuda et al. |
| 2004/0166026 A1 | 8/2004 | Bratcher et al. |
| 2004/0171813 A1 | 9/2004 | Garger et al. |
| 2006/0025579 A1 | 2/2006 | Riedl et al. |
| 2008/0182002 A1 | 7/2008 | Staerk et al. |
| 2008/0187988 A1 | 8/2008 | Warmington et al. |
| 2010/0304126 A1 | 12/2010 | Wu et al. |
| 2012/0053328 A1 | 3/2012 | Yan et al. |
| 2012/0164234 A1 | 6/2012 | Kwiatkowski et al. |
| 2012/0252065 A1 | 10/2012 | Rozenszain et al. |
| 2012/0292241 A1 | 11/2012 | Bertanza et al. |
| 2015/0087532 A1 | 3/2015 | Brown et al. |
| 2015/0289541 A1 | 10/2015 | Brown et al. |
| 2015/0305361 A1 | 10/2015 | Holz-Schietinger et al. |
| 2015/0335043 A1 | 11/2015 | De Jong et al. |
| 2016/0340411 A1 | 11/2016 | Fraser et al. |
| 2016/0360770 A1 | 12/2016 | Sherlock et al. |
| 2017/0035076 A1 | 2/2017 | Geistlinger et al. |
| 2017/0172169 A1 | 6/2017 | Grzanich et al. |
| 2017/0188612 A1 | 7/2017 | Varadan et al. |
| 2017/0298337 A1 | 10/2017 | Kale et al. |
| 2017/0321203 A1 | 11/2017 | Kale et al. |
| 2017/0321204 A1 | 11/2017 | Kale et al. |
| 2018/0127764 A1 | 5/2018 | Shankar et al. |
| 2020/0361986 A1 | 11/2020 | Shultz et al. |
| 2020/0397021 A1 | 12/2020 | Henderson |
| 2021/0307358 A1 | 10/2021 | Henderson, Jr. et al. |
| 2022/0087286 A1 | 3/2022 | Henderson et al. |
| 2023/0210150 A1 | 7/2023 | Li et al. |
| 2024/0148019 A1 | 5/2024 | Li et al. |
| 2024/0292865 A1 | 9/2024 | Henderson, Jr. et al. |

FOREIGN PATENT DOCUMENTS

| | | |
|---|---|---|
| CN | 103732076 | 4/2014 |
| CN | 103766573 | 5/2014 |
| CN | 104862355 A | 8/2015 |
| CN | 105821104 A | 8/2016 |
| CN | 108409827 | 8/2018 |
| EP | 1197154 | 4/2002 |
| EP | 3670646 | 6/2020 |
| GB | 1556297 | 11/1979 |
| GB | 1597783 A | 9/1981 |
| WO | WO 2001/019969 | 3/2001 |
| WO | WO 2010/046920 | 4/2010 |
| WO | WO 2011/078671 | 6/2011 |
| WO | WO 2013/013949 | 1/2013 |
| WO | WO 2016/054375 | 4/2016 |
| WO | WO 2018/102656 | 6/2018 |
| WO | WO 2018/102721 | 6/2018 |
| WO | WO 2020/127957 | 6/2020 |

OTHER PUBLICATIONS

Bansal-Mutalik et al, "Reverse micellar solutions aided permeabilization of baker's yeast," Process Biochemistry, Jan. 1, 2006, 41(1): 133-141.

CAS No. 137397-56-9, "3-[18-(2-carboxylatoethyl)-7-ethenyl-12-[(4E,8E)-1-hydroxy-5,9,13-trimethyltetradeca-4,8,12-trienyl]-3,8,13,17-tetramethylporphyrin-21,23-diid-2-yl]propanoate;hydron;iron(2+)" retrieved on Sep. 1, 2022, retrieved from <https://pubchem.ncbi.nlm.nih.gov/compound/6438400>, 12 pages.

CAS No. 17375-41-6, "Ferrous sulfate monohydrate," PubChem, retrieved on Aug. 31, 2022, retrieved from URL<https://pubchem.ncbi.nlm.nih.gov/compound/62712>, 26 pages.

CAS No. 207399-12-0,"Ferric citrate hydrate," PubChem, retrieved on Aug. 31, 2022, retrieved from URL<https://pubchem.ncbi.nlm.nih.gov/compound/51341966>, 19 pages.

CAS No. 22830-45-1, "Iron(II) gluconate hydrate," PubChem, retrieved on Sep. 1, 2022, retrieved from <https://pubchem.ncbi.nlm.nih.gov/compound/443752>, 10 pages.

CAS No. 699014-53-4, "iron;(2R,3S,4R,5R)-2,3,4,5,6-pentahydroxyhexanoic acid;hydrate," PubChem, retrieved on Sep. 1, 2022, retrieved from <https://pubchem.ncbi.nlm.nih.gov/compound/22836455>, 10 pages.

CAS No. 7782-63-0, "Ferrous sulfate heptahydrate," PubChem, retrieved on Sep. 1, 2022, retrieved from <https://pubchem.ncbi.nlm.nih.gov/compound/62662>, 35 pages.

CAS No. 10028-22-5, "Ferric sulfate," PubChem, retrieved on Aug. 31, 2022, retrieved from URL<https://pubchem.ncbi.nlm.nih.gov/compound/24826>, 47 pages.

CAS No. 14875-96-8, "Protoheme," retrieved on Sep. 1, 2022, retrieved from <https://pubchem.ncbi.nlm.nih.gov/compound/26945>, 22 pages.

CAS No. 15664-29-6, "Pheophorbide a," retrieved on Sep. 12, 2022, retrieved from <https://pubchem.ncbi.nlm.nih.gov/compound/253193>, 26 pages.

CAS No. 17099-81-9, "Ferric-EDTA," retrieved on Sep. 12, 2022, retrieved from <https://pubchem.ncbi.nlm.nih.gov/compound/28283>, 21 pages.

CAS No. 18535-39-2, "Heme a3," retrieved on Sep. 12, 2022, retrieved from <https://pubchem.ncbi.nlm.nih.gov/compound/5489981>, 14 pages.

CAS No. 26598-29-8, "Heme C," retrieved on Sep. 30, 2022, retrieved from <https://chem.nlm.nih.gov/chemidplus/rn/26598-29-8>, 2 pages.

CAS No. 69138-22-3, "Chlorophyllin ferrous-sodium complex," retrieved on Sep. 30, 2022, retrieved from <https://www.guidechem.com/cas/69138-22-3.html>, 2 pages.

CAS Nos. 2338-05-8, "Iron citrate," retrieved on Sep. 12, 2022, retrieved from <https://pubchem.ncbi.nlm.nih.gov/compound/4989393>, 25 pages.

CAS Nos. 299-29-6, "Ferrous gluconate hydrate," retrieved on Sep. 12, 2022, retrieved from <https://pubchem.ncbi.nlm.nih.gov/compound/16212939>, 36 pages.

CAS Nos. 3522-50-7, "Ferric citrate," retrieved on Sep. 12, 2022, retrieved from <https://pubchem.ncbi.nlm.nih.gov/compound/61300>, 58 pages.

CAS Nos. 7720-78-7, "Ferrous sulfate," retrieved on Sep. 12, 2022, retrieved from <https://pubchem.nebi.nlm.nih.gov/compound/24393>, 64 pages.

Castro et al., Liquid-liquid equilibrium of water + PEG 8000 + magnesium sulfate or sodium sulfate aqueous two-phase systems at 35 oC: experimental determination and thermodynamic modeling, Braz. J. Chem. Eng., 2005, 22(3):463-470.

Degerli et al., "A novel concentration method for concentrating solutions of protein extracts based on dialysis techniques," Analytical Biochemistry, Oct. 2001, 297(2):192-194.

Extended European Search Report in European Patent Application No. 15846579.9, dated Feb. 5, 2018, 6 pages.

Ferreira et al., "β-Conglycinin (7S) and glycinin (11S) exert a hypocholesterolemic effect comparable to that of fenofibrate in rats fed a high-cholesterol diet," Journal of Functional Foods, 2(2010), pp. 275-283.

(56) References Cited

OTHER PUBLICATIONS

Gressent et al., "Characterization of a high-affinity binding site for the pea albumin 1b entomotoxin in the weevil Sitophilus," Eur J Biochem. Jun. 2003;270(11):2429-35.
Guo et al., "Mini-review: In vitro Metabolic Engineering for Biomanufacturing of High-value Products", Computational and Structural Biotechnology Journal, 2017, vol. 15, 161-167.
Hemeprotein [online] "Heme Protein Database," retrieved on Aug. 30, 2022, retrieved from URL< http://hemeprotein.info/heme.php>, 1 page.
International Preliminary Report on Patentability in International Appln. No. PCT/US2021/020356, dated Sep. 9, 2022, 15 pages.
International Preliminary Report on Patentability in International Application No. PCT/US2015/053492, dated Apr. 4, 2017, 7 pages.
International Search Report and Written Opinion in International Application No. PCT/US2015/053492, dated Feb. 5, 2016, 10 pages.
International Search Report and Written Opinion in International Appln. No. PCT/US2021/020356, dated Aug. 16, 2021, 23 pages.
International Search Report on Patentability in International Appln. No. PCT/US2020/050774, date Jun. 9, 2021, 27 pages.
Irwin et al., "Identification of Flavor-Active Volatiles in Soy Protein Isolate via Gas Chromatography Olfactometry," In Chemistry, Texture, and Flavor of Soy 2010, 389-400.
Kao et al. "Volatile compounds produced during deodorization of soybean oil and their flavor significance," Journal of the American Oil Chemists' Society, Dec. 1998, 75(12):1103-1107.
Lamsal et al., "Separation of Protein Fraction in Alfalfa Juice: Effects of Some Pre-Treatment Methods," Trans. ASAE 2003, 46(3):715-720.
Lei et al., "Compounds contributing to the odor of aqueous slurries of soy protein concentrate," Journal of food science, Nov. 2001, 66(9):1306-1310.
Ravi et al., "Rapid profiling of soybean aromatic compounds using electronic nose," Biosensors, May 24, 2019, 9(2): 13 pages.
Reedy et al., "Development of a heme protein structure-electrochemical function database," Nucleic acids research, Oct. 11, 2007, 36:D307-D113.
Rickert et al., "Effect of extraction pH and temperature on isoflavone and saponin partitioning and profile during soy protein isolate production," Journal of food science, Oct. 2004, 69(8):C623-C631.
Roland et al. "Flavor aspects of pulse ingredients," Cereal Chemistry, Jan. 2017, 94(1):58-65.
Shi et al., "Application of Adsorption Separation Resin in Pharmaceutical Industry," Chemical Industry Press, Sep. 2008, p. 76, 6 pages (with machine translation).
Solina et al., "Volatile aroma components of soy protein isolate and acid-hydrolysed vegetable protein," Food chemistry, May 1, 2005, 90(4):861-873.
Srinivas et al., "Extraction and purification of a plant peroxidase by aqueous two-phase extraction coupled with gel filtration," Process Biochemistry, Oct. 1999, 35(1/2):43-48.
Yamgata et al., "O-acetylserine and O-acetylhomoserine sulfhydrylase of yeast Further purification and characterization as a pyridoxal enzyme," The Journal of Biochemistry, Oct. 1, 1976, 80(4): 777-785.
Yang et al., "Antihypertensive properties of spinach leaf protein digests," J. Agric. Food Chem. 2004, 52:2223-2225.
International Preliminary Report on Patentability in International Application No. PCT/US2022/018395, dated Aug. 29, 2023, 9 pages.
International Search Report and Written Opinion in International Application No. PCT/US2022/018395, mailed on Jul. 6, 2022, 12 pages.
Schlemmer et al., "Phytate in foods and significance for humans: Food sources, intake, processing, bioavailability, protective role and analysis," Mol. Nutr. Food Res., Sep. 2009, 53(S2):S330-S375.
Cao, "Grain and Oil Deep Processing Technology," Northeast Forestry University Press, Jun. 2007, pp. 283-286 (with machine translation).
Zenoozian et al., "Composition and Functional Properties of Soy Protein Isolates," Poster, Presented at International Soybean Processing and Utilization Conference, Oct. 15-20, 2000, pp. 441-442.

PURIFIED PROTEIN COMPOSITION

CLAIM OF PRIORITY

This application is a continuation of U.S. patent application Ser. No. 17/350,508, filed on Jun. 17, 2021, now U.S. Pat. No. 11,771,111, which is a divisional of U.S. patent application Ser. No. 16/138,876, filed on Sep. 21, 2018, now U.S. Pat. No. 11,051,532, which claims priority under 35 USC § 119(e) to U.S. Provisional Patent Application Ser. No. 62/562,298, filed on Sep. 22, 2017 and U.S. Provisional Patent Application Ser. No. 62/670,478, filed on May 11, 2018, the entire contents of which are hereby incorporated by reference.

TECHNICAL FIELD

This invention relates to methods for purifying protein, and more particularly to methods for purifying protein that minimize the development of undesirable odors and flavors in the purified protein, enhance functionality and increase protein yield. This invention also relates to food products including purified protein.

SEQUENCE LISTING

This application contains a Sequence Listing that has been submitted electronically as an XML file named "38767-01190003_ST26_SL_XML." The XML file, created on Aug. 24, 2023, is 29,631 bytes in size. The material in the XML file is hereby incorporated by reference in its entirety.

BACKGROUND

The success of food products that mimic animal derived food products (e.g., cheese or meat) is largely dependent on generating functional protein that can be manipulated and has low-flavor so the source of the protein is not readily identifiable and does not provide any off-flavors to the food product. Common protein purification methods typically include steps with chemicals that are not food-safe and/or that result in denatured protein. It would be useful to have a method of protein purification that is food-safe and results in minimal undesirable odors and flavors in the purified protein.

SUMMARY

This document provides protein compositions, and it also provides methods for purifying protein from microbial cells including eukaryotes, fungi, prokaryotes, and Archaea cells, using at least a pH of about 8.5 throughout the process, which results in a protein composition. This document also provides food products that include these protein compositions. In some embodiments, the methods described herein are food-safe, inexpensive, and scalable, while minimizing the development of undesirable odors and flavors in the purified protein and increasing protein yield. In some embodiments of methods of purifying protein provided herein in which the pH is less than 8.5 (e.g., 8.0 or less) during the purification process, increased off-flavors and/or off-odors can be present in the resulting protein composition and process yields can be reduced compared otherwise corresponding methods of purifying protein in which the pH is greater than 8.5 (e.g., 9.0 or greater) during some or all of the purification process. In some embodiments, compositions described herein can be food-safe and inexpensive, with minimal undesirable odors and flavors. Total cellular protein, e.g., proteins that are isolated from throughout a cell or produced by it, including proteins from the cytoplasm, and nucleus and subcellular compartments (e.g., lysosomes, peroxisomes, mitochondria, endoplasmic reticulum, Golgi apparatus, periplasm, secretory vesicles, extracellular matrix, biofilm, chloroplast and nucleus) as applicable, can be purified using the methods described herein. In some embodiments, a protein composition as described herein can comprise total cellular protein, but the term "total" does not indicate that every cellular protein is present in the protein composition. In some embodiments, a protein composition as described herein can consist essentially of total cellular protein.

Furthermore, the protein in a protein composition can be functional. As described herein, functional proteins can have one or more of the following properties: non-denatured; capable of forming a gel upon heating (e.g., a suspension of about 25 to about 250 mg/mL (e.g., about 25 to about 50 mg/mL, about 25 to about 100 mg/mL, about 25 to about 150 mg/mL, about 25 to about 200 mg/mL, about 50 to about 250 mg/mL, about 100 to about 250 mg/mL, about 150 to about 250 mg/mL, or about 200 to about 250 mg/mL) at a pH of about 7.0) thermally transitions to a gel upon heating to about 65° C.); thermally denatures during incubation between about 50° C. and about 85° C., with greater than about 80% of the protein denaturing after about 20 minutes at about 85° C., as measured either by differential scanning calorimetry (DSC) or differential scanning fluorimetry (DSF); in a solution or suspension of purified protein at or above about 50 mg/mL (5% w/v), protein forms a freestanding gel (with, e.g., a 100 Pa storage modulus) when heated at or above about 85° C. for about 20 minutes; can denature and gel between about pH 5.5 and about pH 10.0; can denature and gel in solutions with ionic strength (I) below about 0.5M, when I is calculated based on the concentration of non-protein solutes; at a protein concentration of about 10 mg/mL, particle size distribution D10, D50 and D90 are less than about 0.1 μm, 1.0 μm and 5 μm, respectively; has enzymatic activity; has an emulsion activity index (EAI) of greater than or equal to about 50 m$^2$/g protein across a pH range of about 4.0 to about 8.0.

In some embodiments, a (w/v) suspension can refer to the amount of dry solids (in grams) per 100 mL of solution.

Non-limiting examples of functional proteins that can be present in a protein composition include proteins that have enzymatic activity such as, without limitation, cysteine synthase (Met17p, ED 2.5.1.47), cystathionine beta-synthase (Cys4p, EC 4.2.1.22), hexokinase, glucose oxidase, glutathione reductase, catalase, and lipase.

Enzymatic activity also can be described more generically and examples can include, for example amino acid catabolism (e.g., hydrogen sulfide ($H_2S$) present at less than about 0.1 ppm in the headspace when no L-cysteine (e.g., L-cysteine by itself, or provided in the form of a mixture of isomers) is added (e.g., to 5 mL of a 2% (w/v) suspension at pH 7.0), and $H_2S$ present at greater than or equal to about 0.2 ppm (e.g., greater than or equal to about 0.3 ppm) after (e.g., after about 24 hours at 25° C.) L-cysteine is added to 25 mM final concentration (e.g., to 5 mL of a 2% (w/v) suspension)), glucose catabolism (e.g., generation of pyruvate from glucose, generation of glucose-6-phosphate, generation of lactate, production of D-glucono-δ-lactone), lipid catabolism (e.g., lipid hydrolysis), reduction of glutathione disulfide, and decomposition of hydrogen peroxide For example, enzymatic activity can be illustrated using a single-enzyme reaction (e.g., generation of glucose-6-phosphate from glucose by hexokinase) or a multi-enzyme reaction, e.g., transformation of a starting material to a final product by more than one enzyme (e.g., generation of pyruvate from glucose by the enzymes of glycolysis or generation of glutathione from glutamate, cysteine and glycine by the cellular glutathione biosynthesis pathway).

The protein composition can have food activity. As described herein, proteins with food activity can have one or more of the following properties (defined on a per-gram basis): capable of forming a gel; capable of emulsifying oil and water (oil-in water, water-in-oil); capable of emulsifying air and water (air-in-water).

In the description and Figures, the following abbreviations are used: CS (cell suspension); RN (cell wash); LY (lysate, e.g., obtained by bead milling, homogenizer, high shear mixer or microfluidizer); CN (centrate, e.g., supernatant of centrifugal spin to remove solids); MF (microfiltration, e.g., using a pore size of 0.2. 0.3, or 0.45 μm in diameter); DF (diafiltration, e.g., using pH 9.3+/−0.3 water); UF (ultrafiltration, e.g., using a molecular weight cutoff of 5, 10, 30, or 50 kDa); PZ (pasteurization, e.g., at 65° C. for 60 seconds); SD (spray drying, e.g., with an inlet temperature of 180° C., an outlet temperature of 80° C. and a feed of 0.27 LPM).

The term "about" is used with respect to a particular value to account for experimental variation when measuring the value.

In one aspect, this document includes a method for purifying protein from a cell (e.g., a plurality of cells), the method including lysing an aqueous suspension of the plurality of cells to obtain a cell lysate; clarifying the cell lysate, optionally in the presence of one or more flocculants, to obtain a clarified lysate; filtering the clarified lysate to obtain a filtered lysate; concentrating the filtered lysate to obtain a protein composition; and optionally pasteurizing the protein composition of protein to obtain a pasteurized protein composition, wherein the lysing, clarifying, and filtering steps, independently, are performed at a pH between about 8.5 and about 12.0.

In some embodiments of a protein composition or a food product described herein, the protein composition or food product contains less than 10% by weight animal products. In some embodiments of a protein composition or a food product described herein, the protein composition or food product contains less than 5% by weight animal products. In some embodiments, a protein composition or food product described herein contains less than 1% by weight animal products. In some embodiments, a protein composition or food product described herein contains no animal products.

In some embodiments of a protein composition or a food product described herein, the protein composition or food product contains less than 10% by weight animal-derived products. In some embodiments of a protein composition or a food product described herein, the protein composition or food product contains less than 5% by weight animal-derived products. In some embodiments, a protein composition or a food product described herein contains less than 1% by weight animal-derived products. In some embodiments, a protein composition or food product described herein contains no animal-derived products.

In some embodiments of a protein composition or a food product described herein, the protein composition or food product contains less than 10% by weight animal meat. In some embodiments of a protein composition or a food product described herein, the protein composition or food product contains less than 5% by weight animal meat. In some embodiments, a protein composition or food product described herein contains less than 1% by weight animal meat. In some embodiments, a protein composition or food product described herein contains no animal meat.

In some embodiments of a protein composition or a food product described herein, the protein composition or food product is free of or is substantially free of lactose, E. coli, whey, casein, animal fat, soy proteins, nut proteins, ovalbumins, gelatin, dairy products, animal products, animal-derived products, agar, carrageenan, tofu, cholesterol, or two or more thereof.

As used herein, the term "animal products" refers to a material obtained from or produced by the body of an animal (e.g., a mammal, a bird, a fish, an amphibian, a reptile, an insect, a mollusk, a crustacean, a coral, an arachnid, a velvet worm, or a horseshoe crab). Examples include, without limitation, meat, fat, flesh, blood, milk, eggs, isinglass, rennet, fur, skin, hair, bone, fibers, cartilage, casein, gelatin, and honey. The term "no animal products" means that the composition does not contain any animal products.

As used herein, the term "animal-derived products" refers to a material or compound derived from the body of an animal (e.g., a mammal, a bird, a fish, an amphibian, a reptile, an insect, a mollusk, a crustacean, a coral, an arachnid, a velvet worm, or a horseshoe crab). Examples include, without limitation, a material or compound derived from animal meat, fat, flesh, blood, milk, eggs, isinglass, rennet, fur, skin, hair, bone, fibers, cartilage, casein, gelatin, and honey. Further examples of animal-derived products include materials isolated from the body of an animal, including without limitation, hormones, amino acids, vitamins, organic acids, proteins, collagen, dyes, fatty acids, oils, glycerol, sugars, keratin, and nucleic acids isolated from the body of an animal. The term "no animal-derived products" means that the composition does not contain any animal products.

As used herein, the term "animal meat" refers to a flesh of an animal (e.g., a mammal, a bird, a fish, an amphibian, a reptile, an insect, a mollusk, a crustacean, a coral, an arachnid, a velvet worm, or a horseshoe crab). Examples include without limitation, muscle and organs. The term "no animal meat" means that the composition does not contain any animal meat.

As used herein, the term "substantially free of" means less than 5.0% by weight, (e.g., less than 5.0% by weight, less than 4.0% by weight, less than 3.0% by weight, less than 2.5% by weight, less than 2.0% by weight, less than 1.5% by weight, less than 1.0% by weight, less than 0.5% by weight, less than 0.1% by weight or less than 0.01% by weight) of the referenced ingredient is present in a composition. For example, a dairy replica as disclosed herein in is substantially free of animal products when it contains less than 5.0% by weight (e.g., less than 4.0% by weight, less than 3.0% by weight, less than 2.5% by weight, less than 2.0% by weight, less than 1.5% by weight, less than 1.0% by weight, less than 0.5% by weight, less than 0.1% by weight, or less than 0.01% by weight) of animal products.

As used herein, the term "free of" means that none of the referenced ingredient is detectable in a composition. For example, a protein composition or food product disclosed herein in is free of animal products when it contains no detectable animal products.

As used herein a "bacteria-derived protein", "yeast-derived protein", "algae-derived protein", "fungus-derived protein", or "plant-derived protein" refers to the immediate production organism of the protein, and can mean any protein that is produced in a bacterium, a yeast, an algae, a fungus, or a plant, independently of whether the protein is natively expressed in the bacterium, yeast, algae, fungus, or plant, respectively.

The term "not natively expressed" can refer to a protein that is produced in an organism that does not produce said protein in nature. Non-limiting examples of a protein that is not natively expressed include an animal protein expressed in bacteria, a plant protein expressed in yeast, and an animal protein expressed in algae.

The term "pasteurized" can mean any process, treatment, or combination thereof, that is applied to food to reduce the most resistant microorganism(s) of public health significance to a level that is not likely to present a public health risk under normal conditions of distribution and storage.

The term "aromaome" can mean the totality of aromas associated by the ordinary human observer with a particular food, ingredient, or cooking process. Non-limiting examples of aromaomes are a poultry aromaome, a chicken aromaome, a beef aromaome, a pork aromaome, a seafood aromaome, a game meat aromaome, a cinnamon aromaome, a chocolate aromaome, a deep frying aromaome, and a grilling aromaome.

In one aspect, this disclosure includes a method for purifying protein from a plurality of cells, the method including lysing an aqueous suspension of the plurality of cells to obtain a cell lysate; clarifying the cell lysate, optionally in the presence of one or more flocculants, to obtain a clarified lysate; filtering the clarified lysate to obtain a protein composition; and optionally pasteurizing the protein composition, to obtain a pasteurized protein composition, wherein steps a), b), c), and d) independently, are performed at a pH between about 8.5 and about 12.0.

In another aspect, this disclosure includes a method for purifying protein from a plurality of cells, the method including lysing an aqueous suspension of the plurality of cells to obtain a cell lysate; filtering the cell lysate to obtain a protein composition; and optionally pasteurizing the protein composition to obtain a pasteurized protein composition, wherein steps a), b), and c) independently, are performed at a pH between about 8.5 and about 12.0.

These and other embodiments can optionally include any of the following. Filtering can include microfiltration, ultrafiltration, diafiltration, or a combination thereof. A clarifying step can be performed by centrifugation to less than about 20% dry solids. A plurality of cells can include microbial cells. A method can further include washing an aqueous suspension of a plurality of cells at a pH between about 8.5 and about 12.0 before step a). A protein composition can include at least about 35%, on a dry weight basis, of compounds larger than 5 kDa. At least about 50% of the protein in a protein composition can fall between about 10 kDa and about 200 kDa.

In an another aspect, this disclosure includes protein composition produced by a method comprising: lysing an aqueous suspension of a plurality of cells to obtain a cell lysate; filtering the cell lysate to obtain a protein composition; and optionally pasteurizing the protein composition to obtain a pasteurized protein composition, wherein steps a), b), and c) independently, are performed at a pH between about 8.5 and about 12.0.

This and other embodiments can optionally include any of the following. Filtering can include microfiltration, ultrafiltration, diafiltration, or a combination thereof. A process can further include washing an aqueous suspension of a plurality of cells at a pH between about 8.5 and about 12.0 before step a). At least about 50% of the protein in a protein composition can fall between about 10 kDa and about 200 kDa. A protein composition can have a buffering capacity of less than about 2.5 mmol NaOH per gram dry solids. Hydrogen sulfide ($H_2S$) can be detectable in an amount of less than about 0.1 ppm after about 24 hours at 25° C. when L-cysteine is not added to 5 mL of a 2% (w/v) suspension of a protein composition at pH 7.0. Hydrogen sulfide can be detectable an amount of at least about 0.2 ppm about 24 hours at 25° C. after 5 mL of a 2% (w/v) suspension of a protein composition is brought to about 25 mM final concentration of L-cysteine.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the description below. Other features, objects, and advantages of the invention will be apparent from the description and drawings, and from the claims. The word "comprising" in the claims may be replaced by "consisting essentially of" or with "consisting of," according to standard practice in patent law.

DETAILED DESCRIPTION

Figure 1:
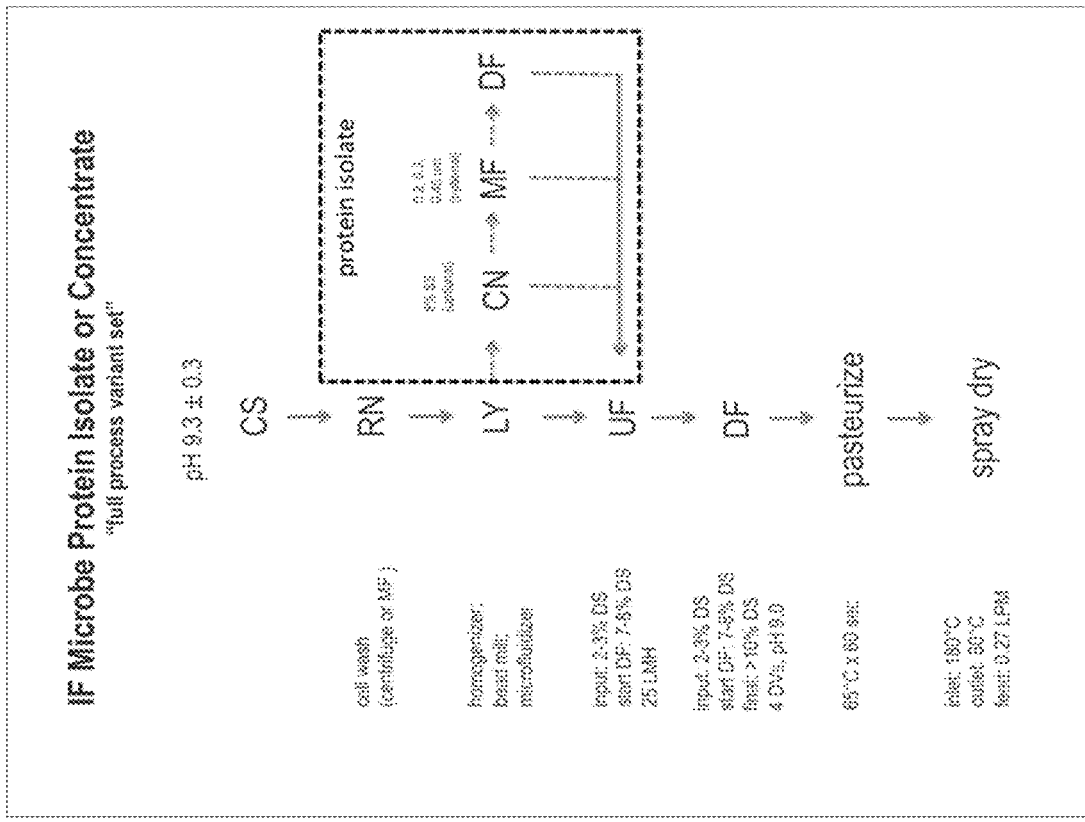
FIG. 1 is a schematic of process variants for isolation and concentration of protein.

Proteins in their undenatured state can contribute to the success of food replica products, such as meat and dairy replica products. Existing commercial protein extraction processes however, can result in denaturation of such proteins. Further, many proteins that might have functionality in food replica products have associated colors or aromas, which can detract from or inhibit their application.

In general, this document provides protein compositions as well as methods and materials for purifying total cellular protein from cells resulting in protein compositions that can be used, for example, in food replicas, e.g., meat and dairy replica products or substitutes.

Methods for Producing Protein Compositions

In some embodiments, a protein composition can be purified using any of the methods described herein). Suitable cells from which proteins can be extracted include, without limitation, cells from fungi, algae, prokaryotes, and Archea. In some embodiments, suitable cells may be naturally found in single-celled organisms (including yeasts) or in multicellular organisms (including Ascomycota and Basidiomycota). In some embodiments, a protein composition can be purified from one or more fungal species from, for example, the genera *Saccharomyces, Pichia, Candida, Hansenula, Torulopsis, Kluyveromyces, Yarrowia, Aspergillus, Trichoderma*, or *Fusarium*. For example, a protein composition can be purified from *Saccharomyces cerevisiae, Pichia pastoris, Candida boidinii, Hansenula polymorpha, Kluyveromyces lactis, Yarrowia lipolytica*, or *Fusarium venenatum* cells. In some embodiments, a protein composition can be purified from one or more archaeal or bacterial species from, for example, the genera *Bacillus, Escherichia, Lactobacillus, Corynebacterium, Pseudomonas*, or *Methanococcus*. For example, a protein composition can be purified from *E. coli, Bacillus subtilis, Lactobacillus lactis, Corynebacterium glutamicum, Pseudomonas fluorescens*, or *Methanococcus maripaludis*. In some embodiments, a protein composition can be purified from one or more algal species from, for example, the genera *Chlorella*, Cyanobacteria, Euglenid, or *Spirulina*. For example, a protein composition can be purified from *Chlorella prototheocoides, Arthrospira platensis, Euglena gracilis*, or *Nostoc flagelliforme*.

In some embodiments, one or more proteins in a protein composition described herein can have functional activity as a biocatalyst, as a food processing aid, an enzyme, as a flavor enhancer, a therapeutic, or a nutraceutical.

In some embodiments, a protein composition or a protein purified from a microbe can include one or more heterologous proteins (e.g., from a species different from the organism used to purify a protein or protein composition such as, for example, a protein from a eukaryote, an animal, a plant, an algae, a thermophile, a yeast, a bacteria, a protist or an archea). In some embodiments, the heterologous protein has functional activity as a biocatalyst, as a food processing aid, an enzyme, as a flavor enhancer, a therapeutic, a sweetener, a pharmaceutical, or a nutraceutical.

In some embodiments, an aqueous solution can include a buffer. The buffer can be any food-grade buffer (e.g., a buffer that includes sodium phosphate, potassium phosphate, calcium phosphate, sodium acetate, potassium acetate, sodium citrate, calcium citrate, sodium bicarbonate, sodium lactate, potassium lactate, sodium malate, potassium malate, sodium gluconate, and/or potassium gluconate) at a concentration of about 2 mM to about 200 mM (e.g., about 2 mM to about 10 mM, about 10 mM to about 20 mM, about 10 mM to about 30 mM, about 20 mM to about 30 mM, about 30 mM to about 40 mM, about 40 mM to about 50 mM, about 50 mM to about 100 mM, or about 100 mM to about 200 mM), and a pH of about 8.5 to about 12.0 (e.g., about 8.5 to about 9.0, about 9.0 to about 10.0, about 9.0 to about 11.0, about 10.0 to about 11.0, about 11.0 to about 12.0, about 9.5 to about 10.5, about 9.5 to about 11.5, about 10.5 to about 11.5, at 9.0, at 9.5, at 10.0, at 10.5, at 11.0, at 11.5, or at 12.0).

In some embodiments of the methods described herein, a plurality of cells (e.g., microbial cells) can be suspended in an aqueous solution. In some embodiments, the plurality of cells can be washed. The plurality of cells can be lysed at a pH between about 8.5 to about 12.0 (e.g., about 8.5 to about 9.0, about 9.0 to about 10.0, about 9.0 to about 11.0, about 10.0 to about 11.0, about 11.0 to about 12.0, about 9.5 to about 10.5, about 9.5 to about 11.5, about 10.5 to about 11.5, at 9.0, at 9.5, at 10.0, at 10.5, at 11.0, at 11.5, or at 12.0) to obtain a cell lysate. As described herein, maintaining a high pH during lysis can help to improve lysis (e.g., protein yield) and/or clarification. Without limitation, an aqueous suspension or a cell lysate can have from about 2% to about 25% dry solids (i.e., the mass remaining after removing all water). For example, an aqueous suspension or a cell lysate can have from about 2% to about 5%, about 5% to about 10%, about 10% to about 15%, about 15% to about 20%, about 20% to about 25%, about 5% to about 25%, about 10% to about 25%, about 15% to about 20%, about 2%, 5%, 7.5%, 10%, 12.5%, 15%, 17.5%, 20%, 22.5%, or 25% dry solids. In some embodiments, lysis can be biochemical such as enzymatic cell wall degradation or the lysis can be chemical, e.g., surfactant-based lysis, chaotropic-based lysis, or organic solvent-based lysis. Additionally or alternatively, lysis also can be mechanical using, for example, sonication, bead milling, osmotic lysis, homogenization, manual grinding, or by subjecting the cells to freeze-thaw cycles. Lysis can be performed at a temperature between about 4° C. and about 15° C. (e.g., about 4° C. to about 12° C., about 5° C. to about 10° C., about 4° C., 5° C., 6° C., 7° C., 8° C., 9° C., 10° C., 11° C., 12° C., 13° C., 14° C. or 15° C.).

Figure 2:
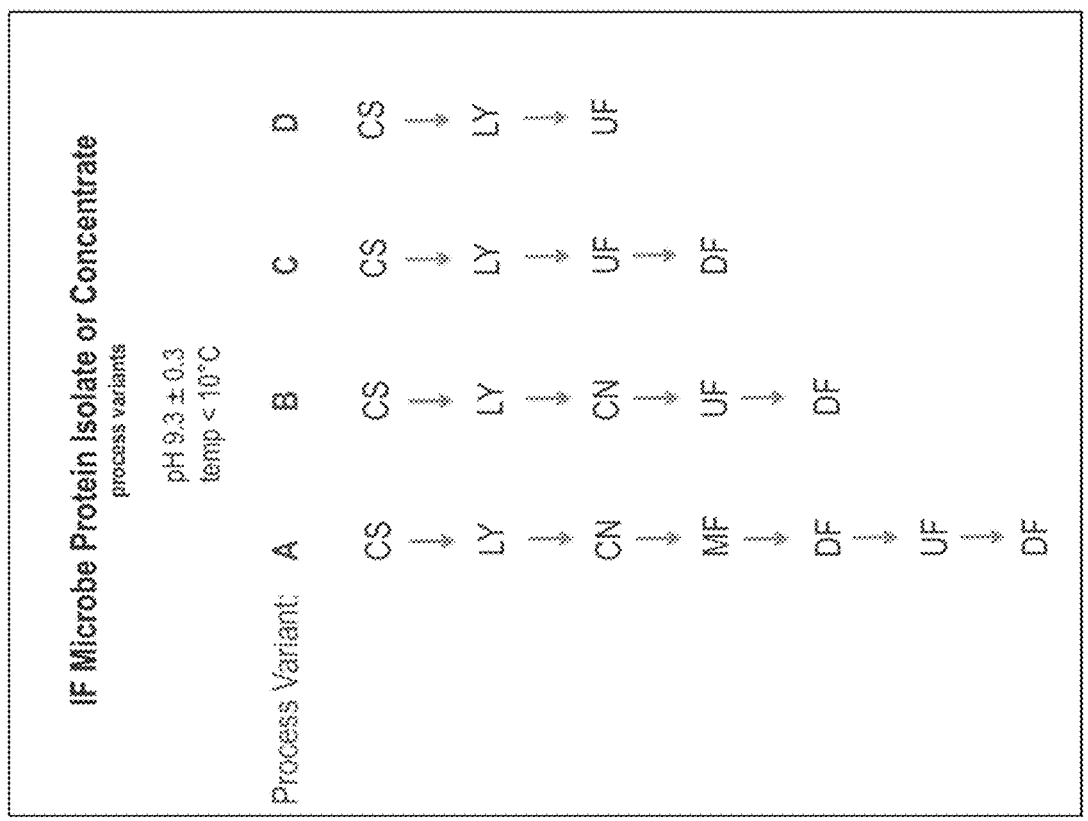
FIG. 2 is a schematic of process variants for isolation and concentration of protein. All steps may be followed by pasteurization (PZ) and/or spray drying (SD). Process conditions in all: pH 9.3+/−0.3; temperature <10° C.

Purification of a cell lysate can include one or more steps of, for example, centrifugation, clarification, precipitation, microfiltration, ultrafiltration, diafiltration (e.g., using a microfiltration or ultrafiltration membrane), pasteurization, and/or spray drying. FIG. 1 illustrates some exemplary schematics of different purification schemes that may be employed. FIG. 2 illustrates four particular purification schemes. In some embodiments, a protein composition can be a clarified lysate. In some embodiments, a protein composition can be a filtered (e.g., using one or more filtration steps) lysate, whether or not the lysate has been clarified. A protein composition can be used, e.g., in foods and food replica products.

A cell lysate can be optionally clarified by removing bulk solids, forming a clarified lysate. A variety of techniques can be used to clarify a cell lysate. For example, the cell lysate can be clarified by centrifugation, gravity settling, or by adding diatomaceous earth. During clarification, in some embodiments, the pH is maintained at a pH between about 8.5 to about 12.0 (e.g., about 8.5 to about 9.0, about 9.0 to about 10.0, about 9.0 to about 11.0, about 10.0 to about 11.0, about 11.0 to about 12.0, about 9.5 to about 10.5, about 9.5 to about 11.5, about 10.5 to about 11.5, at 9.0, at 9.5, at 10.0, at at 11.0, at 11.5, or at 12.0). The cell lysate can be clarified to a dry solids content of less than 20%, e.g., less than 17%, 15%, 12%, 10%, 9%, 8%, 7%, 6%, or 5% dry solids.

One or more flocculants can optionally be added to a final concentration of about 0.1 to about 10 g/L to help improve the solids removal during a clarification step. Non-limiting examples of flocculants include alkylamine-epichlorohydrin, polydimethyldiallylammonium chloride, a polyamine (e.g., MAGNAFLOC®, SUPERFLOC®, or TRAMFLOC®, from BASF, Florham Park, NJ), poly-ε-lysine, lime, hydrated lime, ferric chloride, ferric sulfate, ferrous sulfate, aluminum sulfate, sodium aluminate, aluminium chloride, magnesium carbonate hydroxide, calcium carbonate, calcium hydroxide, an activated silicate, a guar gum, a starch, a tannin, sodium alginate, polyaluminum sulfate, polyaluminum hydroxy chloride, BIO-FLOCK®, and a synthetic polyelectrolyte (e.g., ZETAG®). In some embodiments, one or more flocculants are added. In some embodiments, a clarification step is performed without adding one or more flocculants.

In some embodiments, a cell lysate can be optionally diluted using, for example, water or an aqueous solution of salts or buffers, prior to solids removal, while maintaining the pH between about pH 8.5 and 12.0. For example, a cell lysate can be diluted 1:1 with water. In some embodiments, one or more flocculants are added to a cell lysate and the cell lysate is diluted before clarification. In some embodiments, a cell lysate is diluted before clarification, and the clarification step proceeds without adding one or more flocculants. In some embodiments, one or more flocculants are added to a cell lysate and the cell lysate is not diluted before clarification. In some embodiments, a clarification step is performed without adding one or more flocculants to a cell lysate and without diluting the cell lysate.

In some embodiments, a cell lysate (e.g., a cell lysate that has not undergone a clarification step, such as a clarification step as described herein) can be filtered to obtain a filtered lysate. A filtration step can further reduce the amount of particulates. During filtration, in some embodiments, the pH is maintained between a pH of about 8.5 to about 12.0 (e.g., about 8.5 to about 9.0, about 9.0 to about 10.0, about 9.0 to about 11.0, about to about 11.0, about 11.0 to about 12.0, about 9.5 to about 10.5, about 9.5 to about 11.5, about 10.5 to about 11.5, at 9.0, at 9.5, at 10.0, at 10.5, at 11.0, at 11.5, or at 12.0). A cell lysate or clarified lysate can be filtered using microfiltration, ultrafiltration, and/or diafiltration. Microfiltration can use a membrane with a pore size of about 0.2 μm to about 2.0 μm (e.g., about 0.2 to about 0.3 μm, about 0.3 to about 0.5 μm, about 0.5 to about 0.7 μm, about 0.7 to about 0.9 μm, about 0.9 to about 1.1 μm, about 1.0 to about 1.2 μm, about 1.2 to about 1.4 μm, about 1.4 to about 1.6 μm, about 1.6 to about 1.8 μm, or about 1.8 to about 2.0 μm). Ultrafiltration can use a membrane with a molecular weight cutoff of about 5 kDa to about 70 kDa (e.g., about 5 kDa to about 10 kDa, about 10 kDa to about 30 kDa, or about 30 kDa to about 50 kDa, about 20 kDa to about 40 kDa, about 40 to about 60 kDa, or about 50 kDa to about 70 kDa).

In some embodiments, a clarified lysate can be filtered to obtain a filtered lysate. In some embodiments, a filtration step can reduce the amount of particulates. During filtration, in some embodiments, the pH is maintained between a pH of about 8.5 to about 12.0 (e.g., about 8.5 to about 9.0, about 9.0 to about 10.0, about 9.0 to about 11.0, about to about 11.0, about 11.0 to about 12.0, about 9.5 to about 10.5, about 9.5 to about 11.5, about 10.5 to about 11.5, at 9.0, at 9.5, at 10.0, at 10.5, at 11.0, at 11.5, or at 12.0). A clarified lysate can be filtered using microfiltration, ultrafiltration, and/or diafiltration. Microfiltration can use a membrane with a pore size of about 0.2 μm to about 2.0 μm (e.g., about 0.2 to about 0.3 μm, about 0.3 to about 0.5 μm, about 0.5 to about 0.7 μm, about 0.7 to about 0.9 μm, about 0.9 to about 1.1 μm, about 1.0 to about 1.2 μm, about 1.2 to about 1.4 μm, about 1.4 to about 1.6 μm, about 1.6 to about 1.8 μm, or about 1.8 to about 2.0 μm). Ultrafiltration can use a membrane with a molecular weight cutoff of about 5 kDa to about 70 kDa (e.g., about 5 kDa to about 10 kDa, about 10 kDa to about 30 kDa, about 30 kDa to about 50 kDa, about 20 to about 40 kDa, about 40 kDa to about kDa, or about 50 to about 70 kDa).

In some embodiments, a filtered lysate can be subjected to one or more additional filtration steps to obtain another filtered lysate. A filtered lysate can be filtered using microfiltration, ultrafiltration, and/or diafiltration. Microfiltration can use a membrane with a pore size of about 0.2 μm to about 2.0 μm (e.g., about 0.2 to about 0.3 μm, about to about 0.5 μm, about 0.5 to about 0.7 μm, about 0.7 to about 0.9 μm, about 0.9 to about 1.1 μm, about 1.0 to about 1.2 μm, about 1.2 to about 1.4 μm, about 1.4 to about 1.6 μm, about 1.6 to about 1.8 μm, or about 1.8 to about 2.0 μm). Ultrafiltration can use a membrane with a molecular weight cutoff of about 5 kDa to about 70 kDa (e.g., about 5 kDa to about 10 kDa, about 10 kDa to about 30 kDa, about 30 kDa to about 50 kDa, about 20 kDa to about 40 kDa, about 40 kDa to about 60 kDa, or about 50 kDa to about kDa). For example, a filtered lysate can be further filtered by forcing the solution (e.g., using increased pressure or centrifugation) through a semi-permeable membrane having, for example, a molecular weight cutoff of about 5 kDa to about 50 kDa (e.g., about 5 kDa to about 10 kDa, about 10 kDa to about 30 kDa, or about 30 kDa to about 50 kDa). In some embodiments, a filtered lysate can be diafiltered on a microfiltration membrane. In some embodiments, a filtered lysate can be diafiltered on an ultrafiltration membrane. In some embodiments, filtered lysate (e.g., cell lysate or clarified lysate filtered by microfiltration and/or ultrafiltration) can be concentrated to at least about 10% dry solids (e.g., at least about 15% or 20% dry solids) then diafiltered at constant volume for at least one diavolume (DV) (e.g., at least 2, 3, 4, 5, 6, 7, 8, 9, 10, 15, or 20 diavolumes). In some embodiments, filtered lysate (e.g., cell lysate or clarified lysate filtered by microfiltration and/or ultrafiltration) can be diluted (e.g., using water or an aqueous solution of salts or buffers, while maintaining the pH between about pH 8.5 and 12.0) to about 5% dry solids (e.g., about 6%, 7%, 8% or 9% dry solids) then diafiltered at constant volume for at least one diavolume (e.g., at least 2, 3, 4, 5, 6, 7, 8, 9, 10, 15, or diavolumes). In some embodiments, filtered lysate (e.g., cell lysate or clarified lysate filtered by microfiltration and/or ultrafiltration) can be diluted (e.g., using water or an aqueous solution of salts or buffers, while maintaining the pH between about pH 8.5 and 12.0) to about 3% dry solids (e.g., about 2% or about 4% dry solids) then diafiltered to concentration the filtered lysate to about 15% dry solids (e.g., about 13%, 14%, 16%, or 17% dry solids). During the additional filtration step or steps, in some embodiments, the pH is maintained at a pH between about 8.5 to about 12.0 (e.g., about 8.5 to about 9.0, about 9.0 to about 10.0, about 9.0 to about 11.0, about 10.0 to about 11.0, about 11.0 to about 12.0, about 9.5 to about 10.5, about 9.5 to about 11.5, about 10.5 to about 11.5, at 9.0, at 9.5, at 10.0, at 10.5, at 11.0, at 11.5, or at 12.0).

A cell lysate can be concentrated (e.g., through filtering methods as described for removing components smaller than the desired protein such as ultrafiltration, optionally with diafiltration). During the concentration, the pH can be maintained at a pH between about 8.5 to about 12.0 (e.g., about 8.5 to about 9.0, about 9.0 to about 10.0, about 9.0 to about 11.0, about 10.0 to about 11.0, about 11.0 to about 12.0, about 9.5 to about 10.5, about 9.5 to about 11.5, about 10.5 to about 11.5, at 9.0, at 9.5, at 10.0, at 10.5, at 11.0, at 11.5, or at 12.0). A cell lysate can be concentrated to a protein content of about 2 mg/mL to about 250 mg/mL (e.g., 10 mg/mL to 225 mg/mL, 15 mg/mL to 200 mg/mL, 25 mg/mL to about 225 mg/mL, 50 mg/mL to 200 mg/mL, or 50 mg/mL to 150 mg/mL). Concentration can occur concurrently with a filtration step. Concentration can occur separately from a filtration step.

A clarified lysate can be concentrated (e.g., through filtering methods as described for removing components smaller than the desired protein such as ultrafiltration, optionally with diafiltration). During the concentration, the pH can be maintained at a pH between about 8.5 to about 12.0 (e.g., about 8.5 to about 9.0, about 9.0 to about 10.0, about 9.0 to about 11.0, about 10.0 to about 11.0, about 11.0 to about 12.0, about 9.5 to about 10.5, about 9.5 to about 11.5, about 10.5 to about 11.5, at 9.0, at 9.5, at 10.0, at 10.5, at 11.0, at 11.5, or at 12.0). A clarified lysate can be concentrated to a protein content of about 2 mg/mL to about 250 mg/mL (e.g., 10 mg/mL to 225 mg/mL, 15 mg/mL to 200 mg/mL, 25 mg/mL to about 225 mg/mL, 50 mg/mL to 200 mg/mL, or 50 mg/mL to 150 mg/mL). Concentration can occur concurrently with a filtration step. Concentration can occur separately from a filtration step.

A filtered lysate can be concentrated (e.g., through filtering methods as described for removing components smaller than the desired protein such as ultrafiltration, optionally with diafiltration). During the concentration, the pH can be maintained at a pH between about 8.5 to about 12.0 (e.g., about 8.5 to about 9.0, about 9.0 to about 10.0, about 9.0 to about 11.0, about 10.0 to about 11.0, about 11.0 to about 12.0, about 9.5 to about 10.5, about 9.5 to about 11.5, about 10.5 to about 11.5, at 9.0, at 9.5, at 10.0, at 10.5, at 11.0, at 11.5, or at 12.0). A filtered lysate can be concentrated to a protein content of about 2 mg/mL to about 250 mg/mL (e.g., 10 mg/mL to 225 mg/mL, 15 mg/mL to 200 mg/mL, 25 mg/mL to about 225 mg/mL, 50 mg/mL to 200 mg/mL, or 50 mg/mL to 150 mg/mL). Concentration can occur concurrently with a filtration step. Concentration can occur separately from a filtration step.

In some embodiments, a protein composition, where one or more purification steps (e.g., two or more, three or more, or all of the purification steps) were carried out between about pH 8.5 and about 12.0, can comprise at least 35% (e.g. at least 40%, 50%, 55%, 60%, 65%, 70%, 75%, 80%, 85%, 90%, 95%, or 99%) on a dry weight basis of molecules larger than 500 Da (e.g., 1 kDa, 2 kDa, 3 kDa, 5 kDa, 10 kDa, 30 kDa, or 50 kDa). A person of ordinary skill in the art can determine the total amount of large molecules (e.g., molecules larger than 500 Da, 1 kDa, 2 kDa, 3 kDa, 5 kDa, 10 kDa, 30 kDa, or 50 kDa), or the amount of a particular large molecule in a sample, using any of a variety of known methods, e.g., liquid chromatography-mass spectrometry (LCMS). A person of ordinary skill in the art can determine the total amount of small molecules (e.g., molecules smaller than 30 kDa, 20 kDa, 10 kDa, 5 kDa, 3 kDa, 2 kDa, 1 kDa, or 500 Da), or the amount of a particular small molecule in a sample, using any of a variety of known methods, e.g., liquid chromatography-mass spectrometry (LCMS). In some embodiments, a reduction in small molecules (e.g., molecules smaller than 30 kDa, 20 kDa, 10 kDa, 5 kDa, 3 kDa, 1 kDa, or 500 Da) can occur concurrently with a filtration step, e.g., diafiltration.

It will be appreciated that the choice of filter (e.g., membrane material, pore size) and filtration method (e.g., microfiltration, ultrafiltration, or diafiltration) can affect or even dictate whether a desired component will be in the retentate or the filtrate of a given filtration step. For example, in some embodiments, if a large molecule is a desired component, ultrafiltration can be selected as the filtration method, and the desired component can be part of the retentate. In some embodiments, ultrafiltration can be combined with diafiltration.

In some embodiments, steps in any of the methods described herein can be performed independently at a pH of 8.5 to 12. For example, a lysing step can be performed at a pH of about 8.5 to about 9.0, about 9.0 to about 10.0, about 9.0 to about 11.0, about 10.0 to about 11.0, about 11.0 to about 12.0, about 9.5 to about 10.5, about 9.5 to about 11.5, about 10.5 to about 11.5, at about 9.0, at about 9.5, at about 10.0, at about 10.5, at about 11.0, at about 11.5, or at about 12.0, while the clarifying and/or filtering steps can each be independently performed at a pH different from the pH of the lysing step, so long as the different pH of the clarifying and/or filtering steps is above 8.5. As another example, a clarifying step can be performed at a pH of about 8.5 to about 9.0, about 9.0 to about 10.0, about 9.0 to about 11.0, about 10.0 to about 11.0, about 11.0 to about 12.0, about 9.5 to about 10.5, about 9.5 to about 11.5, about 10.5 to about 11.5, at about 9.0, at about 9.5, at about 10.0, at about 10.5, at about 11.0, at about 11.5, or at about 12.0, while the lysing and/or filtering steps can each be independently performed at a pH different from the pH of the clarifying step, so long as the different pH of the lysing and/or filtering steps is above 8.5. As another example, a filtering step can be performed at a pH of about 8.5 to about 9.0, about 9.0 to about 10.0, about 9.0 to about 11.0, about 10.0 to about 11.0, about 11.0 to about 12.0, about 9.5 to about 10.5, about 9.5 to about 11.5, about 10.5 to about 11.5, at about 9.0, at about 9.5, at about 10.0, at about 10.5, at about 11.0, at about 11.5, or at about 12.0, while the lysing and/or clarifying steps can each be independently performed at a pH different from the pH of the filtering step, so long as the different pH of the lysing and/or clarifying steps is above 8.5.

In some embodiments, a protein composition, where one or more purification steps (e.g., two or more, three or more, or all of the purification steps) were carried out between about pH 8.5 and about 12.0, can have a reduced the amount of or none of one or more small molecules that can contribute buffering capacity compared to purified protein wherein the same purification step or steps were not carried out about pH 8.5 and about 12.0. Ingredient buffering capacity can contribute to pH drift, which can promote off-flavor development, as well as potentially impacting product assembly and formulation. For example, a protein composition can have a buffering capacity of less than about 2.5 mmol NaOH per gram dry solids (e.g., less than about 2.4, 2.3, 2.2, 2.1, 2.0, 1.9, 1.8. 1.7, 1.6, 1.5, 1.4, 1.3, 1.2, 1.1, 1.0, 0.5, or 0.1 mmol NaOH per gram dry solids). In some embodiments, diafiltration (at, e.g., pH 9.3±0.3) can lower the buffering capacity (e.g., from about 3.6 mmol NaOH per gram dry solids) to less than about 2.5 mmol NaOH per gram dry solids (e.g., less than about 2.4, 2.3, 2.2, 2.1, 2.0, 1.9, 1.8. 1.7, 1.6, 1.5, 1.4, 1.3, 1.2, 1.1, 1.0, 0.5, or 0.1 mmol NaOH per gram dry solids). The buffer capacity can be determined by pH titration of a 2% (w/v) suspension or solution, measuring the mmol of NaOH that would be required to move the suspension or solution from pH 3.0 to pH 12.0.

In some embodiments, a protein composition, where one or more purification steps (e.g., two or more, three or more, or all of the purification steps) were carried out between about pH 8.5 and about 12.0, can form a gel with a higher storage modulus compared to purified protein where the same purification step or steps were not carried out about pH 8.5 and about 12.0. For example, in some embodiments, a gel can be formed from a protein composition with a concentration of about 25 to about 250 mg/mL (e.g., about 25 to about 50 mg/mL, about 25 to about 100 mg/mL, about 25 to about 150 mg/mL, about 25 to about 200 mg/mL, about 50 to about 250 mg/mL, about 100 to about 250 mg/mL, about 150 to about 250 mg/mL, or about 200 to about 250 mg/mL) at a pH of about 7.0. In some embodiments, a gel formed from a protein composition where one or more purification steps (e.g., two or more, three or more, or all of the purification steps) were carried out between about pH 8.5 and about 12.0 at a 10% (w/v) suspension can have storage modulus greater than a similar gel where the same purification step or steps were not carried out about pH 8.5 and about 12.0. In some embodiments, the storage modulus of a gel formed from a protein composition where one or more purification steps (e.g., two or more, three or more, or all of the purification steps) were carried out between about pH 8.5 and about 12.0 at a 10% (w/v) suspension can have a storage modulus of at least about 100 Pa at about 95° C. In some embodiments, the storage modulus of a gel at about 95° C. formed from a protein composition where one or more purification steps (e.g., two or more, three or more, or all of the purification steps) were carried out between about pH 8.5 and about 12.0 at a 10% (w/v) suspension can have a storage modulus at least about 10-fold (e.g., 15-fold or 20-fold) greater than the storage modulus of a similar gel, where one or more purification steps (e.g., two or more, three or more, or all of the purification steps) were not carried out between about pH 8.5 and about 12.0. In some embodiments, the storage modulus of a pasteurized (e.g., at 65° C. for 30 seconds) gel at about 95° C. formed from a protein composition where one or more purification steps (e.g., two or more, three or more, or all of the purification steps) were carried out between about pH 8.5 and about 12.0 at a 10% (w/v) suspension can have a storage modulus at least about 2-fold (e.g., 3-fold, 4-fold, or 5-fold) greater than the storage modulus of a similar gel, where one or more purification steps (e.g., two or more, three or more, or all of the purification steps) were not carried out between about pH 8.5 and about 12.0.

In some embodiments, a protein composition, where one or more purification steps (e.g., two or more, three or more, or all of the purification steps) were carried out between about pH 8.5 and about 12.0, can have less (e.g., a smaller absolute amount or a smaller concentration) of one or more small molecules that can contribute to off-odors or off-flavors (e.g., cysteine, 1-Hexanol; 2-Butylfuran; 2-methyl-2-Pentenal; 3-Octanone; Ethyl-Acetate; 2-Ethyl-Furan; 2-pentyl-Furan; Pyrazine; 1-Decanol; Acetophenone; 1-Nonanol; 2,5-Dimethyl-Pyrazine; Dodecanal; Benzeneacetaldehyde; Nonanal; Butyrolactone; Octanal; 2-Decanone; Hexanal; 2-Nonanone; Benzaldehyde; Heptanal; 2-Octanone; Furfural; 2-Heptanone; Pentanal) than a protein composition obtained by purification method in which one or more purification steps (e.g., two or more, three or more, or all of the purification steps) were not carried out between about pH 8.5 and about 12.0. In some embodiments, a protein composition, where one or more purification steps (e.g., two or more, three or more, or all of the purification steps) were carried out between about pH 8.5 and about 12.0, can have a reduction of at least about 1.05-fold (e.g., at least about 2.0-fold, at least about 2.5-fold, at least about 3-fold, at least about 4-fold, at least about 5-fold, or at least about 10-fold) in one or more small molecules that can contribute to off-odors or off-flavors (e.g., cysteine, 1-Hexanol; 2-Butylfuran; 2-methyl-2-Pentenal; 3-Octanone; Ethyl-Acetate; 2-Ethyl-Furan; 2-pentyl-Furan; Pyrazine; 1-Decanol; Acetophenone; 1-Nonanol; 2,5-Dimethyl-Pyrazine; Dodecanal; Benzeneacetaldehyde; Nonanal; Butyrolactone; Octanal; 2-Decanone; Hexanal; 2-Nonanone; Benzaldehyde; Heptanal; 2-Octanone; Furfural; 2-Heptanone; Pentanal) compared to purified protein wherein the same purification step or steps were not carried out about pH 8.5 and 12.0. In some embodiments, a fold-reduction can be calculated by dividing the amount of a small molecule in a protein composition where one or more steps (e.g., two or more, three or more, or all of the purification steps) were not carried out between about pH 8.5 and about 12.0 by the amount of the same small molecule where the same purification step or steps were carried out between about pH 8.5 and about 12.0. A person of ordinary skill in the art can determine the amount of a particular small molecule in a sample, using, e.g., GCMS.

In some embodiments, a protein composition, where one or more purification steps (e.g., two or more, three or more, or all of the purification steps) were carried out between about pH 8.5 and about 12.0, includes one or more small molecules that contribute to off-odors or off-flavors (e.g., cysteine, 1-Hexanol; 2-Butylfuran; 2-methyl-2-Pentenal; 3-Octanone; Ethyl-Acetate; 2-Ethyl-Furan; 2-pentyl-Furan; Pyrazine; 1-Decanol; Acetophenone; 1-Nonanol; 2,5-Dimethyl-Pyrazine; Dodecanal; Benzeneacetaldehyde; Nonanal; Butyrolactone; Octanal; 2-Decanone; Hexanal; 2-Nonanone; Benzaldehyde; Heptanal; 2-Octanone; Furfural; 2-Heptanone; Pentanal) in an amount below a level detectable by a panelist. A person of ordinary skill in the art can determine the amount of a particular small molecule in a sample, using, e.g., GCMS.

In some embodiments, a protein composition, where one or more purification steps (e.g., two or more, three or more, or all of the purification steps) were carried out between about pH 8.5 and about 12.0, has no detectable level of one or more small molecules that contribute to off-odors or off-flavors (e.g., cysteine, 1-Hexanol; 2-Butylfuran; 2-methyl-2-Pentenal; 3-Octanone; Ethyl-Acetate; 2-Ethyl-Furan; 2-pentyl-Furan; Pyrazine; 1-Decanol; Acetophenone; 1-Nonanol; 2,5-Dimethyl-Pyrazine; Dodecanal; Benzeneacetaldehyde; Nonanal; Butyrolactone; Octanal; 2-Decanone; Hexanal; 2-Nonanone; Benzaldehyde; Heptanal; 2-Octanone; Furfural; 2-Heptanone; Pentanal).

A protein composition also can be pasteurized. For example, a protein composition can be pasteurized using heat treatment, high temperature short time pasteurization, pulsed electric field, high pressure pasteurization, UV irradiation, gamma irradiation, or microfiltration. In some embodiments, one or more antimicrobials (e.g., polylysine) can be added during or after pasteurization.

In some embodiments, a protein composition, whether pasteurized or not, can be dried, e.g., spray dried or freeze dried or the like under mild conditions to ensure that the protein is not denatured.

In some embodiments, at least about 50% (e.g., at least about 60%, 70%, 80%, or 90%) of polypeptides in a protein composition fall between about 10 kDa and about 200 kDa when measured by reducing and denaturing gel electrophoresis (e.g., SDS-PAGE) and densitometry after detection in a manner common to the art (e.g., Coomassie Brilliant Blue G-250, Coomassie Brilliant Blue R-250, or silver nitrate).

In some embodiments, one or more proteins in a protein composition, as described herein is functional (as described above). In some embodiments, a protein composition can be used in a variety of food products, including, for example, protein supplements (e.g., protein powders), meal replacements, or baked goods, or to replace all or a portion of an animal protein (e.g., from cows, pigs, poultry, lamb, or fish) in a food product that mimics an animal derived food product (e.g., a cheese replica, an egg replica or meat replica such as a ground meat replica).

In some embodiments, a protein composition can include one or more proteins selected from the group consisting of AOX1 and AOX2.

In some embodiments, a protein composition can include one or more proteins, identified by GI number, selected from the group consisting of: 254568470, 254567507, 254570367, 254568544, 254573764, 254566601, 254566257, 254567798, 254570575, 254571387, 254571425, 254568572, 254571679, 254569858, 254573010, 254564691, 254571699, 254572585, 254566127, 254570667, 254572870, 254573696, 254565205, 254569186, 254572668, 254571899, 254569222, 254572359, 254573464, 254572163, 254570957, 254573014, 254570673, 254566987, 254567581, 254564747, 254568562, 254566731, 254565437, 254564519, 254571763, 254566729, 254569372, 254571423, 254565451, 254565973, 254573008, 254574310, 254564587, 254568946, 254569478, 254566861, 254565513, 254572906, 254572796, 254573092, 254567233, 254565959, 254570383, 254570885, 254565519, 254574530, 254573558, 254569654, 254573466, 254571991, 254568780, 254565859, 254568564, 254570088, 254564995, 254573142, 254571407, 254569976, 254570771, 254565455, 254565551, 254574244, 254567716, 254572952, 254568654, 254570661, 254566481, 254565045, 254567189, 254570098, 254566883, 254569212, 254574528, 254565655, 254568196, 254572782, 254570305, 254572856, 254568894, 254564809, 254569780, 254565263, 254567287, 254567754, 254565279, 254567471, 254564667, 254568442, 254571893, 254573996, 254572005, 254572033, 254567027, 254569734, 254566559, 254570993, 254566611, 254566089, 254567714, 254571057, 254573908, 254572676, 254570100, 254567055, 254565475, 254567834, 254567872, 254566327, 254574366, 254568036, 254567738, 254565307, 254570727, 254566301, 254565783, 254567173, 254568492, 254565493, 254571145, 254565699, 254567029, 254573198, 254568642, 254568302, 254574036, 254569716, 254571157, 254571485, 254567788, 254573482, 254566631, 254571293, 254569576, 254572962, 254565129, 254569094, 254570112, 254566447, 254570515, 254568944, 254573180, 254573098, 254570969, 254569500, 254564507, 254569714, 254570072, 254573324, 254568444, 254569156, 254568334, 254568304, 254566885, 254571359, 254574464, 254569852, 254569144, 254573818, 254573050, 254572992, 254571587, 254573470, 254565991, 254566975, 254570022, 254569102, 254574442, 254569298, 254572501, 254569162, 254565713, 254565211, 254572377, 254571575, 254574030, 254572872, 254565431, 254569400, 254572599, 254565725, 254569842, 254570271, 254573426, 254574502, 254569568, 254572822, 254568950, 254572257, 254569700, 254573726, 254574210, 254567569, 254569896, 254571915, 254568132, 254567191, 254566971, 254567243, 254566843, 254568386, 254571131, 254572628, 254567025, 254569344, 254571043, 254572958, 254566489, 254566607, 254569916, 254571179, 254569898, 254567938, 254566619, 254566141, 254572159, 254573164, 254573328, 254570166, 254565545, 254570535, 254564705, 254570393, 254566769, 254565063, 254567203, 254573714, 254571903, 254571639, 254564825, 254569512, 254569682, 254574296, 254574080, 254564849, 254570719, 254568186, 254572093, 254573284, 254571919, 254570821, 254565769, 254573468, 254571883, 254570633, 254570315, 254570527, 254567583, 254573420, 254569866, 254569290, 254569438, 254574316, 254566267, 254570897, 254569696, 254566847, 254572974, 254569386, 254568682, 254565735, 254574242, 254568876, 254566225, 254566479, 254569106, 254566881, 254569226, 254565085, 254569736, 254572157, 254565157, 254573986, 254569320, 254570679, 254572211, 254566063, 254568616, 254564917, 254564915, 254568842, 254573376, 254566487, 254565875, 254568412, 254564663, 254565961, 254569890, 254566293, 254568216, 254572836, 254570523, 254568506, 254572347, 254567662, 254574020, 254571733, 254571747, 254569894, 254571377, 254566013, 254569558, 254565617, 254566191, 254571955, 254565721, 254567996, 254566897, 254574140, 254571035, 254570359, 254566893, 254568298, 254566101, 254565989, 254568566, 254571457, 254571393, 254571161, 254564537, 254571649, 254570979, 254566595, 254566417, 254569072, 254570669, 254569122, 254567253, 254573448, 254571343, 254572333, 254566649, 254571369, 254573496, 254572133, 254573886, 254569410, 254570411, 254565705, 254573462, 254568908, 254572495, 254569552, 254566933, 254568102, 254569702, 254569846, 254574136, 254569390, 254567273, 254572371, 254569354, 254572053, 254568006, 254565653, 254570487, 254573510, 254564923, 254568606, 254572503, 254569166, 254572145, 254572531, 254568464, 254570723, 254570485, 254567349, 254565049, 254574132, 254564979, 254564629, 254572309, 254565163, 254573160, 254573452, 254565165, 254573834, 254574102, 254566996, 254573756, 254572015, 254568992, 254572535, 254566143, 254572321, 254568056, 254573266, 254566351, 254571007, 254571463, 254570629, 254573948, 254572884, 254567375, 254567467, 254567928, 254572307, 254567700, 254571783, 254573676, 254567900, 254568714, 254564921, 254564599, 254573602, 254573662, 254570521, 254572814, 254571619, 254566321, 254568896, 254566743, 254572553, 254565607, 254565035, 254565403, 254573760, 254566097, 254564603, 254572956, 254564565, 254572834, 254566317, 254564665, 254573056, 254568582, 254564717, 254572724, 254565955, 254568718, 254573174, 254566999, 254569742, 254573508, 254565095, 254569494, 254573046, 254568148, 254574028, 254569828, 254566605, 254569010, 254568244, 254564675, 254569952, 254574158, 254567143, 254566779, 254574118, 254573866, 254570090, 254569928, 254573178, 254574370, 254569876, 254571543, 254570799, 254569038, 254570373, 254567774, 254571247, 254574144, 254571313, 254570649, 254565795, 254572920, 254568600, 254571879, 254567231, 254567553, 254569782, 254566517, 254566423, 254573664, 254565207, 254566497, 254566087, 254571791, 254568702, 254569082, 254569470, 254565589, 254570561, and 254574100. A GI number can be searched in in the PubMed protein database found at ncbi.nlm.nih-.gov/protein, e.g., to retrieve the name and/or sequence of the corresponding protein.

In some embodiments, a protein composition can include one or more proteins selected from a Pfam family selected from the group consisting of Pf00044, Pf02800, Pf02826, Pf00009, Pf03143, Pf03144, Pf00113, Pf03952, Pf00107, Pf08240, Pf00012, Pf06723, Pf00162, Pf00183, Pf02518, Pf00009, Pf00679, Pf03144, Pf03764, Pf00205, Pf02775, Pf02776, Pf00006, Pf00306, Pf02874, Pf01249, Pf00240, Pf01020, Pf11976, Pf00240, Pf01599, Pf11976, Pf00006, Pf00306, Pf02874, Pf00153, Pf00189, Pf07650, Pf00012, Pf06723, Pf01929, Pf00400, Pf00012, Pf06723, Pf00297, Pf01015, Pf01116, Pf00224, Pf02887, Pf03328, Pf00005, Pf03193, Pf00300, Pf00416, Pf01287, Pf01294, Pf00121, Pf00012, Pf06723, Pf01251, Pf00022, Pf00318, Pf00327, Pf00238, Pf00411, Pf01090, Pf00687, Pf00573, Pf00177, Pf00828, Pf01459, Pf00270, Pf00271, Pf00298, Pf03946, Pf01201, Pf00572, Pf00276, Pf00428, Pf00466, Pf00827, Pf00923, Pf01781, Pf01248, Pf00118, Pf00043, Pf00647, Pf00900, Pf01479, Pf08071, Pf00333, Pf03719, Pf01450, Pf07991, Pf01280, Pf01780, Pf00181, Pf03947, Pf03501, Pf00312, Pf08069, Pf00338, Pf00380, Pf00132, Pf00483, Pf12804, Pf00366, Pf00347, Pf00410, Pf00334, Pf00160, Pf01248, Pf00237, Pf00393, Pf03446, Pf00213, Pf00347, Pf00080, Pf01248, Pf01198, Pf00838, Pf01200, Pf00122, Pf00690, Pf00702, Pf08282, Pf12710, Pf00252, Pf00163, Pf01479, Pf00833, Pf01092, Pf01667, Pf00107, Pf08240, Pf01092, Pf01775, Pf01159, Pf01667, Pf01849, Pf00125, Pf02969, Pf00675, Pf05193, Pf00153, Pf00244, Pf00208, Pf02812, Pf01158, Pf00330, Pf00694, Pf00125, Pf00808, Pf02284, Pf00281, Pf00673, Pf00438, Pf02772, Pf02773, Pf00670, Pf02826, Pf05221, Pf00428, Pf00578, Pf08534, Pf10417, Pf01247, Pf02953, Pf09598, Pf04969, Pf01246, Pf00202, Pf01212, Pf00349, Pf03727, Pf01776, Pf03332, Pf08282, Pf00253, Pf00155, Pf00012, Pf06723, Pf01717, Pf08267, Pf00166, Pf00085, Pf00056, Pf02866, Pf00076, Pf00658, Pf00285, Pf00406, Pf05191, Pf00456, Pf02779, Pf02780, Pf00861, Pf00349, Pf03727, Pf00025, Pf00071, Pf01926, Pf04670, Pf08477, Pf05873, Pf00342, Pf00831, Pf00203, Pf01282, Pf00515, Pf07719, Pf01215, Pf01159, Pf05405, Pf00180, Pf02297, Pf00108, Pf00109, Pf02803, Pf01488, Pf03435, Pf05368, Pf02953, Pf00076, Pf00012, Pf06723, Pf00828, Pf00070, Pf01262, Pf02852, Pf07992, Pf12831, Pf00793, Pf11022, Pf00389, Pf00670, Pf02826, Pf05221, Pf00085, Pf02114, Pf01063, Pf01209, Pf02353, Pf08241, Pf08242, Pf08498, Pf12847, Pf03297, Pf00719, Pf00254, Pf00226, Pf00684, Pf01556, Pf00164, Pf00125, Pf00627, Pf01849, Pf00736, Pf01283, Pf01157, Pf00009, Pf03143, Pf03144, Pf05680, Pf00180, Pf04911, Pf00180, Pf01926, Pf06071, Pf00270, Pf00271, Pf00310, Pf00733, Pf00266, Pf01243, Pf10590, Pf00231, Pf00025, Pf00071, Pf00503, Pf01926, Pf04670, Pf08477, Pf09439, Pf01588, Pf01253, Pf00675, Pf02136, Pf00036, Pf09006, Pf00306, Pf02874, Pf00410, Pf01655, Pf00085, Pf01546, Pf00270, Pf00271, Pf04851, Pf00025, Pf00071, Pf00503, Pf01926, Pf08477, Pf09439, Pf00254, Pf00006, Pf00306, Pf02874, Pf04568, Pf00956, Pf00180, Pf00133, Pf01406, Pf08264, Pf09334, Pf00004, Pf00910, Pf01078, Pf02359, Pf02933, Pf05496, Pf05673, Pf06068, Pf07724, Pf07728, Pf00676, Pf12718, Pf01808, Pf02142, Pf02167, Pf11578, Pf00091, Pf03953, Pf01873, Pf02020, Pf00702, Pf01030, Pf00226, Pf00083, Pf07690, Pf00587, Pf02403, Pf02779, Pf02780, Pf01798, Pf08060, Pf08156, Pf00365, Pf00106, Pf01073, Pf01370, Pf07993, Pf08659, Pf00034, Pf00155, Pf01041, Pf01053, Pf00549, Pf01071, Pf08442, Pf00501, Pf11930, Pf03114, Pf10455, Pf01199, Pf00106, Pf00109, Pf01648, Pf02801, Pf00291, Pf00571, Pf01118, Pf02774, Pf08718, Pf01154, Pf08540, Pf00070, Pf07992, Pf00081, Pf02777, Pf00152, Pf01336, Pf01798, Pf08060, Pf08156, Pf10642, Pf00289, Pf00364, Pf00682, Pf02436, Pf02785, Pf02786, Pf07478, Pf00180, Pf09229, Pf01704, Pf00076, Pf00887, Pf00698, Pf01575, Pf03060, Pf08354, Pf05047, Pf00155, Pf01347, Pf00549, Pf02629, Pf00076, Pf08662, Pf00018, Pf00241, Pf07653, Pf00070, Pf01946, Pf07992, Pf01269, Pf00133, Pf08264, Pf09334, Pf00117, Pf00958, Pf02540, Pf03054, Pf06508, Pf07722, Pf02550, Pf00479, Pf02781, Pf00005, Pf03193, Pf12848, Pf00155, Pf00266, Pf01041, Pf01053, Pf01212, Pf02347, Pf03841, Pf00009, Pf03144, Pf09173, Pf00118, Pf01907, Pf00155, Pf00464, Pf04718, Pf00733, Pf00764, Pf03054, Pf06508, Pf10791, Pf00926, Pf04669, Pf01459, Pf00294, Pf01192, Pf04281, Pf00638, Pf01873, Pf01399, Pf00587, Pf02824, Pf03129, Pf07973, Pf01920, Pf00743, Pf07992, Pf00255, Pf00578, Pf08534, Pf03134, Pf02271, Pf00120, Pf03951, Pf00310, Pf01380, Pf09280, Pf01634, Pf08029, Pf09084, Pf00682, Pf00501, Pf00176, Pf00270, Pf00271, Pf00437, Pf00625, Pf00910, Pf05729, Pf00198, Pf00364, Pf02817, Pf00171, Pf00705, Pf02144, Pf02747, Pf01652, Pf00241, Pf00171, Pf03198, Pf07983, Pf03198, Pf07983, Pf04627, Pf01042, Pf00152, Pf01336, Pf00682, Pf08502, Pf01912, Pf00578, Pf08534, Pf10417, Pf00226, Pf01556, Pf01399, Pf09440, Pf00262, Pf00118, Pf00750, Pf03485, Pf05746, Pf00111, Pf00384, Pf09326, Pf10588, Pf01248, Pf00085, Pf00462, Pf00676, Pf02779, Pf00009, Pf00071, Pf02421, Pf08477, Pf05091, Pf00133, Pf08264, Pf09334, Pf10458, Pf01472, Pf01509, Pf08068, Pf00118, Pf01111, Pf00160, Pf00152, Pf01336, Pf00899, Pf02134, Pf09358, Pf10585, Pf00682, Pf04111, Pf00175, Pf00970, Pf08030, Pf03435, Pf00575, Pf07541, Pf00332, Pf01257, Pf00742, Pf03447, Pf01262, Pf05222, Pf00832, Pf12710, Pf01266, Pf01411, Pf02272, Pf07973, Pf00013, Pf01991, Pf06505, Pf00587, Pf03129, Pf01398, Pf11976, Pf09796, Pf00025, Pf00071, Pf04670, Pf08477, Pf01176, Pf00043, Pf00749, Pf03950, Pf02374, Pf06244, Pf02939, Pf00160, Pf00515, Pf07719, Pf00793, Pf00709, Pf00235, Pf02115, Pf00881, Pf11885, Pf02823, Pf00291, Pf10276, Pf00004, Pf00158, Pf06414, Pf07724, Pf07726, Pf07728, Pf01433, Pf00155, Pf00076, Pf00118, Pf01194, Pf00317, Pf02867, Pf03477, Pf03483, Pf03484, Pf00076, Pf12353, Pf02453, Pf05262, Pf00578, Pf08534, Pf01238, Pf01564, Pf01218, Pf00227, Pf10584, Pf00240, Pf00627, Pf11976, Pf00153, Pf00009, Pf00025, Pf00071, Pf04670, Pf08477, Pf09439, Pf00350, Pf01031, Pf02212, Pf00535, Pf00890, Pf02910, Pf00583, Pf00403, Pf12223, Pf02854, Pf12152, Pf00152, Pf00587, Pf01409, Pf00004, Pf01057, Pf01078, Pf06068, Pf07724, Pf07726, Pf07728, Pf00155, Pf00464, Pf01381, Pf08523, Pf12844, Pf00156, Pf00735, Pf01926, Pf03193, Pf00004, Pf01057, Pf01078, Pf05673, Pf06068, Pf07726, Pf07728, Pf00290, Pf00291, Pf01208, Pf01466, Pf03931, Pf08327, Pf09229, Pf00107, Pf08240, Pf03223, Pf12757, Pf09731, Pf00557, Pf01753, Pf02936, Pf01793, Pf00155, Pf00202, Pf00155, Pf00687, Pf00091, Pf03953, Pf08597, Pf00118, Pf00586, Pf01071, Pf02222, Pf02655, Pf02769, Pf02843, Pf02844, Pf08442, Pf00118, Pf00343, Pf03130, Pf00332, Pf00270, Pf00271, Pf00004, Pf05496, Pf06068, Pf06414, Pf01145, Pf00579, Pf00266, Pf01212, Pf01965, Pf00815, Pf01502, Pf01503, Pf00149, Pf00542, Pf00156, Pf03098, Pf00400, Pf03604, Pf00248, Pf00365, Pf04145, Pf00400, Pf00329, Pf01086, Pf00004, Pf00158, Pf02861, Pf07724, Pf07728, Pf10431, Pf00205, Pf02775, Pf02776, Pf00043, Pf02798, Pf01546, Pf00227, Pf10584, Pf00156, Pf00310, Pf00118, Pf01012, Pf01145, Pf00481, Pf00248, Pf00206, Pf10397, Pf01602, Pf08752, Pf00227, Pf10584, Pf00491, Pf00300, Pf05739, Pf00004, Pf03796, Pf06068, Pf00107, Pf08240, Pf00029, Pf03946, Pf01399, Pf04135, Pf00637, Pf03463, Pf03464, Pf03465, Pf02330, Pf08662, Pf01512, Pf10531, Pf10589, Pf10785, Pf12853, Pf00735, Pf03193, Pf04548, Pf00635, Pf00650, Pf03765, Pf02656, Pf04758, Pf00731, Pf02222, Pf02655, Pf07478, Pf00118, Pf00275, Pf00465, Pf01202, Pf01487, Pf01488, Pf01761, Pf08501, Pf07957, Pf04280, Pf01399, Pf08375, Pf05383, Pf00076, Pf05383, Pf00636, Pf01641, Pf03678, Pf00125, Pf00364, Pf02817, Pf00462, Pf00227, Pf10584, Pf00291, Pf00585, Pf01263, Pf01399, Pf05470, Pf00459, Pf01576, Pf05911, Pf12128, Pf12757, Pf01398, Pf00009, Pf01926, Pf03029, Pf08597, Pf11987, Pf00390, and Pf03949.

In some embodiments, a protein composition can include one or more proteins selected from the group consisting of Adh1, Adh2, Cit2, Eno1, Eno2, Fba1, Hxk1, Hxk2, Icl1, Pdb1, Pdc1, Pfk1, Pgi1, Pgk1, Pyc1, Tal1, Tdh2, Tdh3, Tpi1, Efb1, Eft1, Eft2, Prt1, Rpa0, Tifl,2, Yef3, Hsc82, Hsp60, Hsp82, Hsp104, Kar2, Ssa1, Ssa2, Ssb1, Ssb2, Ssc1, Sse1, Sti1, Ade1, Ade3, Ade5,7, Arg4, Gdh1, Gln1, His4, Ilv5, Lys9, Met6, Pro2, Ser1, Trp5, Act1, Adk1, Ald6, Atp2, Bmh1, Bmh2, Cdc19, Cdc48, Cdc60, Erg20, Gpp1, Gsp1, Ipp1, Lcb1, Mol1, Pab1, Pma1, Psa1, Rnr4, Sam1, Sam2, Sod1, Uba1, YKL056, YLR109, and YMR116.

In some embodiments, a protein composition can include one or more proteins selected from the group consisting of cspB, cspD, rp1L, rp1U, hag, rpsN, rp1D, and yweA.

In some embodiments, a protein composition can include one or more proteins selected from the group consisting of hup, ptsH, dpsA, tuf, gapB, rp1X, malE, and yhjA.

In some embodiments, a protein composition can include one or more proteins selected from the group consisting of uspA, tufa, yqiA, rp1E, 1pp, rp1Y, gatB, and rp1L.

In some embodiments, a protein composition can include one or more proteins, identified by SwissProt accession number, selected from the group consisting of P00575, P06958, P00577, P02996, P04475, P02349, P06139, P09373, P02990, P17547, P22257, P06959, P06977, P11665, P14178, P02997, P00957, P00350, P07813, P23843, P00956, P08324, P08839, P02995, P07650, P03815, P09831, P05055, P00882, P00961, P07118, P09743, P10413, P60422, P02934, P00391, P30148, P04079, P36683, P12283, P06711, P00477, P02351, P0A8N3, P08177, P39184, P02384, P02354, P00968, P06981, P0A6T1, P07395, P08200, P27302, P62593, P03002, P09097, P11604, P16659, P15639, P00824, P02359, P00574, P60438, P00962, P62399, P15254, P07015, P26427, P23721, P00959, P00864, P02352, P03003, P39171, P62707, P39170, P15046, P02392, P17242, P00452, P14926, P00561, P25739, P00490, P02356, P76116, P04805, P00822, P00509, P23304, P07651, P32132, P30136, P17169, P21889, P08398, P61175, P00955, P08202, P08936, P29132, P06996, P04790, P04825, P03948, P02418, P09156, P15288, P32176, P00448, P33136, P08328, P02390, P17963, P22783, P02925, P60723, P02408, P08859, P09169, P13029, P16174, P25716, P04384, P21202, P02999, P30850, P33602, P35340, P05082, P08837, P37797, P02410, P22259, P07459, P10408, P22523, P02358, P09376, P45523, P00353, P06612, P33195, P08312, P24182, P12758, P17579, P00579, P07460, P61889, P25715, P60624, P09625, P23861, P22992, P33633, P07012, P17288, P27430, P60240, P02413, P37689, P32168, P00951, P08330, P18391, P21155, P07016, P13519, P21170, P06998, P02369, P02928, P02361, P11454, P06982, P02420, P77241, P31120, P36546, Q46829, P00954, P39172, P02426, P31216, P45577, P60906, P06138, P19673, P09372, P21513, P10177, P09151, P00891, P60785, P76177, P36938, P61517, P28691, P11457, P02428, P02419, P02416, P46837, P33599, P37747, P00913, P02931, P09546, P06971, P11096, P09157, P00934, P23480, P00960, P77482, P21346, P77349, P02364, P25665, P33138, P02375, P11875, P37095, P39435, P27827, P00479, P27248, P21599, P30867, P02363, P0A8N5, P22106, P04425, P37901, P02411, P02409, P39174, P02432, P39173, P10377, P25532, P31554, P02378, P24249, P30859, P03020, P37191, P37759, P23839, P77645, P33998, P76268, P02930, P24199, P02342, P14177, P07672, P23847, P63020, P08374, P08204, P27298, P02366, P24991, P05380, P17315, P21167, P21165, P23869, P31224, P17114, P76558, P15877, P19935, P07176, P61714, P10378, P24237, P60651, P77395, P17117, P24167, P06715, P37744, P02421, P25553, P24171, P05053, P03026, P08957, P00393, P02430, P27290, P02370, P04287, P23851, P00963, P17577, P39179, P10344, P09832, P07638, P76344, P00946, P38489, P45955, P05838, P75780, P23844, P31979, P00886, P11285, P07912, P25520, P00907, P02422, P18197, P26616, P07671, P52697, P02341, P39311, P33221, P39168, P00837, P22767, P19675, P05793, P62620, P02373, P45390, P00582, P77146, P30958, P24233, P05640, P16921, P07006, P30017, P00496, P31223, P36541, P02372, P76372, P31550, P39182, P11668, P21499, P77718, P10444, P19245, P02371, P08178, P18843, P45578, P21888, P22786, P02367, P23893, P23882, P11648, P51001, P02379, P10121, P05020, P24231, P02427, P60757, P15002, P31663, P19494, P08193, P37051, P02424, P13036, P02429, P00274, P15640, P02414, P36997, P0A6A6, P07004, P02435, P32164, P77310, P27252, P13652, P52643, P02436, P15277, P77804, P31057, P30139, P11028, P80063, P21774, P08622, P04951, P02374, P15716, P03017, P37648, P00923, P04422, P11557, P16456, P07906, P09159, P15048, Q46856, P39377, P14374, P06128, P29464, P60716, P00453, P37192, P76492, P45464, P23887, P00495, P45803, P33363, P30849, P04036, P18274, P28635, P77774, P46853, P25521, P14175, P36658, P39287, P78258, P77348, P30746, P29209, P24186, P26650, P23865, P05459, P15040, P30125, P25528, P30856, P36996, P08186, P02901, P33398, P39831, P18400, P23836, P20752, P29015, P04693, P00859, P02339, P36979, P60560, P0A6T3, P23858, P05825, P09424, P00831, P39330, P15047, P76153, P23853, P04816, P33598, P02998, P27251, P25714, P21892, P37754, P37329, P28909, P37187, P21590, P28302, P09029, P02937, P55741, P25662, P15039, P23863, P27851, P00370, P23932, P02905, P07019, P76002, P75876, P37688, P03025, P78083, P52065, P39406, P77258, P30744, P61316, P77254, P24253, P39811, P07005, P11026, P40874, P36540, P00478, P02437, P75789, P36766, P03844, P37010, P26428, P37190, P24250, P77438, P06984, P27434, P37749, P10384, Q57261, P15770, P00501, P24247, P77734, P12996, P42641, Q47130, P60546, P06129, P24223, P75838, P43675, P28694, P75902, P09375, P76403, P76658, P25529, P25516, P15034, P09200, P10902, P06995, P00547, P29210, P00583, P06613, P0A6W9, P75802, P28904, P31803, P25661, P27511, P30126, P00470, P30177, P17952, P10443, P37665, P36671, P76351, P36950, P09028, P00832, P06999, P23331, P07862, P09170, P40120, P80449, P77486, P14189, P06992, P05054, P75864, P09158, P61949, P62768, P07024, P23929, P75844, P07913, P37666, P00373, P04982, P03842, P76536, P07014, P13035, P36559, P76055, P36539, P09030, P21504, P36767, P39169, P08756, P42617, P32661, P37765, P23827, P04381, P52054, P20082, P09147, P06988, P76367, P46143, P05797, P77150, P06983, P25397, P18133, P75790, P16244, P08956, P37634, P43329, P24229, P06968, P75743, P28242, P18783, P27291, P30138, P45467, P06975, P46885, P39199, P10440, P25745, P40681, P25437, P33648, P37760, P75805, P00894, P77695, P00510, P31222, P09830, P31059, P05826, P76258, P76569, P18198, P46880, P30977, P07001, P45391, P13024, P13009, P33635, P24176, P31142, P17112, P60752, Q93K97, P11458, P08331, P37620, Q46828, P13000, P26615, P33644, P02917, P33918, P25888, P19934, P77338, P13685, P28225, P09997, P40718, P27828, P23830, P08188, P03812, P52647, P37667, Q46918, P00482, P18401, P32052, P03841, P62623, P46889, P27190, P37026, P11666, P39164, P46130, P30860, P37188, P76576, P33921, P31221, P37687, P12281, P76506, P25894, P00893, P03843, P25663, P45571, P77552, P52635, P30137, P76494, P39099, P24201, P20083, P46132, P76034, P39315, P09323, P37163, P07011, P31465, P39321, P05194, P77225, P32691, P37902, P09371, P77484, P23486, P39290, P76008, P32165, P19677, P76270, P45396, P75950, P77247, P75915, P32175, P05828, Q59384, P27306, P05848, P45748, P31133, P39396, P06986, P05796, P10740, P33570, P46473, P28690, P32130, P17993, P39177, P31664, P23911, P43671, P30848, P21338, Q46920, P77392, P61320, P23003, P39202, P45533, P15042, P30010, P02943, P32126, P26282, P46186, P38521, P09053, P00642, P25907, P00562, P17580, P09152, P17994, P76277, P76504, P75947, P37096, P37066, P52049, P02914, Q46933, P22333, P29217, P07020, P15298, P03807, P37631, P33597, P37347, P08367, P07002, P28304, P52061, P39356, P37308, Q46871, P15302, P00363, P75914, Q46948, P22563, P37345, P11056, P05791, P33601, P28633, P08373, P42550, P17113, P77202, P31218, P37175, P32157, P29679, P24178, P29680, P75736, P22188, P45389, P76290, P55139, P21645, P17448, P55253, P37440, P36564, P24245, P76370, P36995, P45799, P33636, P32105, Q46837, P23909, P78067, P21169, P08390, P30748, P16680, P36680, P41407, P76110, P23930, P28692, P16095, P03018, P15977, P21829, P09148, P05021, P23483, P31658, P45847, P39286, P46860, P40191, P37350, 065938, P32680, P12008, P27303, P03817, P46930, P21507, P77499, P76550, P52083, P37346, P33016, P09551, P24251, P25519, P11721, P27292, P00928, P17445, P43672, P33650, P24218, P07604, P39335, P28637, P29745, 069415, P71295, P11603, P76272, P32099, P77455, P45426, P15484, P15028, P08323, P00550, P02918, P30870, P76503, P24183, P36672, P23874, P03818, P02978, P33349, P75783, P33916, Q46863, P27848, P23199, P25533, P36768, P19641, P76423, P18393, P27841, P03019, P45580, P08660, P61887, P39401, P23894, P23884, P33643, P19674, P00811, P08179, P40717, P07085, P18390, P75849, P33031, P37189, P39323, P22938, P10346, P37647, P23089, P76187, P24285, P75823, P37745, P76426, P28861, Q46872, P75958, P02924, P60340, Q47622, P32174, P03033, P32703, P43781, P75949, P15050, P37349, P76316, P25738, P11288, P24203, P10957, P76015, P08203, P37354, P27838, P17109, P34086, P76141, P31220, P27550, P51024, P46131, P28248, P31680, P37606, Q46893, Q46868, P08244, P16528, P20099, P39903, P07003, P77293, P45756, P24213, P21516, P37692, P75745, P32695, P37194, P27829, P76495, P45529, P52124, P75968, P00844, P11027, P52084, P33220, P33362, P77605, P22255, P00926, P26648, P30854, P33129, P32050, P15272, P06149, P32177, P75957, P11349, P77674, P32678, P76036, P30858, P12610, P23870, P36879, P37904, P39347, P18196, P17443, P36929, P31546, P26646, P03004, P31828, P05792, P30178, P33353, P29011, P30855, Q00191, P77561, P76496, P77252, P32721, P08338, P18775, P37330, P33940, P76422, P07676, Q46841, P45535, P30846, P06964, P23282, P39833, P33226, P76017, P52052, P45471, P03021, P23917, P11880, P60472, P36565, P77624, P07762, P28689, P06716, P22256, P45802, Q52280, P75913, P46474, P19635, P09391, P15038, P22997, Q57154, P08577, P75874, P76146, P24181, P22763, P27850, P77239, P37005, Q46814, P37626, P77562, P39835, P76256, P77500, P24205, P06712, P09454, P11257, P75793, P42908, P31475, P76014. A SwissProt accession number can be searched in in the UniProt protein database found at uniprot.org, e.g., to retrieve the name and/or sequence of the corresponding protein.

In some embodiments, a protein composition can include a heme-containing protein. In some embodiments, a protein composition can include one or more proteins selected from the group consisting of an androglobin, a cytoglobin, a globin E, a globin X, a globin Y, a hemoglobin, a leghemoglobin, a flavohemoglobin, Hell's gate globin I, a myoglobin, an erythrocruorin, a beta hemoglobin, an alpha hemoglobin, a protoglobin, a cyanoglobin, a cytoglobin, a histoglobin, a neuroglobins, a chlorocruorin, a truncated hemoglobin (e.g., HbN or HbO), a truncated 2/2 globin, a hemoglobin 3 (e.g., Glb3), a cytochrome, or a peroxidase.

In some embodiments, a protein composition can include carbohydrate polymers (e.g., beta-glucan, glycogen, xanthan, xylinan, gellan, curdlan, agarose, dextran, pullulan, teichoic acids, peptidoglycan (e.g., murein) or nucleic acid polymers (e.g., ribosomal RNA (rRNA), transfer RNA (tRNA), messenger RNA (mRNA), or genomic DNA), or other biopolymers.

In some embodiments, a protein composition can include a heterologously expressed protein. In some embodiments, a heterologously expressed protein may be from a species different from the host cell, for example from a eukaryote, an animal, a plant, an algae, a thermophile, a yeast, a bacteria, a protist or an archea. In some embodiments, a heterologously expressed protein can be any of the proteins described herein. In some embodiments, a heterologously expressed protein can be a heme-containing protein. In some embodiments, a heterologous protein has functional activity as a biocatalyst, as a food processing aid, an enzyme, as a flavor enhancer, a therapeutic, a sweetener, a pharmaceutical, a nutraceutical.

As described herein, maintaining a pH between 8.5 and 12.0 during a purification process can result in a protein composition having minimal off-flavors or off-odors such that the source of the protein (i.e., the microbe from which the protein was purified) is not readily identifiable. In some embodiments, such a protein composition provides minimal off-flavors or off-odors to a food product of which it is a part or to which it is added. In some embodiments, off-flavor and off-odor generation can be assessed using trained human panelists. The evaluations can involve eyeing, feeling, chewing, and/or tasting of the protein or a food product made with the protein, to judge appearance, color, integrity, texture, flavor, and mouth feel, etc. Panelists can be served samples under different colored lights (e.g., red or under white light). Samples can be assigned random three digit numbers and rotated in ballot position to prevent bias. Panelists can be asked to correctly pair two different sample replicate sets (e.g., A1, A2 vs. B1, B2) in a sample-blinded "tetrad" format. Panelists can be asked to correctly pair two different sample replicate sets (e.g., A1, A2, A3 vs. B1, B2, B3) in a sample-blinded "hexad" format. Sensory judgments can be scaled for "acceptance" or "likeability" or use special terminology. For example, letter scales (A for excellent, B for good, C for poor) or number scales can be used (1=dislike, 2=fair, 3=good; 4=very good; 5=excellent). A scale can be used to rate the overall acceptability or quality of the tested product or specific quality attributes such as beefiness, texture, and flavor. Panelists can be trained using specific sensory references (e.g., "toasted grain" against a commercially available cereal, or "fermented dairy" against a commercially available yogurt). Panelists can be given opportunity to comment on each sample and encouraged to rinse their mouths with water between samples.

In some embodiments, a protein composition described herein or a food product made with such proteins can be assessed based upon olfactometer readings. In various embodiments, the olfactometer can be used to assess odor concentration and odor thresholds, odor suprathresholds with comparison to a reference gas, hedonic scale scores to determine the degree of appreciation, or relative intensity of odors. In some embodiments, an olfactometer allows the training and automatic evaluation of expert panels.

In some embodiments, a protein composition can be used as a biocatalyst. For example, the substrate of an enzyme present in a protein composition can be added to the composition and, after incubation, the product of the enzymatic reaction can be isolated. In some embodiments, multiple substrates and cofactors may be added to support the production of one or more products of interest. In some embodiments, the products of the reaction can a pharmaceutical, a pharmaceutical intermediate, a flavor compound, a cofactor, a modified sugar, an amino acid, a monomer or any other compound of interest.

In some embodiments, a protein composition can be used for in vitro transcription and translation of proteins. In some embodiments, a protein composition can be used for in vitro translation of proteins. Addition of template DNA, energy system and amino acids can lead to production of the target protein (see for example recent reviews such as Mini-review: In vitro Metabolic Engineering for Biomanufacturing of High-value Products Computational and Structural Biotechnology Journal, 2017, Volume 15, 161-167). In some embodiments, a protein composition can be used to incorporate unnatural amino acids into proteins using in vitro translation.

In some embodiments, a protein composition (e.g., produced by a method described herein) can comprise total cellular protein. In some embodiments, a protein composition (e.g., produced by a method described herein) can comprise a plurality of proteins. For example, a protein composition can comprise 5 or more (e.g., 10, 15, 20, 30, 50, 100, 200, 300, 400, or 500) different proteins. In some embodiments, at least 25% (e.g., at least 30%, 40%, 50%, 60%, 70%, 80%, or 90%) of the protein in a protein composition is functional, as described herein.

Food Products

Any of the protein compositions described herein can be used as or in one or more food products. Protein compositions as described herein be used in a variety of food products, including, for example, protein supplements (e.g., protein powders or shakes), meal replacements, or baked goods, or to replace all or a portion of an animal protein (e.g., from cows, pigs, poultry, lamb, or fish) in a food product that mimics an animal derived food product (e.g., a dairy replica (e.g., a milk replica, a cheese replica), an egg replica (e.g., an albumen replica, an egg yolk replica, a whole egg replica, or a scrambled egg replica) or meat replica such as a beef replica, a chicken replica, a pork replica, a fish replica, a lamb replica, any of which can be in the form of a ground meat replica, a whole cut replica (e.g., a roast replica, steak replica, a breast replica, wing replica, a thigh replica, a filet replica, or a chop replica), an organ replica, or a sausage replica. In some embodiments, a protein composition can be used as a meat extender.

In some embodiments, a protein composition as described herein can have minimal off-flavors or off-odors such that the source of the protein (i.e., the microbe from which the protein was purified) is not readily identifiable and provide minimal off-flavors or off-odors to the food product. In some embodiments, off-flavor and off-odor generation can be assessed using trained human panelists. The evaluations can involve eyeing, feeling, chewing, and/or tasting of the protein or a food product made with the protein, to judge appearance, color, integrity, texture, flavor, and mouth feel, etc. Panelists can be served samples under different colored lights (e.g., red or under white light). Samples can be assigned random three digit numbers and rotated in ballot position to prevent bias. Sensory judgments can be scaled for "acceptance" or "likeability" or use special terminology. For example, letter scales (A for excellent, B for good, C for poor) or number scales can be used (1=dislike, 2=fair, 3=good; 4=very good; 5=excellent). A scale can be used to rate the overall acceptability or quality of the tested product or specific quality attributes such as beefiness, texture, and flavor. Panelists can be given opportunity to comment on each sample and encouraged to rinse their mouths with water between samples.

In some embodiments, a protein composition described herein or a food product made with such proteins can be assessed based upon olfactometer readings. In various embodiments, the olfactometer can be used to assess odor concentration and odor thresholds, odor suprathresholds with comparison to a reference gas, hedonic scale scores to determine the degree of appreciation, or relative intensity of odors. In some embodiments, an olfactometer allows the training and automatic evaluation of expert panels.

In some embodiments, a protein composition described herein can comprise least about 35% (e.g. at least about 40%, 50%, 55%, 60%, 65%, 70%, 75%, 80%, 85%, 90%, 95%, or 99%) by dry weight molecules larger than about 500 Da (e.g., about 1 kDa, 2 kDa, 3 kDa, 5 kDa, 10 kDa, 30 kDa, or 50 kDa). In some embodiments, a protein composition described herein can comprise least about 35% (e.g. at least 40%, 50%, 55%, 60%, 65%, 70%, 75%, 80%, 85%, 90%, 95%, or 99%) by dry weight molecules between about 500 Da (e.g., about 1 kDa, 2 kDa, 3 kDa, 5 kDa, 10 kDa, 30 kDa, or 50 kDa) and about 200 kDa (e.g., 300 kDa, 400 kDa, or 500 kDa). In some embodiments, at least about 35% (e.g. at least 40%, 50%, 55%, 60%, 65%, 70%, 75%, 80%, 85%, 90%, 95%, or 99%) of the polypeptides (also called proteins) in a protein composition described herein can fall between about 500 Da (e.g., about 1 kDa, 2 kDa, 3 kDa, 5 kDa, kDa, 30 kDa, or 50 kDa) and about 200 kDa (e.g., 300 kDa, 400 kDa, or 500 kDa). In some embodiments, a protein composition described herein can exclude one or more small molecules that contribute to off-odors or off-flavors (e.g., a protein composition can comprise no cysteine, 1-Hexanol; 2-Butylfuran; 2-methyl-2-Pentenal; 3-Octanone; Ethyl-Acetate; 2-Ethyl-Furan; 2-pentyl-Furan; Pyrazine; 1-Decanol; Acetophenone; 1-Nonanol; 2,5-Dimethyl-Pyrazine; Dodecanal; Benzeneacetaldehyde; Nonanal; Butyrolactone; Octanal; 2-Decanone; Hexanal; 2-Nonanone; Benzaldehyde; Heptanal; 2-Octanone; Furfural; 2-Heptanone; Pentanal). A person of ordinary skill in the art can determine the total amount of small molecules or the amount of a particular small molecule in a sample, using, e.g., GCMS.

In some embodiments, a protein composition described herein can comprise a molecule that contribute to off-odors or off-flavors (e.g., cysteine, 1-Hexanol; 2-Butylfuran; 2-methyl-2-Pentenal; 3-Octanone; Ethyl-Acetate; 2-Ethyl-Furan; 2-pentyl-Furan; Pyrazine; 1-Decanol; Acetophenone; 1-Nonanol; 2,5-Dimethyl-Pyrazine; Dodecanal; Benzeneacetaldehyde; Nonanal; Butyrolactone; Octanal; 2-Decanone; Hexanal; 2-Nonanone; Benzaldehyde; Heptanal; 2-Octanone; Furfural; 2-Heptanone; Pentanal). A person of ordinary skill in the art can determine the amount of a particular small molecule in a sample, using, e.g., GCMS.

In some embodiments, a protein composition described herein can have a buffering capacity of less than about 2.5 mmol NaOH per gram dry solids (e.g., less than about 2.4, 2.3, 2.2, 2.1, 2.0, 1.9, 1.8. 1.7, 1.6, 1.5, 1.4, 1.3, 1.2, 1.1, 1.0, 0.5, or 0.1 mmol NaOH per gram dry solids). The buffer capacity can be determined by pH titration of a 2% (w/v) suspension or solution, measuring the mmol of NaOH that would be required to move the suspension or solution from pH 3.0 to pH 12.0.

In some embodiments, a protein composition described herein can be in the form of a solution. In some embodiments, a protein composition can be in the form of a solid (e.g., a solution that has been freeze-dried or spray-dried). In some embodiments, a protein composition described herein can be pasteurized. For example, a protein composition can be pasteurized by heat treatment, high temperature short time pasteurization, pulsed electric field, high pressure pasteurization, UV irradiation, gamma irradiation, or microfiltration. In some embodiments, one or more antimicrobials (e.g., polylysine) can be included in a protein composition described herein.

In some embodiments, a protein composition described herein can be used as a biocatalyst. For example, the substrate of an enzyme present in a protein composition described herein can be added to the composition and after incubation the product of the enzymatic reaction can be isolated. In some embodiments, multiple substrates and cofactors may be added to support the production of one or more products of interest. In some embodiments, the products of the reaction can a pharmaceutical, a pharmaceutical intermediate, a flavor compound, a cofactor, a modified sugar, an amino acid, a monomer or any other compound of interest.

In some embodiments, a protein composition can be used for in vitro transcription and translation of proteins. In some embodiments, a protein composition can be used for in vitro translation of proteins. Addition of the template DNA, energy system and amino acids leads to production of the target protein (see for example recent reviews such as Mini-review: In vitro Metabolic Engineering for Biomanufacturing of High-value Products Computational and Structural Biotechnology Journal, 2017, Volume 15, 161-167). In some embodiments, a protein composition can be used to incorporate unnatural amino acids into proteins using in vitro translation.

Food products containing any of protein compositions described herein can be used as a base for formulating a variety of additional food products, including meat replicas, soup bases, stew bases, snack foods, bouillon powders, bouillon cubes, flavor packets, or frozen food products. Meat replicas can be formulated, for example, as hot dogs, burgers, ground meat, sausages, steaks, filets, organs (such as liver, heart, tongue, kidney, sweetmeats, etc.) roasts, breasts, thighs, wings, meatballs, meatloaf, bacon, strips, fingers, nuggets, cutlets, or cubes.

Exemplary food products are described in U.S. Pat. Nos. 10,039,306, 9,700,067, and 9,011,949; U.S. Patent Application Publication Nos. US20150305361A1, US20170172169A1, US20150289541A1, and US20170188612A1, each of which is incorporated by reference in its entirety.

In some embodiments, a food product can be a protein supplement. For example, in some embodiments, a protein composition as disclosed herein can be part of a protein powder, which can be used in protein shakes, smoothies, baking, and the like.

In some embodiments, a food product can include a muscle replica. In some embodiments, a food product can include an adipose replica. In some embodiments, a food product can include a muscle replica and an adipose replica. In some embodiments, a food product that includes a muscle replica and an adipose replica can also be called a meat replica.

In some embodiments, a food product can be a dairy replica. In some embodiments, a food product can be a cheese replica. In some embodiments, a food product can be a milk replica. In some embodiments, a milk replica can be used to make a cheese replica.

In some embodiments, a food product can be an egg replica. In some embodiments, a food product can be a whole egg replica (e.g., with a yolk replica partitioned from an albumen replica). In some embodiments, a food product can be an egg yolk replica. In some embodiments, a food product can be an albumen replica. In some embodiments, a food product can be a scrambled egg replica (e.g., a mixture of an egg yolk replica and an albumen replica).

A food product can include one or more proteins (e.g., a protein composition as described herein, a commercially available protein, a protein purified by any method known in the art, or a combination thereof). In some embodiments, a food product can include any of the protein compositions as described herein. In some embodiments, a food product can include any of the protein compositions as described herein in addition to a commercially available protein (e.g., soy protein concentrate, soy protein isolate, casein, whey, wheat gluten, pea vicilin, or pea legumin). In some embodiments, a food product can include any of the protein compositions as described herein, in addition to one or more proteins purified by any method known in the art.

One or more proteins (e.g., a protein composition as described herein, a commercially available protein, a protein purified by any method known in the art, or a combination thereof) can be present in an amount of about 0.1% to about 100% by weight (e.g., about 0.1% to about 1%, about 1% to about 5%, about 5% to about 10%, about 1% to about 10%, about 10% to about 20%, about 20% to about 30%, about 30% to about 40%, about 40% to about 50%, about 50% to about 60%, about 60% to about 70%, about 70% to about 80%, about 80% to about 90%, about 90% to about 100% about 10% to about 30%, about 30% to about 50%, about 50% to about 70%, about 70% to about 90%, about 0.1% to about 20%, about 20% to about 40%, about 40% to about 60%, about 60% to about 80%, about 80% to about 100%, about 0.1% to about 33%, about 33% to about 66%, about 66% to about 100, about 0.1% to about 50%, or about 50% to about 100%) of a food product (e.g., a meat replica, a beef-like food product, a chicken-like food product, a pork-like food product, a fish-like food product, a beef food product, a chicken food product, a pork food product, or a fish food product).

Figure 8:
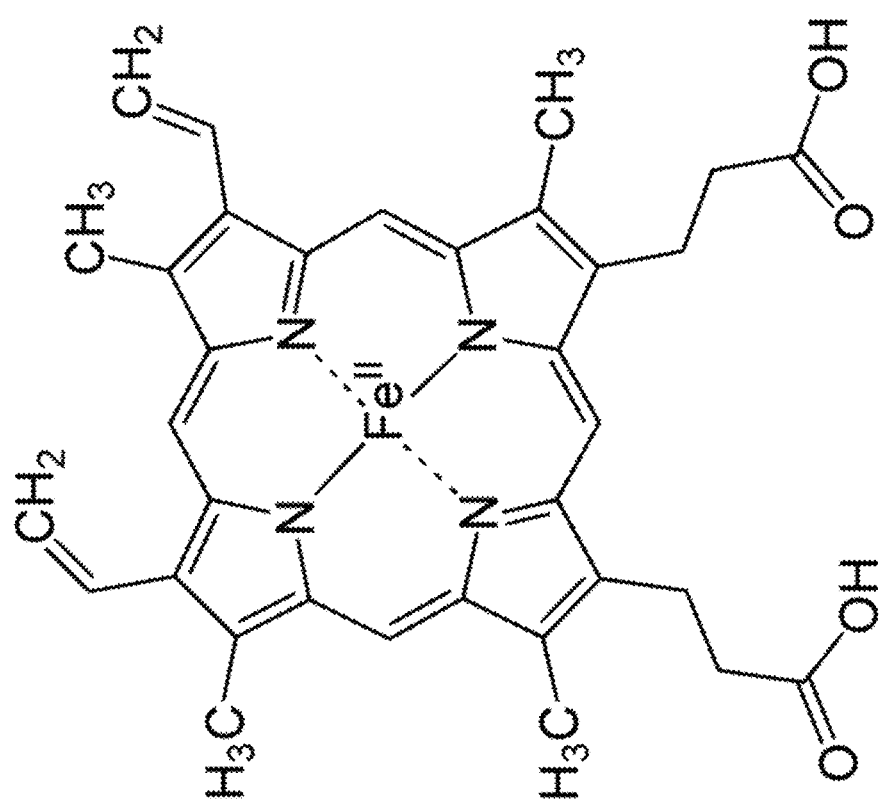
FIG. 8 is a structure of Heme B.

Any of the food products described herein can include an iron complex (e.g., ferrous chlorophyllin (e.g., CAS No. 69138-22-3), iron pheophorbide (e.g., CAS No. 15664-29-6), an iron salt (e.g. iron sulfate (e.g., any of CAS Nos. 7720-78-7, 17375-41-6, 7782-63-0, or 10028-22-5) iron gluconate (e.g., any of CAS Nos. 299-29-6, 22830-45-1, or 699014-53-4), iron citrate (e.g., any of CAS Nos. 3522-50-7, 2338-05-8, or 207399-12-0), ferric EDTA (e.g., CAS No. 17099-81-9) or a heme moiety such as a heme (e.g., heme A (e.g., CAS No. 18535-39-2), heme B (e.g. CAS No. 14875-96-8), heme C (e.g., CAS No. 26598-29-8), heme O (e.g., CAS No. 137397-56-9), heme I, heme M, heme D, heme S) or a heme-containing protein). For example, a structure of heme B is shown in FIG. 8.

In some embodiments, the heme moiety is a heme non-covalently or covalently bound to a protein or polypeptide as a heme-containing protein. In some embodiments, the protein or polypeptide is a globin. In some embodiments, the globin is selected from the group consisting of an androglobin, a cytoglobin, a globin E, a globin X, a globin Y, a hemoglobin, a myoglobin, a leghemoglobin, an erythrocruorin, a beta hemoglobin, an alpha hemoglobin, a protoglobin, a cyanoglobin, a cytoglobin, a histoglobin, a neuroglobins, a chlorocruorin, a truncated hemoglobin, a truncated 2/2 globin, and a hemoglobin 3. In some embodiments, the protein or polypeptide is a non-animal protein or polypeptide. In some embodiments, the protein or polypeptide is a plant, fungal, algal, archaeal, or bacterial protein. In some embodiments, the protein or polypeptide is not natively expressed in plant, fungal, algal, archaeal, or bacterial cells. In some embodiments, the protein or polypeptide comprises an amino acid sequence having at least 50% sequence identity (e.g., at least 60%, 70%, 80%, 90%, or 95% sequence identity) to a polypeptide set forth in SEQ ID NOs. 1-27.

Heme-containing proteins that can be used in any of the food products described herein can be from mammals (e.g., farms animals such as cows, goats, sheep, pigs, ox, or rabbits), birds, plants, algae, fungi (e.g., yeast or filamentous fungi), ciliates, or bacteria. For example, a heme-containing protein can be from a mammal such as a farm animal (e.g., a cow, goat, sheep, pig, ox, or rabbit) or a bird such as a turkey or chicken. Heme-containing proteins can be from a plant such as *Nicotiana tabacum* or *Nicotiana sylvestris* (tobacco); *Zea mays* (corn), *Arabidopsis thaliana*, a legume such as *Glycine max* (soybean), *Cicer arietinum* (garbanzo or chick pea), *Pisum sativum* (pea) varieties such as garden peas or sugar snap peas, *Phaseolus vulgaris* varieties of common beans such as green beans, black beans, navy beans, northern beans, or pinto beans, *Vigna unguiculata* varieties (cow peas), *Vigna radiata* (Mung beans), *Lupinus albus* (lupin), or *Medicago sativa* (alfalfa); *Brassica napus* (canola); *Triticum* sps. (wheat, including wheat berries, and spelt); *Gossypium hirsutum* (cotton); *Oryza sativa* (rice); *Zizania* sps. (wild rice); *Helianthus annuus* (sunflower); *Beta vulgaris* (sugarbeet); *Pennisetum glaucum* (pearl millet); *Chenopodium* sp. (*quinoa*); *Sesamum* sp. (sesame); *Linum usitatissimum* (flax); or *Hordeum vulgare* (barley). Heme-containing proteins can be isolated from fungi such as *Saccharomyces cerevisiae*, *Pichia pastoris*, *Magnaporthe oryzae*, *Fusarium graminearum*, *Aspergillus oryzae*, *Trichoderma reesei*, *Myceliopthera thermophile*, *Kluyvera lactis*, or *Fusarium oxysporum*. Heme-containing proteins can be isolated from bacteria such as *Escherichia coli*, *Bacillus subtilis*, *Bacillus licheniformis*, *Bacillus megaterium*, *Synechocystis* sp., *Aquifex aeolicus*, *Methylacidiphilum infernorum*, or thermophilic bacteria such as *Thermophilus*. The sequences and structure of numerous heme-containing proteins are known. See for example, Reedy, et al., Nucleic Acids Research, 2008, Vol. 36, Database issue D307-D313 and the Heme Protein Database available on the world wide web at hemeprotein.info/heme.php.

For example, a non-symbiotic hemoglobin can be from a plant selected from the group consisting of soybean, sprouted soybean, alfalfa, golden flax, black bean, black eyed pea, northern, garbanzo, moong bean, cowpeas, pinto beans, pod peas, quinoa, sesame, sunflower, wheat berries, spelt, barley, wild rice, or rice.

Any of the heme-containing proteins described herein that can be used for producing food products can have at least 70% (e.g., at least 75%, 80%, 85%, 90%, 95%, 97%, 98%, 99%, or 100%) sequence identity to the amino acid sequence of the corresponding wild-type heme-containing protein or fragments thereof that contain a heme-binding motif. For example, a heme-containing protein can have at least 70% sequence identity to an amino acid sequence, including a non-symbiotic hemoglobin such as that from *Vigna radiata* (SEQ ID NO:1), *Hordeum vulgare* (SEQ ID NO:5), *Zea mays* (SEQ ID NO:13), *Oryza sativa* subsp. *japonica* (rice) (SEQ ID NO:14), or *Arabidopsis thaliana* (SEQ ID NO:15), a Hell's gate globin I such as that from *Methylacidiphilum infernorum* (SEQ ID NO:2), a flavohemoprotein such as that from *Aquifex aeolicus* (SEQ ID NO:3), a leghemoglobin such as that from *Glycine max* (SEQ ID NO:4), *Pisum sativum* (SEQ ID NO:16), or *Vigna unguiculata* (SEQ ID NO:17), a heme-dependent peroxidase such as from *Magnaporthe oryzae*, (SEQ ID NO:6) or *Fusarium oxysporum* (SEQ ID NO:7), a cytochrome c peroxidase from *Fusarium graminearum* (SEQ ID NO:8), a truncated hemoglobin from *Chlamydomonas moewusii* (SEQ ID NO:9), *Tetrahymena pyriformis* (SEQ ID NO:10, group I truncated), *Paramecium caudatum* (SEQ ID NO:11, group I truncated), a hemoglobin from *Aspergillus niger* (SEQ ID NO:12), or a mammalian myoglobin protein such as the *Bos taurus* (SEQ ID NO:18) myoglobin, *Sus scrofa* (SEQ ID NO:19) myoglobin, *Equus caballus* (SEQ ID NO:20) myoglobin, a heme-protein from *Nicotiana benthamiana* (SEQ ID NO:21), *Bacillus subtilis*

(SEQ ID NO:22), *Corynebacterium glutamicum* (SEQ ID NO:23), *Synechocystis* PCC6803 (SEQ ID NO:24), *Synechococcus* sp. PCC 7335 (SEQ ID NO:25), *Nostoc commune* (SEQ ID NO:26), or *Bacillus megaterium* (SEQ ID NO: 27).

The percent identity between two amino acid sequences can be determined as follows. First, the amino acid sequences are aligned using the BLAST 2 Sequences (Bl2seq) program from the stand-alone version of BLASTZ containing BLASTP version 2.0.14. This stand-alone version of BLASTZ can be obtained from Fish & Richardson's web site (e.g., fr.com/blast/) or the U.S. government's National Center for Biotechnology Information web site (ncbi.nlm.nih.gov). Instructions explaining how to use the Bl2seq program can be found in the readme file accompanying BLASTZ. Bl2seq performs a comparison between two amino acid sequences using the BLASTP algorithm. To compare two amino acid sequences, the options of Bl2seq are set as follows: -i is set to a file containing the first amino acid sequence to be compared (e.g., C:\seq1.txt); -j is set to a file containing the second amino acid sequence to be compared (e.g., C:\seq2.txt); -p is set to blastp; -o is set to any desired file name (e.g., C:\output.txt); and all other options are left at their default setting. For example, the following command can be used to generate an output file containing a comparison between two amino acid sequences: C:\Bl2seq-i c:\seq1.txt-j c:\seq2.txt-p blastp-o c:\output.txt. If the two compared sequences share homology, then the designated output file will present those regions of homology as aligned sequences. If the two compared sequences do not share homology, then the designated output file will not present aligned sequences. Similar procedures can be following for nucleic acid sequences except that blastn is used.

Once aligned, the number of matches is determined by counting the number of positions where an identical amino acid residue is presented in both sequences. The percent identity is determined by dividing the number of matches by the length of the full-length polypeptide amino acid sequence followed by multiplying the resulting value by 100. It is noted that the percent identity value is rounded to the nearest tenth. For example, 78.11, 78.12, 78.13, and 78.14 is rounded down to 78.1, while 78.15, 78.16, 78.17, 78.18, and 78.19 is rounded up to 78.2. It also is noted that the length value will always be an integer.

It will be appreciated that a number of nucleic acids can encode a polypeptide having a particular amino acid sequence. The degeneracy of the genetic code is well known to the art; i.e., for many amino acids, there is more than one nucleotide triplet that serves as the codon for the amino acid. For example, codons in the coding sequence for a given enzyme can be modified such that optimal expression in a particular species (e.g., bacteria or fungus) is obtained, using appropriate codon bias tables for that species.

In some embodiments, heme-containing proteins can be extracted from a production organism (e.g., extracted from animal tissue, or plant, fungal, algal, or bacterial biomass, or from the culture supernatant for secreted proteins) or from a combination of production organisms (e.g., multiple plant species). Leghemoglobin is readily available as an unused by-product of commodity legume crops (e.g., soybean, alfalfa, or pea). The amount of leghemoglobin in the roots of these crops in the United States exceeds the myoglobin content of all the red meat consumed in the United States.

In some embodiments, extracts of heme-containing proteins include one or more non-heme-containing proteins from the source material (e.g., other animal, plant, fungal, algal, or bacterial proteins) or from a combination of source materials (e.g., different animal, plant, fungi, algae, or bacteria). For example, a heme-containing protein can be part of a protein composition as described herein.

In some embodiments, heme-containing proteins can be provided in a food product in a form that is not part of a protein composition as described herein. In some embodiments, heme-containing proteins can be purified by any method known in the art.

Proteins can be separated on the basis of their molecular weight, for example, by size exclusion chromatography, ultrafiltration through membranes, or density centrifugation. In some embodiments, the proteins can be separated based on their surface charge, for example, by isoelectric precipitation, anion exchange chromatography, or cation exchange chromatography. Proteins also can be separated on the basis of their solubility, for example, by ammonium sulfate precipitation, isoelectric precipitation, surfactants, detergents or solvent extraction. Proteins also can be separated by their affinity to another molecule, using, for example, hydrophobic interaction chromatography, reactive dyes, or hydroxyapatite. Affinity chromatography also can include using antibodies having specific binding affinity for the protein (e.g., the heme-containing protein), nickel NTA for His-tagged recombinant proteins, lectins to bind to sugar moieties on a glycoprotein, or other molecules which specifically binds the protein.

Heme-containing proteins also can be recombinantly produced using polypeptide expression techniques (e.g., heterologous expression techniques using bacterial cells, insect cells, fungal cells such as yeast, plant cells such as tobacco, soybean, or *Arabidopsis*, or mammalian cells). In some cases, standard polypeptide synthesis techniques (e.g., liquid-phase polypeptide synthesis techniques or solid-phase polypeptide synthesis techniques) can be used to produce heme-containing proteins synthetically. In some cases, in vitro transcription-translation techniques can be used to produce heme-containing proteins.

In some embodiments, a heme-containing protein is part of a total cellular protein composition as described herein.

A heme-containing protein can be present in a food product (e.g., a dairy replica, a cheese replica, an egg replica, a meat replica, a beef-like food product, a chicken-like food product, a pork-like food product, a fish-like food product, a beef food product, a chicken food product, a pork food product, or a fish food product) in an amount of about to about 5% (wt heme-containing protein/wt food product) (e.g., about 0.005% to about 0.01%, about 0.01% to about 0.1%, about 0.1% to about 0.5%, about 0.5% to about 1%, about 1% to about 2%, about 2% to about 3%, about 3% to about 4%, about 4% to about 5%, about 1% to about 3%, about 3% to about 5%, or about 1% to about 5% (wt/wt)). In some embodiments, a heme-containing protein can be a non-animal heme-containing protein. In some embodiments, a heme-containing protein can be an algal, bacterial, fungal, plant, or Archaeal heme-containing protein.

A heme can be present in a food product (e.g., a dairy replica, a cheese replica, an egg replica, a meat replica, a beef-like food product, a chicken-like food product, a pork-like food product, a fish-like food product, a beef food product, a chicken food product, a pork food product, or a fish food product) in an amount of about 0.00005% to about 2% (wt heme/wt food product) (e.g., about 0.00005% to about 0.0001%, about 0.0001% to about 0.0005%, about 0.0005% to about 0.001%, about 0.001% to about 0.005%, about to about 0.01%, about 0.01% to about 0.05%, about 0.05% to about 0.1%, about to about 0.5%, about 0.5% to about 1%, about 0.1% to about 0.2%, about 0.2% to about 0.4%, about 0.4% to about 0.6%, about 0.6% to about 0.8%, about 0.8% to about 1%, about 1% to about 2%, about 1.0% to about 1.2%, about 1.2% to about 1.4%, about 1.4% to about 1.6%, about 1.6% to about 1.8%, or about 1.8% to about 2.0% (wt/wt)).

Food products described herein can be free of or substantially free of some types of animal products (e.g., animal heme-containing proteins, or all animal products).

In some embodiments, a food product can be substantially soy-free, substantially wheat-free, substantially yeast-free, substantially MSG-free, substantially free of protein hydrolysis products, soy-free, wheat-free, yeast-free, MSG-free, and/or free of protein hydrolysis products, and can taste meaty, highly savory, and without off odors or flavors.

In some embodiments, a food product can include one or more flavor precursors. Suitable flavor precursors include sugars, sugar alcohols, sugar derivatives, oils (e.g., vegetable oils), free fatty acids, alpha-hydroxy acids, dicarboxylic acids, amino acids and derivatives thereof, nucleosides, nucleotides, vitamins, peptides, protein hydrolysates, extracts, phospholipids, lecithin, and organic molecules. Non-limiting examples of such flavor precursors are provided in Table 1.

TABLE 1

Flavor Precursor Molecules

Sugars, sugar alcohols, sugar acids, and sugar derivatives: glucose, fructose, ribose, sucrose, arabinose, glucose-6-phosphate, fructose-6-phosphate, fructose 1,6-diphosphate, inositol, maltose, molasses, maltodextrin, glycogen, galactose, lactose, ribitol, gluconic acid and glucuronic acid, amylose, amylopectin, or xylose Oils: coconut oil, mango oil, sunflower oil, cottonseed oil, safflower oil, rice bran oil, cocoa butter, palm fruit oil, palm oil, soybean oil, canola oil, corn oil, sesame oil, walnut oil, flaxseed, jojoba oil, castor, grapeseed oil, peanut oil, olive oil, algal oil, oil from bacteria or fungi Free fatty acids: caprylic acid, capric acid, lauric acid, myristic acid, palmitic acid, palmitoleic acid, stearic, oleic acid, linoleic acid, alpha linolenic acid, gamma linolenic acid, arachidic acid, arachidonic acid, behenic acid, or erucic acid Amino acids and derivatives thereof: cysteine, cystine, a cysteine sulfoxide, allicin, selenocysteine, methionine, isoleucine, leucine, lysine, phenylalanine, threonine, tryptophan, 5-hydroxytryptophan, valine, arginine, histidine, alanine, asparagine, aspartate, glutamate, glutamine, glycine, proline, serine, or tyrosine Nucleosides and Nucleotides: inosine, inosine monophosphate (IMP), guanosine, guanosine monophosphate (GMP), adenosine, adenosine monophosphate (AMP)

Vitamins: thiamine, vitamin C, Vitamin D, Vitamin B6, or Vitamin E

Misc: phospholipid, lecithin, pyrazine, creatine, pyrophosphate

Acids: acetic acid, alpha hydroxy acids such as lactic acid or glycolic acid, tricarboxylic acids such as citric acid, dicarboxylic acids such as succinic acid or tartaric acid Peptides and protein hydrolysates: glutathione, vegetable protein hydrolysates, soy protein hydrolysates, yeast protein hydrolysates, algal protein hydrolysates, meat protein hydrolysates Extracts: a malt extract, a yeast extract, and a peptone Food products described herein can be packaged in various ways, including being sealed within individual packets or shakers, such that the composition can be sprinkled or spread on top of a food product before or during cooking.

Food products described herein can include additional ingredients including food-grade oils such as canola, corn, sunflower, soybean, olive or coconut oil, seasoning agents such as edible salts (e.g., sodium or potassium chloride) or herbs (e.g., rosemary, thyme, basil, sage, or mint), flavoring agents, proteins (e.g., soy protein isolate, wheat glutin, pea vicilin, and/or pea legumin), protein concentrates (e.g., soy protein concentrate), emulsifiers (e.g., lecithin), gelling agents (e.g., k-carrageenan or gelatin), fibers (e.g., bamboo filer or inulin), or minerals (e.g., iodine, zinc, and/or calcium).

Food products described herein also can include a natural coloring agent such as turmeric or beet juice, or an artificial coloring agent such as azo dyes, triphenylmethanes, xanthenes, quinines, indigoids, titanium dioxide, red #3, red #40, blue #1, or yellow #5.

Food products described herein also can include meat shelf life extenders such as carbon monoxide, nitrites, sodium metabisulfite, Bombal, vitamin E, rosemary extract, green tea extract, catechins and other anti-oxidants.

In some embodiments, a food product including a heme, a flavor precursor, or a combination thereof, when cooked, can result in the increased production of one or more (e.g., 2, 3, 4, 5, 6, 7, 8, 9, 10, or more) volatile compounds associated with a meat-like aroma. Non-limiting examples of volatile compounds associated with a meat-like aroma are presented in the attached Appendix 1, each of which has been associated with meat aroma, such as the aroma of beef, chicken, or pork, as supported by the listed references. In some embodiments, cooking any of the food products as described herein can result in increased production of one or more (e.g., 2, 3, 4, 5, 6, 7, 8, 9, 10, 12, 14, 16, 18, 20 or more) volatile compounds selected from the group consisting of (E)-2-decenal, (E)-2-heptenal, (E)-2-nonenal, (E)-2-octen-1-ol, (E)-2-octenal, (E)-3-penten-2-one, (E,E)-2,4-hexadienal, 1-(2-furanyl)-ethanone, 1-(acetyloxy)-2-propanone, 1-heptanol, 1-hexanol, 1-octanol, 1-penten-3-one, 1-undecanol, 2,3-dimethyl-pyrazine, 2,3-hexanedione, 2,4-dimethyl-thiazole, 2,5-dimethyl-pyrazine, 2,6-dimethylpyrazine, 2-acetyl-1-pyrroline, 2-acetylthiazole, 2-butanol, 2-butanone, 2-butenal, 2-heptanone, 2-hydroxy-benzaldehyde, 2-methyl-2(E)-butenal, 2-methyl-3-furanthiol, 2-methyl-butanal, 2-methyl-propanal, 2-methyl-thiazole, 2-n-butyl furan, 2-pentyl-furan, 2-propenal, 2-undecanone, 3-ethyl-pyridine, 3-methyl-2-butenal, 3-methyl-3-buten-2- one, 3-methyl-butanal, 3-methyl-hexane, 3-methyl-thiophene, 4-pentenal, 5-methyl-2-thiophenecarboxaldehyde, 6-methyl-5-hepten-2-one, acetaldehyde, acetone, acetophenone, benzaldehyde, benzeneacetaldehyde, bis(2-methyl-3-furyl)disulfide, dimethyl disulfide, dimethyl trisulfide, dodecanal, E-2-undecenal, ethyl-pyrazine, furan, furfural, heptanal, hexanal, methional, methyl-thiirane, propyl mercaptan, pyrazine, pyridine, tetradecane, tetrahydro-2H-pyran-2-one, and trimethyl-pyrazine.

Food products described herein can include a lipid (also called a fat) component. Lipids can be isolated and/or purified and can be in the form of triglycerides, monoglycerides, diglycerides, free fatty acids, sphingosides, glycolipids, phospholipids, or oils, or assemblies of such lipids (e.g., membranes, lecithin, lysolecithin, or fat droplets containing a small amount of lipid in a bulk water phase). In some embodiments, lipid sources are oils obtained from non-animal sources (e.g., oils obtained from plants, algae, fungi such as yeast or filamentous fungi, seaweed, bacteria, or Archae), including genetically engineered bacteria, algae, archaea or fungi. Non-limiting examples of plant oils include corn oil, olive oil, soy oil, peanut oil, walnut oil, almond oil, sesame oil, cottonseed oil, rapeseed oil, canola oil, safflower oil, sunflower oil, flax seed oil, palm oil, palm kernel oil, coconut oil, babassu oil, shea butter, mango butter, cocoa butter, wheat germ oil, or rice bran oil; or margarine. Oils can be hydrogenated (e.g., a hydrogenated vegetable oil) or non-hydrogenated.

In some embodiments, a lipid can be triglycerides, monoglycerides, diglycerides, free fatty acids, sphingosides, glycolipids, lecithin, lysolecithin, phospholipids such as phosphatidic acids, lysophosphatidic acids, phosphatidyl cholines, phosphatidyl inositols, phosphatidyl ethanolamines, or phosphatidyl serines; sphingolipids such as sphingomyelins or ceramides; sterols such as stigmasterol, sitosterol, campesterol, brassicasterol, sitostanol, campestanol, ergosterol, zymosterol, fecosterol, dinosterol, lanosterol, cholesterol, or episterol; lipid amides, such as N-palmitoyl proline, N-stearoyl glycine, N-palmitoyl glycine, N-arachidonoyl glycine, N-palmitoyl taurine, N-arachidonoyl histidine, or anandamide; free fatty acids such as palmitoleic acid, palmitic acid, myristic acid, lauric acid, myristoleic acid, caproic acid, capric acid, caprylic acid, pelargonic acid, undecanoic acid, linoleic acid (C18:2), eicosanoic acid (C22:0), arachidonic acid (C20:4), eicosapentanoic acid (C20:5), docosapentaenoic acid (C22:5), docosahexanoic acid (C22:6), erucic acid (C22:1), conjugated linoleic acid, linolenic acid (C18:3), oleic acid (C18:1), elaidic acid (trans isomer of oleic acid), trans-vaccenic acid (C18:1 trans 11), or conjugated oleic acid; or esters of such fatty acids, including monoacylglyceride esters, diacylglyceride esters, and triacylglyceride esters of such fatty acids.

Lipids can comprise phospholipids, lipid amides, sterols, or neutral lipids. The phospholipids can comprise a plurality of amphipathic molecules comprising fatty acids, glycerol and polar groups. In some embodiments, the polar groups are, for example, choline, ethanolamine, serine, phosphate, glycerol-3-phosphate, inositol or inositol phosphates. In some embodiments, lipids are, for example, sphingolipids, ceramides, sphingomyelins, cerebrosides, gangliosides, ether lipids, plasmalogens or pegylated lipids.

In some embodiments, a fat can be present in an amount of about 0.1% to about 95% by weight (e.g., about 0.1% to about 1%, about 1% to about 5%, about 5% to about 10%, about 1% to about 10%, about 10% to about 20%, about 20% to about 30%, about 30% to about 40%, about 40% to about 50%, about 50% to about 60%, about 60% to about 70%, about 70% to about 80%, about 80% to about 90%, about 90% to about 95% about 10% to about 30%, about 30% to about 50%, about 50% to about 70%, about 70% to about 90%, about 0.1% to about 20%, about 20% to about 40%, about 40% to about 60%, about 60% to about 80%, about 80% to about 95%, about 0.1% to about 33%, about 33% to about 66%, about 66% to about 95%, about 0.1% to about 50%, or about 50% to about 95%) of a food product (e.g., a meat replica, a beef-like food product, a chicken-like food product, a pork-like food product, a fish-like food product, a beef food product, a chicken food product, a pork food product, or a fish food product).

In some embodiments, a fat can be present in a food product in the form of an adipose replica.

A food product can include a binding agent or a carbohydrate-based gel. In some embodiments, a carbohydrate-based gel can be included in a binding agent. A binding agent can be about 2% to about 10% by weight of a food product. A binding agent can include one or more proteins that have been chemically or enzymatically modified to improve their textural and/or flavor properties, or to modify their denaturation and gelling temperatures. A carbohydrate based gel can contain methylcellulose, hydroxypropylmethyl cellulose, guar gum, locust bean gum, xanthan gum, agar, pectin, carrageenan, konjac, alginate, chemically-modified agarose, or a mixture thereof. A binding agent can include egg albumin or collagen.

The disclosure provides, in certain embodiments, methods for determining the suitability for a consumable to qualify as a replica of a food product, for example, by determining whether an animal or human can distinguish the consumable from a predicate food product, e.g., a particular meat. One method to determine whether the consumable is comparable to a food product (e.g. meat) is to a) define the properties of meat and b) determine whether the consumable has similar properties.

Properties that can be tested or used to compare or describe a food product include mechanical properties such as hardness, cohesiveness, brittleness, chewiness, gumminess, viscosity, elasticity, and adhesiveness. Properties of food products that can be tested also include geometric properties such as particle size and shape, and particle shape and orientation. The three dimensional organization of particles may also be tested. Additional properties can include moisture content and fat content. These properties can be described using terms such as "soft," "firm" or "hard" describe hardness; "crumbly," "crunchy," "brittle," "chewy," "tender," "tough," "short," "mealy," "pasty," or "gummy," to describe cohesiveness; "thin" or "viscous" to describe viscosity; "plastic" or "elastic" to describe elasticity; "sticky," "tacky" or "gooey" to describe adhesiveness; "gritty," "grainy" or "course" to describe particle shape and size; "fibrous," "cellular" or "crystalline" to describe particle shape and orientation, "dry," "moist," "wet," or "watery" to describe moisture content; or "oily" or "greasy" to describe fat content. Accordingly, in some embodiments, a group of people can be asked to rate a certain reference food product, for instance ground beef, according to properties which describe the reference food product. A food product described herein can be rated by the same people to determine equivalence.

Flavor of a food product of the disclosure can also be assessed. Flavors can be rated according to similarity to reference foods, e.g., "eggy," "fishy," "buttery," "chocolaty," "fruity", "peppery," "baconlike," "creamy," "milky," "or "beefy." Flavors can be rated according to the seven basic tastes, i.e., sweet, sour, bitter, salty, umami (savory), pungent (or piquant), and metallic. Flavors can be described according to the similarity to an experience caused by a chemical, e.g., diacetyl (buttery), 3-hydroxy-2 butanone (buttery), nona-2E-enal (fatty), 1-octene-3-ol (mushroom), hexanoic acid (sweaty), 4-hydroxy-5-methyl furanone (HMF, meaty), pyrazines (nutty), bis(2-methyl-3-furyl) disulfide (roast meat), decanone (musty/fruity), isoamyl acetate (banana), benzaldehyde (bitter almond), cinnamic aldehyde (cinnamon), ethyl propionate (fruity), methyl anthranilate (grape), limonene (orange), ethyl decadienoate (pear), allyl hexanoate (pineapple), ethyl maltol (sugar, cotton candy), ethylvanillin (vanilla), butanoic acid (rancid), 12-methyltridecanal (beefy), or methyl salicylate (wintergreen). These ratings can be used as an indication of the properties of the reference food product. A food product of the present disclosure can then be compared to a reference food product to determine how similar the food product is to the reference food product. In some embodiments, the properties of a food product of the disclosure are then altered to make the food product of the disclosure more similar to the reference food product. Accordingly, in some embodiments, a food product of the disclosure is rated similar to a reference food product according to human evaluation. In some embodiments, a food product of the disclosure is indistinguishable from the reference food product to a human.

In some embodiments, subjects asked to identify the food product of the disclosure can identify it as a form of a reference food product, or as a particular reference food product, e.g., a subject will identify a food product of the disclosure as meat. For example, in some embodiments, a human can identify a food product of the disclosure as having properties equivalent to meat. In some embodiments, one or more properties of the food product of the disclosure are equivalent to the corresponding properties of meat according to a human's perception. Such properties include the properties that can be tested. In some embodiments, a human identifies a food product of the present disclosure as more meat like than any meat replicas found in the art.

Experiments can demonstrate that a food product of the disclosure is acceptable to consumers. A panel can be used to screen a variety of consumables described herein. A number of human panelists can test multiple food product samples, namely, natural meats vs. the food products described herein, or a meat substitute vs. a consumable composition described herein. Variables such as fat content can be standardized, for example to 20% fat using lean and fat meat mixes. Fat content can be determined using the Babcock for meat method (S. S. Nielson, Introduction to the Chemical Analysis of Foods (Jones & Bartlett Publishers, Boston, 1994)). Mixtures of ground beef and food products of the invention prepared according to the procedure described herein can be formulated.

Panelists can be served samples (e.g., in booths), under red lights or under white light, in an open consumer panel. Samples can be assigned random three-digit numbers and rotated in ballot position to prevent bias. Panelists can be asked to evaluate samples for tenderness, juiciness, texture, flavor, and overall acceptability using a hedonic scale from 1=dislike extremely, to 9=like extremely, with a median of 5=neither like nor dislike. Panelists can be encouraged to rinse their mouths with water between samples, and given opportunity to comment on each sample.

The results of this experiment can indicate significant differences or similarities between the traditional meats and the food products of the disclosure.

These results can demonstrate that the food products described herein are judged as acceptably equivalent to real meat products. Additionally, these results can demonstrate that food products described herein are preferred by panelists over other commercially available meat substitutes. Thus, in some embodiments, the present disclosure provides for food products that are similar to traditional meats and are more meat like than previously known meat alternatives.

Food products of the disclosure can also have similar physical characteristics as food products, e.g., traditional meat. In one embodiment, the force required to pierce a 1 inch thick structure (e.g., a patty) made of a food product of the disclosure with a fixed diameter steel rod is not significantly different than the force required to pierce a 1 inch thick similar food product structure (e.g., a ground beef patty) with a similar fixed diameter steel rod. Accordingly, the disclosure provides for food products with similar physical strength characteristics to meat. In another embodiment, the force required to tear a sample of a food product of the disclosure with a cross-sectional area of 100 mm$^2$ is not significantly different than the force required to tear a sample of animal tissue (muscle, fat or connective tissue) with a cross-sectional area 100 mm$^2$ measured the same way. Force can be measured using, for example, TA.XT Plus Texture Analyzer (Textrue Technologies Corp.). Accordingly, the disclosure provides for food products with similar physical strength characteristics to meat.

Food products described herein can have a similar cook loss characteristic as a food product, e.g., meat. For example, a food product of the disclosure can have a similar fat and protein content to ground beef and have the same reduction in size when cooked as real ground beef. Similarities in size loss profiles can be achieved for various compositions of food products described herein matched to various meats. The cook loss characteristics of a food product described herein also can be engineered to be superior to food products. For example, a food product described herein can be produced that has less loss during cooking but achieves similar tastes and texture qualities as the cooked products. One way this can be achieved is by altering the proportions of lipids based on melting temperatures in a food product of the disclosure. Another way this can be achieved is by altering the protein composition of a food product by controlling the concentration of protein or by the mechanism by which a tissue replica is formed.

In some embodiments, a food product of the disclosure is compared to a reference food product (e.g., an animal based food product (e.g., meat)) based upon olfactometer readings. In some embodiments, an olfactometer can be used to assess odor concentration and odor thresholds, or odor suprathresholds with comparison to a reference gas, hedonic scale scores to determine the degree of appreciation, or relative intensity of odors. In some embodiments, an olfactometer allows the training and automatic evaluation of expert panels. So in some embodiments, a food product of the disclosure is a food product that causes similar or identical olfactometer readings to a reference food product. In some embodiments, the differences are sufficiently small to be below the detection threshold of human perception.

Gas chromatography-mass spectrometry (GCMS) is a method that combines the features of gas-liquid chromatography and mass spectrometry to separate and identify different substances within a test sample. GCMS can, in some embodiments, be used to evaluate the properties of a food product of the disclosure. For example, volatile chemicals can be isolated from the head space around meat. These chemicals can be identified using GCMS. A profile of the volatile chemicals in the headspace around meat can be thereby created. In some embodiments, each peak of the GCMS can be further evaluated. For instance, a human could rate the experience of smelling the chemical responsible for a certain peak. This information could be used to further refine the profile. GCMS could then be used to evaluate the properties of the consumable. The GCMS profile can be used to refine the consumable.

Characteristic flavor and fragrance components are mostly produced during the cooking process by chemical reactions molecules including amino acids, fats and sugars which are found in plants as well as meat. Therefore, in some embodiments, a food product of the disclosure is tested for similarity to meat during or after cooking. In some embodiments human ratings, human evaluation, olfactometer readings, or GCMS measurements, or combinations thereof, are used to create an olfactory map of a reference food product (e.g., cooked meat). Similarly, an olfactory map of a food product of the disclosure, for instance a meat replica, can be created. These maps can be compared to assess how similar the cooked consumable is to meat. In some embodiments, an olfactory map of a food product of the disclosure during or after cooking is similar to or indistinguishable from that of cooked or cooking meat. In some embodiments, the similarity is sufficient to be beyond the detection threshold of human perception. In some embodiments, a food product of the disclosure can be created so its characteristics are similar to a reference food product after cooking, but the uncooked food product of the disclosure can have properties that are different from the reference food product prior to cooking.

In some embodiments, a food product can be a dairy replica (also called a non-dairy product).

In one aspect, the disclosure provides a non-dairy cheese source that can be used as a starting material for preparing a non-dairy cheese. The term "non-dairy cheese source" refers to an emulsion comprising proteins (e.g., including a protein composition as described herein, a commercially available protein, or a protein purified by any method known in the art, or a combination thereof) and fats, wherein said proteins and fats are prepared from a non-dairy source.

In some embodiments, a non-dairy cheese source can be a milk replica (also called a non-dairy milk). In some embodiments, a milk replica can be used to make a cheese replica (also called a non-dairy cheese).

In some embodiments, a non-dairy milk is an emulsion comprising one or more proteins (e.g., a protein composition as described herein, a commercially available protein, a protein purified by any method known in the art, or a combination thereof) and one or more fats. In some embodiments, the proteins are contained in a protein solution. The solution can comprise EDTA (0-0.1M), NaCl (0-1M), KCl (0-1M), $NaSO_4$ (0-0.2M), potassium phosphate (0-1M), sodium citrate (0-1M), sodium carbonate (0-1M), sucrose (0-50%), Urea (0-2M) or any combination thereof. The solution can have a pH of 3 to 11. In some embodiments, the one or more proteins accounts for 0.1%, 0.2%, 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 99% or more of the protein content of said protein solution. In some embodiments, the one or more proteins accounts for 0.1-5%, 1-10%, 5-20%, 10-40%, 30-60%, 40-80%, 50-90%, 60-95%, or 70-100% of the protein content of said protein solution. In some embodiments, the total protein content of the protein solution is about 0.1%, 0.2%, 0.3%, 0.4%, 0.5%, 0.75%, 1%, 1.5%, 2%, 5%, 7.5%, 10%, 12.5%, 15%, 17.5%, 20%, or more than 20% weight/volume. In some embodiments, the total protein content of the protein solution is 1-10%, 5-20%, or more than 20% weight/volume.

In some embodiments, the proteins are concentrated using any methods known in the art. The proteins may be concentrated 2-fold, five-fold, 10-fold, or up to 100 fold. The proteins may be concentrated to a final concentration of 0.001-1%, 0.05-2%, 0.1-5%, 1-10%, 2-15%, 4-20%, or more than 20%. Exemplary methods include, e.g., ultrafiltration (or tangential flow filtration), lyophilisation, spray drying, or thin film evaporation.

In some embodiments, fats used in preparing the emulsion can be from a variety of sources. In some embodiments, the sources can be non-animal sources (e.g., oils obtained from plants, algae, fungi such as yeast or filamentous fungi, seaweed, bacteria, Archae), including genetically engineered bacteria, algae, archaea or fungi. The oils can be hydrogenated (e.g., a hydrogenated vegetable oil) or non-hydrogenated. Non-limiting examples of plant oils include corn oil, olive oil, soy oil, peanut oil, walnut oil, almond oil, sesame oil, cottonseed oil, rapeseed oil, canola oil, safflower oil, sunflower oil, flax seed oil, palm oil, palm kernel oil, coconut oil, babassu oil, shea butter, mango butter, cocoa butter, wheat germ oil, or rice bran oil; or margarine.

In some embodiments, a fat can be triglycerides, monoglycerides, diglycerides, sphingosides, glycolipids, lecithin, lysolecithin, phospholipids such as phosphatidic acids, lysophosphatidic acids, phosphatidyl cholines, phosphatidyl inositols, phosphatidyl ethanolamines, or phosphatidyl serines; sphingolipids such as sphingomyelins or ceramides; sterols such as stigmasterol, sitosterol, campesterol, brassicasterol, sitostanol, campestanol, ergosterol, zymosterol, fecosterol, dinosterol, lanosterol, cholesterol, or episterol; free fatty acids such as palmitoleic acid, palmitic acid, myristic acid, lauric acid, myristoleic acid, caproic acid, capric acid, caprylic acid, pelargonic acid, undecanoic acid, linoleic acid (C18:2), eicosanoic acid (C22:0), arachidonic acid (C20:4), eicosapentanoic acid (C20:5), docosapentaenoic acid (C22:5), docosahexanoic acid (C22:6), erucic acid (C22:1), conjugated linoleic acid, linolenic acid (C18:3), oleic acid (C18:1), elaidic acid (trans isomer of oleic acid), trans-vaccenic acid (C18:1 trans 11), or conjugated oleic acid; or esters of such fatty acids, including monoacylglyceride esters, diacylglyceride esters, and triacylglyceride esters of such fatty acids.

A fat can comprise phospholipids, sterols or lipids. Phospholipids can comprise a plurality of amphipathic molecules comprising fatty acids (e.g., see above), glycerol and polar groups. In some embodiments, the polar groups are, for example, choline, ethanolamine, serine, phosphate, glycerol-3-phosphate, inositol or inositol phosphates. In some embodiments, the lipids are, for example, sphingolipids, ceramides, sphingomyelins, cerebrosides, gangliosides, ether lipids, plasmalogens or pegylated lipids.

In some embodiments, an emulsion is prepared by preparing a solution comprising the one or more proteins, admixing said solution with one or more fats, thereby creating said emulsion. The ratio of protein solution to fats can be about 1:10, 1:5, 1:4, 1:3, 1:2, 1:1, 2:1, 3:1, 4:1, 5:1, or 10:1. The ratio of protein solution to fats can be about 10:1-1:2, 1:4-2:1, 1:1-4:1, or 2:1-10:1. The emulsion can be used as a non-dairy milk for the preparation of a non-dairy cheese. By way of example only, 0%-50% fat can be added to a protein solution by weight/weight or weight/volume.

Flavor compounds can be generated by microbes in the non-animal derived material used for producing many different non-dairy products described herein, including cheese replicas. The methods of flavoring generally include contacting a non-dairy milk or protein solution with one or more microbes, and preparing a cultured non-dairy product from the non-dairy milk. Microbes such as bacteria, yeast, or mold can be used to create a product with a desired flavor profile or be used as a component of the flavor in a product, as bacteria can create desirable flavors (e.g., buttery, creamy, dairy, or cheesy) in a neutral, planty, or beany product.

Exemplary non-dairy milks are described herein. Any of the non-dairy cheese milks or combinations thereof may be contacted with one or more microbes (e.g., a controlled amount of bacteria) to control the flavor of a resulting cultured non-dairy product such as a cheese replica. In some embodiments, the microbes can be selected from bacteria, yeast, or molds. In some embodiments, the bacteria can comprise mesophilic and/or thermophilic bacteria. In some embodiments, the bacteria can comprise bacteria from a commercial starter. Exemplary commercial starters are described herein.

Flavor production in the replicas can be controlled by the use of one or more microbes e.g., one or more bacteria, yeast, or molds, including but not limited to flavor production in the replicas can be controlled by the use of one or more microbes e.g., one or more bacteria, yeast, or molds, including but not limited to *Lactococcus* species such as *Lactococcus lactis lactis* (LLL, used alone or as a component of commercial mix MA11), *Lactococcus lactis cremoris* (LLC, used alone or as a component of commercial mix MA11), or *Lactococcus lactis* biovar diacetylactis (LLBD, often used as commercial culture MD88), a *Lactobacillus* species such as *Lactobacillus delbrueckii lactis*, *Lactobacillus delbrueckii bulgaricus*, *Lactobacillus helveticus*, *Lactobacillus plantarum*, *Lactobacillus casei*, or *Lactobacillus rhamnosus*, a *Leuconostocaceae* species such as *Leuconostoc mesenteroides cremoris* (LM), a *Streptococcus* species such as *Streptococcus thermophiles* (ST, often used as commercial culture TA61) a *Pediococcus* species such as *Pediococcus pentosaceus*, a *Clostridium* species such as *Clostridium butyricum*, a *Staphylococcus* species such as *Staphylococcus xylosus* (SX), a *Brevibacterium* species such as *Brevibacterium linens*, a *Propioniibacteria* species, a *Penicillium* species such as *Penicillium candidum*, *Penicillium camemberti*, or *Penicillium roqueforti*, a *Debaryomyces* species such as *Debaryomyces hansenii*, a *Geotrichum* species such as *Geotrichum candidum*, a *Corynebacteria* species, a *Verticillium* species such as *Verticillium lecanii*, a *Kluyveromyces* species such as *Kluyveromyces lactis*, a *Saccharomyces* species such as *Saccharomyces cerevisiae*, a *Candida* species such as *Candida jefer* or *Candida utilis*, a *Rhodosporidum* species such as *Rhodosporidum infirmominiatum*, a *Micrococcus* species, a *Halomonas* species, a *Psychrobacter* species. In some embodiments, lactic acid bacteria such as *Lactobacillus*, *Leuconostoc*, *Pediococcus*, *Lactococcus*, or *Streptococcus* are used. In some embodiments, the bacteria do not comprise *Lactobacillus acidophilus* strains. In some embodiments, a yeast such as *Saccharomyces cerevisiae*, *Kluveromyces lactis* and/or *Debaryomyces hansenii* can be used. In some embodiments, a mold can be *Penicillium candidum*, *Penicillium camemberti*, *Penicillium roqueforti*, *Geotrichum candidum*, or a combination thereof.

In some embodiments, one or more of the follow microbes are used: *Pediococcus pentosaceus*, *Clostridium butyricum*, *Lactobacillus delbrueckii lactis*, *Lactobacillus delbrueckii bulgaricus*, *Lactobacillus helveticus*, *Lactobacillus plantarum*, *Lactobacillus casei*, *Lactobacillus rhamnosus*, *Staphylococcus xylosus*, and *Brevibacterium linens*.

In some embodiments, a non-dairy cheese source can be cultured with one or more microbes (e.g., bacteria, yeast, or mold alone), or in combination with two or more microbes (e.g., two different bacteria, two different yeast, two different molds, a bacteria and a yeast, a bacteria and a mold, or a yeast and a mold). When two or more microbes are used, the microbes can be co-cultured or sequentially cultured, i.e., one microbe can be cultured for a length of time before adding another microbe. Particular good combinations for flavor generation in replicas are pre-culturing with SX, followed by either TA61 or MD88, or MD88 co-cultured with MA11.

Growth conditions of microbes also can control flavor generation in replicas. The temperature of microbes growth ranging from 4° C. to 45° C. can control the amount and type of flavor compounds produced in replicas. The amount of aeration by shaking (e.g., to 300 rpm) can change the flavor productions of many different bacteria in non-dairy media. Greater aeration during culturing by either SX, TA61, or MD88 can generate more desired cheese and buttery compounds. Aeration can also decrease some undesired flavor compounds. Desired cheese compounds such as 2-heptanone can increase when SX, MD88, or TA61 are cultured with aeration. MD88's production of hexanoic methyl ester in cheese replicas can also be modulated by aeration. An increase in aeration of SX during culturing in soymilk can increase 3-methyl and 2-methyl butanoic acid production and can decrease the amounts of undesirable aroma compounds such as 2-ethyl furan or 2-pentyl furan in cheese replicas.

The amount of time the one or more microbes is cultured also can modulate the amount and types of flavor compounds. In some embodiments, culturing can range from 1 hour to multiple days. In some embodiments, one or more microbes and the non-dairy milk are incubated together for a length of time ranging from 1 min-60 minutes, 0.5-5 hours, 3-10 hours, 6-15 hours, 10-20 hours, or more than 20 hours. In some embodiments, most buttery compounds are created within the first 10 hours, while additional cheese compounds can be formed in 24-48 hours or more hours. Butyrolactone, a creamy, milky note compound can be created in non-dairy media (e.g., a non-dairy cheese source or a milk replica) by MD88 and MA11 only after 20 hours of culturing in soymilk.

In some embodiments, the one or more microbes also can be added at different inoculums, e.g., $10^2$-$10^9$ cfu/mL or even greater. The phase of growth (i.e, stationary phase versus exponential phase) and the cell density of the bacterial culture can affect the flavor compound profile of the medium. Higher inocula of a starter culture can protect the replica from unwanted microbial contamination (e.g., bacterial contamination). Therefore, an inoculum of $10^6$-$10^9$ cfu/mL is usually used.

Flavor production by the one or more microbes also can be modulated by directing the metabolic pathways, e.g., by modulating their nitrogen source, carbon source, additional available nutrients, and growth conditions.

In some embodiments, the one or more microbes, the non-dairy cheese source, and the one or more optional components that can be used to alter flavor (e.g., sugars, fats, carbohydrates, vitamins, organic acids, nucleotides, or food products) are incubated together for a sufficient period of time to achieve a desired pH. The pH can range from pH 3-5, 4-6, or 4.3-5.7. The desired pH can be pH 6 or lower, pH 5 or lower, or pH 4 or lower. Culturing the material by bacteria in some cases decreases the pH to 6.5, 6, 5.5, 5, 4.5, 4, or 3.5, while in other cases, flavors are generated with no change in pH. Culturing with *Lactococcus, Lactobacillus, Leuconostoc, Pediococcus* and/or *Streptococcus* generally results in a decrease in pH with most starting material, while culturing with *Staphylococcus, Brevibacterium,* and/or *Clostridium* generally has little or no effect on the pH.

In some embodiments, one or more enzymes can be used alone or in combination any one the culturing methods and additives described to help modulate the flavor, texture, and/or melting profile, comprising contacting a non-dairy cheese source with one or more enzymes. In some embodiments, the one or more enzymes can be added before solidification, after solidification but before the whey is drained, or after whey is drained. Surprisingly, adding trace amounts of one or more enzymes (e.g., proteases, lipases, and/or amylases) can enhance the texture, flavor, and/or meltability of the resulting non-dairy cheese replica, as determined by blind taste test or by the detection of volatile odorants by, e.g., GCMS. Using such enzymes can also impact flavor production by microbial cultures (e.g., when soymilk is pre-treated with amylases, TA61 produces much more diacetyl).

In some embodiments, the enzyme is aspartic protease.

In specific embodiments, the protease is papain, bromelain, AO protease, figin, rennet, protease type XXI from *Streptomyces griseus*, a protease from *Bacillus licheniformis*, a protease from *Aspergillus oryzae*, a protease from *Bacillus amyloliquefaciens*, a protease from *Aspergillus saitoi*, a thermolysin from *Bacillus thermoproteolyticus rokko*, Subtilisin A, protease type X, or a fungal protease type XIII.

In some embodiments, the enzyme is a lipase.

The added enzyme can account for 0.00001-0.005%, 0.001-0.01%, 0.01-0.1%, 0.1-2%, or 0.5-5% of the non-dairy cheese source by weight or volume. In some embodiments, the added enzyme can account for 0.00001-0.1% of the non-dairy cheese source by weight or volume.

In some embodiments, the protease is papain. In some embodiments, 0.001-0.01% of papain is added to the non-dairy cheese source. In some embodiments, a protein solution with added protease is solidified by a heat/cool method. In some embodiments, addition of papain improves the softness and creaminess of the resulting cheese replica.

A method can comprise adding one or more fats to the non-dairy cheese source to create an emulsion.

By way of example only, some non-dairy cheese replicas can be prepared by adding 0%-50% fat to a non-dairy cheese source to create an emulsion, then solidifying the emulsion by protein denaturation, e.g., by heating. In some embodiments, one or more fats are added before solidifying, or after solidifying. In some embodiments, the one or more fats are added after solidifying and after draining the whey. By way of other example only, some cheese replicas made from protein denaturation have 0% to 50% fat added after solidification by denaturation, or 0% to 50% fat added after draining the whey. In some embodiments, after formation of a gel, either by protein denaturation or crosslinking, whey can be drained to increase the total fat in the cheese replica, further draining and aging the cheese can reduce the moisture content to increase the total fat of the cheese replica.

In some embodiments, the addition of 5-20% unsaturated fats to enzyme crosslinked gels can increase the firmness of the gel.

In some embodiments, addition of saturated fats from 5%-50% can increase the firmness of the cheese replicas.

In another aspect, the disclosure provides cheese replicas and methods of making the same. In some embodiments, the method comprises solidifying a non-dairy cheese source (e.g., a non-dairy milk) (e.g., by forming a gel). In some embodiments, the non-dairy milk is capable of retaining a shape after said solidifying. There are many ways in which the non-dairy cheese source can be solidified, including using enzymes, heat denature, forming cold gels, forming coacervate, liquid separation, acids, change in ionic strength, high pressure processing, solvents, chaotropic agents, or disulfide bond reducers as described in this section.

Enzymes (or chemicals) can be used to crosslink non-animal (e.g., plant based) proteins or non-dairy cheese sources, with or without emulsified fats or oils, sugars, and cultures. The resulting cross-linked cheese replicas can have bacteria cultures added or not, and the timing of addition can be either before or after the crosslinking step. In some embodiments, solidifying involves a process of cross-linking components (e.g., polypeptides, also referred to as proteins herein) in the non-dairy cheese source. In some embodiments, cross-linking comprises contacting the non-dairy cheese source with a cross-linking enzyme, thereby creating crosslinks between polypeptide chains. In some embodiments, a crosslinking enzyme can be a transglutaminase, tyrosinase, lipoxygenase, protein disulfide reductase, protein disulfide isomerase, sulfhydryl oxidase, peroxidase, hexose oxidase, lysyl oxidase, or amine oxidase.

In some embodiments, the cross-linking enzyme is a transglutaminase. Transglutaminases are a family of enzymes that catalyze the formation of a covalent bond between a free amine and the gamma-carboxyl group of glutamine thereby linking proteins together. For example, transglutaminases catalyze crosslinking of e.g., lysine in a protein or peptide and the gamma-carboxamide group of a protein- or peptide-glutamine residue. The covalent bonds formed by transglutaminase can exhibit high resistance to proteolytic degradation.

Many types of transglutaminase can be used in various embodiments of the invention. Acceptable transglutaminases for crosslinking include, but are not limited to, *Streptoverticillium mobaraense* transglutaminase, an enzyme that is similar to a transglutaminase from *Streptoverticillium mobaraense*, other microbial transglutaminases, transglutaminases produced by genetically engineered bacteria, fungi or algae, Factor XIII (fibrin-stabilizing factor), Keratinocyte transglutaminase (TGM1), Tissue transglutaminase (TGM2), Epidermal transglutaminase (TGM3), Prostate transglutaminase (TGM4), TGM X (TGM5), TGM Y (TGM6), TGM Z (TGM7), or a lysyl oxidase.

The timing of adding the cultures, the type of cultures, and amount of cultures can change the pH of the emulsion, and therefore the activity of transglutaminase and the final texture of the cheese. In addition, changing the pH of the solution with the addition of acid or base, and overall buffering capacity of the emulsion can alter the crosslinking ability and the final texture of the cheese-replica.

In some embodiments, the present invention provides for a composition comprising a non-dairy milk and a *Streptoverticillium mobaraense* transglutaminase, an enzyme is similar to a transglutaminase from *Streptoverticillium mobaraense*, other microbial transglutaminases, transglutaminases produced by genetically engineered bacteria, fungi or algae, Factor XIII (fibrin-stabilizing factor), Keratinocyte transglutaminase (TGM1), Tissue transglutaminase (TGM2), Epidermal transglutaminase (TGM3), Prostate transglutaminase (TGM4), TGM X (TGM5), TGM Y (TGM6) and/or TGM Z (TGM7). In some embodiments the enzyme used for cross-linking is not Factor XIII (fibrin-stabilizing factor), Keratinocyte transglutaminase (TGM1), Tissue transglutaminase (TGM2), Epidermal transglutaminase (TGM3), Prostate transglutaminase (TGM4), TGM X (TGM5), TGM Y (TGM6), TGM Z (TGM7), or lysyl oxidase.

Transglutaminases can be produced by *Streptoverticillium mobaraense* fermentation in commercial quantities or extracted from animal tissues. Additionally, a transglutaminase (TGM) of the present disclosure can be isolated from bacteria or fungi, expressed in bacteria or fungi from a synthetic or cloned gene. In some particular embodiments, a transglutaminase is obtained from a commercial source, for example in the form of Activa™ from Ajinomoto Food Ingredients LLC.

In some embodiments, a transglutaminase is added at an amount between 0.0001-0.1%, 0.001-0.05%, 0.1-2%, 0.5-4%, or greater than 4% by weight/volume. In some embodiments, a transglutaminase is added at amounts greater than 0.1% and up to 10%.

In some embodiments, cross-linking by a transglutaminase can be done at temperatures ranging from 10-30° C., 20-60° C., 30-70° C., or 50-100° C. Transglutaminase cross-linking can occur for 10 minutes-24 hours.

In some embodiments, between 0.1 and 20 units (U) of transglutaminase is added per 1 mL of non-dairy milk. In some embodiments about 0.1, 0.5, 1, 1.5, 2, 2.5, 3, 5, 7, 15, or 20 U of transglutaminase is added per 1 mL of non-dairy milk. In some embodiments after the transglutaminase is added, a heated incubation occurs, for example in a 100° F. water bath. The heated incubation can be at a temperature optimized for the enzyme function. In some embodiments the temperature is about 65, 70, 75, 80, 85, 90, 100, 105, 110, 115, 120 or 125° F. In some embodiments, enzymatic cross-linking does not comprise contacting the non-dairy cheese source with glutaminase and transglutaminase. Transglutaminase crosslinking has been done at room temperature, and up to 65° C., for 10 minutes to 24 hours.

In some embodiments, solidifying comprises inducing protein denaturation. In some embodiments, denaturation is induced by heating the mixture, followed by cooling the mixture. In some embodiments, denaturation is induced by heating the mixture to a temperature between 30-35, 32-40, 37-45, 40-50, 45-55, 50-60, 55-65, 60-70, 65-75, 70-75-85, 80-95, 90-100° C., or above 100° C. In some embodiments, denaturation is induced by heating the mixture for about 10-20, 15-30, 25-40, 30-50, 40-70 seconds or about 1-3, 2-5, 3-8, or 5-20 minutes. In some embodiments, the mixture is allowed to cool after heating. For example, proteins (e.g., a protein composition as disclosed herein, a commercially available protein, a protein purified by any method known in the art, purified or fractionated plant proteins such as from peas, moong, soy, RuBisCO, or a combination thereof), preferably at concentrations >1%, can be homogenized with oils (such as canola oil, sunflower oil, palm oil or oil bodies from seeds such as sunflower) at concentration. The emulsion can be subjected to a heat-cool cycle wherein it is heated to a temperature of 45-100° C. for 5-60 minutes and then cooled to less than 30° C. (e.g., 20-25° C.). The resulting gel can be incubated at a temperature ≤30° C., preferably for 2-16 hours and then drained through cheesecloth. The drained curds are ready to be shaped and aged or processed further by heating or pressing.

Acids, change in ionic strength, high pressure processing, solvents, chaotropic agents, or disulfide bond reducers can be used to denature the proteins in the non-dairy cheese source. In some embodiments, urea is added to the non-dairy cheese source to form curds.

In some embodiments, solidifying results in the formation of solid curds and whey (resulting liquid that remains after curd is formed). In some embodiments, the curds are separated from the whey.

In some embodiments, solidifying comprises a combination of two or more methods. For example, solidifying can include crosslinking proteins and denaturation by heating followed by cooling. For example, a cold set gel can be cross-linked with transglutaminase to yield firmer gels or combined with other proteins such as soy, pea-legumins, pea-albumins, crude protein fraction from chick peas and lentils or materials (for example, fats or pea protein coacervates) to increase firmness and/or meltability.

In some embodiments, a non-dairy cheese source can be subjected to a shearing force during said solidifying. Said shear force can be used to cause protein components in said non-dairy cheese source to align, forming anisotropic fibers. Said formation of anisotropic fibers can be useful in creating a stretch cheese.

In another aspect, the disclosure provides methods for flavoring cultured non-dairy products, including sour cream, crème fraiche, yogurt, or cheese replicas. In some embodiments, the method comprises comparing a flavor note profile of a test non-dairy product with one or more flavor additives and/or one or more individual microbial strains described herein to a flavor note profile of a control non-dairy product without the additives and/or individual microbial strain. The texture and flavor profile of a non-dairy product (e.g. cheese replica) can be ascertained by any method known in the art or described herein. Exemplary methods of ascertaining flavor and texture can be by a taste test, e.g., a blind taste test, or using gas chromatography-mass spectrometry (GCMS).

GCMS is a method that combines the features of gas-liquid chromatography and mass spectrometry to identify different substances within a test sample. GCMS can, in some embodiments, be used to evaluate the properties of a dairy cheese and a cheese replica. For example volatile chemicals can be detected from the head space around a dairy cheese or a cheese replica. These chemicals can be identified using GCMS. A profile of the volatile chemicals in the headspace around cheese is thereby created. In some embodiments, each peak of the GCMS can be further evaluated. For instance, a human could rate the experience of smelling the chemical responsible for a certain peak. This information could be used to further refine the profile. GCMS could then be used to evaluate the properties of the cheese replicas. The GCMS could be used to refine the cheese replica. In some embodiments the cheese replica has a GCMS profile similar to that of dairy cheese. In some embodiments the cheese replica has a GCMS profile identical to that of dairy cheese.

A flavor profile of a diary replica can be characterized by the presence and/or intensity of one or more flavor notes. Exemplary flavor notes include, but are not limited to butteriness, fruitiness, nuttiness, dairy, milky, cheesy, fatty, fruity, pineapple, waxy, buttery, tonka, dark fruit, citrus, sour, banana-like, sweet, bitter, musty, floral, goaty, sweaty, woody, earthly, mushroom, malty, spicy, pear, green, balsamic, pungent, oily, rose, fatty, butterscotch, orange, pine, carnation, melon, pineapple, vanilla, garlic, herbaceous, woody, cinnamon, rue, yogurt, peach, vanilla, hawthorn, and herbaceous. The flavor notes may be associated with the release of one or more volatile compounds. The flavor profile can be characterized by the absence or reduction in the intensity of one or more flavor notes. Exemplary flavor notes include: planty, beany, soy, green, vegetable, nutty, dirty, and sour.

Exemplary volatile compounds include, e.g., gamma-nonanoic lactone, gamma-undecalactone, gamma-decalactone, delta-tetradecalactone, S-methyl thiopropionate, delta-tridecalactone, delta-tetradecalactone, 6-tetradecalactone, butyl butyryllactate, 2,3-hexandione, methyl hexanoate, butyrolactone, propanoic acid, 2-methyl propanoic acid, methyl isobutyl ketone, gamma octalactone, delta octalactone, gamma nonalactone, 5-hydroxy-4-octanone, 2-ethyl-1-hexanol, octane, ethanol, 2,3-butanedione, 2 heptanone, 1-butanol, acetoin, butanoic acid, nonanal, acetic acid, 1,3 butanediol, methyl-3-buten-1-ol, methanol, hexanol, dimethyl-benzene, ethyl-benzene, indole, limonene, toluene, acetophenone, pentan-2,3-dione, 2-pentanone, 2-heptanone, 2-nonanone, acetone, butanone, 2-methylpropionic acid, butanoic acid, 2-methylbutanoic acid, 3-methylbutanoic acid, pentanoic acid, 4-methylpentanoic acid, hexanoic acid, octanoic acid, decanoic acid, undecanoic acid, dodecanoic acid, tetradecanoic acid, hexadecanoic acid, octadecanoic acid, oleic acid, linoleic acid, linolenic acid, propanol, butanol, pentanol, hexanol, heptanol, octanol, propan-2-ol, butan-2-ol, pentan-2-ol, hexan-2-ol, heptan-2-ol, nonan-2-ol, undecan-2-ol, octen-3-ol, octa-1,5-dien-3-ol, 3-methyl-2-cyclohexenol, 2-methylpropanol, 2-methylbutanol, 3-methylbutanol, 3-methylpentanol, phenylmethanol, 2-phenylethanol, 2-phenyl-ethan-2-ol, propan-2-one, butan-2-one, pentan-2-one, hexan-2-one, heptan-2-one, octan-2-one, nonan-2-one, decan-2-one, undecan-2-one, dodecan-2-one, tridecan-2-one, pentadeca-2-one, pentan-3-one, octan-3-one, 3-methylpentan-2-one, 4-methylpentan-2-one, methylhexan-2-one, hydroxypropan-2-one, hept-5-en-2-one, 4-methylpent-3-en-2-one, octen-3-one, octa-1,5-dien-3-one, nonen-2-one, undecen-2-one, methylfuryl ketone, phenylpropan-2-one, propiophenone, methyl butanoate, methyl hexanoate, methyl octanoate, methyl decanoate, methyl tetradecanoate, methyl hexadecanoate, methyl cinnamate, ethyl formate, ethyl acetate, ethyl propanoate, ethyl butanoate, ethyl hexanoate, ethyl octanoate, ethyl decanoate, ethyl dodecanoate, ethyl tetradecanoate, ethyl-3-methyl butanoate, propyl acetate, propyl butanoate, butyl formate, butyl acetate, amyl acetate, isoamyl formate, isoamyl acetate, isoamyl propanoate, isoamyl butanoate, diethyl phthalate, dimethyl phthalate, 2-phenylethyl acetate, 2-phenylethyl propanoate, 2-phenylethyl butanoate, 3-methylthiopropanol, methanethiol, hydrogen sulfide, dimethyl disulfide, dimethyl trisulfide, dimethyl tetrasulfide, methylethyl disulfide, diethyl disulfide, 2,4-dithiapentane, methional, 3-methylthio-2,4-dithiapentane, 2,4,5-trithiahexane, 1,1-bis-methylmercaptodisulfide, methanethiol acetate, methyl thiopropanoate, methyl thiobenzoate, thiophen-2-aldehyde, methylindole, p-ethylphenol, p-cresol, acetaldehyde, butanal, 2-methylbutanal, 3-methylbutanal, 2-methylpropanal, hexanal, heptanal, nonanal, 2-methylbuten-2-al, benzaldehyde, 3-methylheptyl acetate, 1-butanol, 1-butanol, 3-methyl, 1-heptanol, formic acid, 1-hexanol-2, ethyl, 1-octanol, 2-butanone, 2-hepten-1-ol, 2-hexanone, heptanal, 2-octen-1-ol, 1-octen-3-ol, 2-pentanone, 2,3-butanedione, 3-buten-1-ol, 5-Hepten-2-one, octane, ethanol, 2,3-butanedione, 2 heptanone, 1-butanol, butanoic acid, nonanal, acetic acid, 1,3 butanediol, methyl-3-buten phenylethyl alcohol, toluene, 1-pentanol, 3-octene-1-ol, 2 octene-1-ol, 2-undecanone, 1-octanol, Benzaldehyde, 1-heptanol, 2-heptanone, 4-methyl-2-nonanone, 2-methyl-2-nonanol, 1-hexanol, 2-methyl 2-propanol, Ethanol, 3 methyl 1-butanol, 1-hexanol, 2-methyl 2-nonanol, 2-nonanone, 2-heptanone, 4-methyl, 1-heptanol, 1-octanol, 2 octene-1-ol, 3-octene-1-ol, 1-octanol, 1-heptanol, 2-heptanone, 4-methyl-2-nonanone, 2-dodecanol, 2-dodecanone, 3-decene 1-ol acetate, benzyl alcohol, phenylethyl alcohol, 2-methoxy 4-vinylphenol, 3-decene 1-ol acetate, 2-dodecanone, 2-dodecanol, or 2-methoxy 4-vinylphenol.

In some embodiments, improved flavors are due to the decreased levels of volatile flavor compounds, such as, e.g., 1-Hexanol; 2-Butylfuran; 2-methyl-2-Pentenal; 3-Octanone; Ethyl-Acetate; 2-Ethyl-Furan; 2-pentyl-Furan; Pyrazine; 1-Decanol; Acetophenone; 1-Nonanol; 2,5-Dimethyl-Pyrazine; Dodecanal; Benzeneacetaldehyde; Nonanal; Butyrolactone; Octanal; 2-Decanone; Hexanal; 2-Nonanone; Benzaldehyde; Heptanal; 2-Octanone; Furfural; 2-Heptanone; Pentanal.

In some embodiments, the method further comprises preparing a cultured non-dairy product such as a cheese replica, yogurt, sour cream, or crème fraiche with a controlled flavor profile, by the controlled addition of defined combinations of flavor additives, described herein, to the non-dairy e source at any time point of the replica making process. Exemplary additives and specific combinations are described herein.

EXEMPLARY EMBODIMENTS

Embodiment 1 is a method for purifying protein from a plurality of cells, the method comprising:
 a) lysing an aqueous suspension of the plurality of cells to obtain a cell lysate;
 b) clarifying the cell lysate, optionally in the presence of one or more flocculants, to obtain a clarified lysate;
 c) filtering the clarified lysate to obtain a filtered lysate;
 d) concentrating the filtered lysate to obtain a protein composition; and
 e) optionally pasteurizing the protein composition of protein to obtain a pasteurized protein composition,
 wherein steps a), b), c), and d) independently, are performed at a pH between about 8.5 and about 12.0.

Embodiment 2 is a method for purifying protein from a plurality of cells, the method comprising:
 a) lysing an aqueous suspension of the plurality of cells to obtain a cell lysate;
 b) clarifying the cell lysate, optionally in the presence of one or more flocculants, to obtain a clarified lysate;
 c) concentrating the clarified lysate to obtain a protein composition; and
 d) optionally pasteurizing the protein composition to obtain a pasteurized protein composition,
 wherein steps a), b), c), and d) independently, are performed at a pH between about 8.5 and about 12.0.

Embodiment 3 is a method for purifying protein from a plurality of cells, the method comprising:
 a) lysing an aqueous suspension of the plurality of cells to obtain a cell lysate;
 b) clarifying the cell lysate, optionally in the presence of one or more flocculants, to obtain a clarified lysate;
 c) filtering the clarified lysate to obtain a protein composition; and
 d) optionally pasteurizing the protein composition, to obtain a pasteurized protein composition
 wherein steps a), b), c), and d) independently, are performed at a pH between about 8.5 and about 12.0.

Embodiment 4 is a method for purifying protein from a plurality of cells, the method comprising:
a) lysing an aqueous suspension of the plurality of cells to obtain a cell lysate;
b) clarifying the cell lysate, optionally in the presence of one or more flocculants, to obtain a clarified lysate;
c) filtering the clarified lysate using microfiltration to obtain a first filtered lysate;
d) filtering the first filtered lysate using diafiltration to obtain a second filtered lysate;
e) filtering the second filtered lysate using ultrafiltration to obtain a third filtered lysate;
f) filtering the third filtered lysate using diafiltration to obtain a protein composition; and
g) optionally pasteurizing the protein composition to obtain a pasteurized protein composition,
wherein steps a), b), c), d), e), f), and g) independently, are performed at a pH between about 8.5 and about 12.0.

Embodiment 5 is a method for purifying protein from a plurality of cells, the method comprising:
a) lysing an aqueous suspension of the plurality of cells to obtain a cell lysate;
b) clarifying the cell lysate, optionally in the presence of one or more flocculants, to obtain a clarified lysate;
c) filtering the clarified lysate using microfiltration to obtain a first filtered lysate;
d) filtering the first filtered lysate using diafiltration to obtain a protein composition; and
e) optionally pasteurizing the protein composition to obtain a pasteurized protein composition,
wherein steps a), b), c), d), and e) independently, are performed at a pH between about 8.5 and about 12.0.

Embodiment 6 is the method of any one of embodiments 1-5, wherein filtering comprises microfiltration.

Embodiment 7 is the method of any one of embodiments 1-6, wherein filtering comprises ultrafiltration.

Embodiment 8 is the method of any one of embodiments 1-7, wherein filtering comprises diafiltration Embodiment 9 is the method of embodiment 8, where diafiltration is performed for at least two diavolumes.

Embodiment 10 is the method of any one of embodiments 1-9, wherein the plurality of cells comprises microbial cells.

Embodiment 11 is the method of any one of embodiments 1-10, wherein the plurality of cells comprises fungal cells.

Embodiment 12 is the method of embodiment 11, wherein the fungal cells are selected from the group consisting of *Saccharomyces*, *Pichia*, *Candida*, *Hansenula*, *Torulopsis*, *Kluyveromyces*, *Yarrowia*, and *Fusarium* cells.

Embodiment 13 is the method of embodiment 11, wherein the fungal cells are selected from the group consisting of *Saccharomyces cerevisiae*, *Pichia pastoris*, *Candida boidinii*, *Hansenula polymorpha*, *Kluyveromyces lactis*, *Yarrowia lipolytica*, and *Fusarium venenatum*.

Embodiment 14 is the method of any one of embodiments 1-13, wherein the plurality of cells comprises bacterial cells.

Embodiment 15 is the method of embodiment 14, wherein the bacterial cells are selected from the group consisting of *Bacillus*, *Escherichia*, *Lactobacillus*, *Corynebacterium*, *Pseudomonas*, and *Methanococcus*.

Embodiment 16 is the method of embodiment 14, wherein the bacterial cells are selected from the group consisting of *Escherichia coli*, *Bacillus subtilis*, *Lactobacillus lactis*, *Corynebacterium glutamicum*, *Pseudomonas fluorescens*, and *Methanococcus maripaludis*.

Embodiment 17 is the method of any one of embodiments 1-16, wherein the aqueous suspension of the plurality of cells comprises from about 2% to about 25% dry solids.

Embodiment 18 is the method of any one of embodiments 1-17, further comprising washing the aqueous suspension of the plurality of cells at a pH between about 8.5 and about 12.0 before step a).

Embodiment 19 is the method of any one of embodiments 1-18, wherein the lysing step is performed at a temperature between about 4° C. and about 15° C.

Embodiment 20 is the method of any one of embodiments 1-19, wherein the lysing step is performed biochemically.

Embodiment 21 is the method of any one of embodiments 1-20, wherein the lysing step is performed chemically.

Embodiment 22 is the method of any one of embodiments 1-21, wherein the lysing step is performed mechanically.

Embodiment 23 is the method of any one of embodiments 1-22, wherein the lysing step is performed a pH between about 9.0 and about 12.0.

Embodiment 24 is the method of embodiment 22, wherein the lysing step is performed at a pH between about 9.0 and about 10.0.

Embodiment 25 is the method of embodiment 22, wherein the lysing step is performed at a pH between about 10.0 and about 11.0.

Embodiment 26 is the method of embodiment 22, wherein the lysing step is performed at a pH between about 11.0 and about 12.0.

Embodiment 27 is the method of any one of embodiments 1-26 wherein the clarifying step is performed, optionally in the presence of one or more flocculants, at a pH between about 9.0 and about 12.0.

Embodiment 28 is the method of embodiment 27, wherein the clarifying step is performed at a pH between about 9.0 and about 10.0.

Embodiment 29 is the method of embodiment 27, wherein the clarifying step is performed at a pH between about 10.0 and about 11.0.

Embodiment 30 is the method of embodiment 27, wherein the clarifying step is performed at a pH between about 11.0 and about 12.0.

Embodiment 31 is the method of any one of embodiments 1-30, wherein clarifying step is performed by centrifugation to less than about 20% dry solids.

Embodiment 32 is the method of any one of embodiments 1-31, wherein the clarifying step is performed by gravity settling to less than about 20% dry solids.

Embodiment 33 is the method of any one of embodiments 1-32, wherein the clarifying step is performed by diatomaceous earth filtration to less than about 20% dry solids.

Embodiment 34 is the method of any one of embodiments 1-33, wherein the lysate is diluted 1:1 with water or aqueous solution of salt or buffer before clarifying, wherein the pH is between about 8.5 and about 12.0.

Embodiment 35 is the method of any one of embodiments 1-34, wherein the cell lysate from step a) is clarified in the presence of one or more flocculants.

Embodiment 36 is the method of embodiment 35, wherein the one or more flocculants comprise one or more of alkylamine epichlorohydrin, polydimethyldiallylammonium chloride, a polyamine, lime, hydrated lime, ferric chloride, ferric sulfate, ferrous sulfate, aluminum sulfate, sodium aluminate, aluminum chloride, magnesium carbonate hydroxide, calcium carbonate, calcium hydroxide, an activated silicate, a guar gum, a starch, a tannin, sodium alginate, polyaluminum sulfate, polyaluminum hydroxy chloride, BIO-FLOCK®, and a synthetic polyelectrolyte.

Embodiment 37 is the method of embodiment 36, wherein the one or more flocculants are selected from the group consisting of alkylamine epichlorohydrin, polydimethyldiallylammonium chloride, a polyamine, lime, hydrated lime, ferric chloride, ferric sulfate, ferrous sulfate, aluminum sulfate, sodium aluminate, aluminum chloride, magnesium carbonate hydroxide, calcium carbonate, calcium hydroxide, an activated silicate, a guar gum, a starch, a tannin, sodium alginate, polyaluminum sulfate, polyaluminum hydroxy chloride, BIO-FLOCK®, and a synthetic polyelectrolyte.

Embodiment 38 is the method of any one of embodiments 1-37, wherein the protein composition has a protein content of about 2 mg/mL to about 250 mg/mL.

Embodiment 39 is the method of any one of embodiments 1-38, wherein the protein composition exhibits one or more characteristics selected from the group consisting of: $H_2S$ is detectable in an amount of less than about 0.1 ppm when L-cysteine is not added to the protein composition, and $H_2S$ is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m²/g protein across about pH 4.0 to about pH 8.0.

Embodiment 40 is the method of any one of embodiments 1-38, wherein the protein composition exhibits two or more characteristics selected from the group consisting of: $H_2S$ is detectable in an amount of less than about 0.1 ppm when L-cysteine is not added to the protein composition, and $H_2S$ is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m²/g protein across about pH 4.0 to about pH 8.0.

Embodiment 41 is the method of any one of embodiments 1-38, wherein the protein composition exhibits three or more characteristics selected from the group consisting of: $H_2S$ is detectable in an amount of less than about 0.1 ppm when L-cysteine is not added to the protein composition, and $H_2S$ is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m²/g protein across about pH 4.0 to about pH 8.0.

Embodiment 42 is the method of any one of embodiments 1-38, wherein the protein composition exhibits four or more characteristics selected from the group consisting of: $H_2S$ is detectable in an amount of less than about 0.1 ppm when L-cysteine is not added to the protein composition, and $H_2S$ is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m²/g protein across about pH 4.0 to about pH 8.0.

Embodiment 43 is the method of any one of embodiments 1-38, wherein the protein composition exhibits five or more characteristics selected from the group consisting of: $H_2S$ is detectable in an amount of less than about 0.1 ppm when L-cysteine is not added to the protein composition, and $H_2S$ is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m$^2$/g protein across about pH 4.0 to about pH 8.0.

Embodiment 44 is the method of any one of embodiments 1-38, wherein the protein composition exhibits six or more characteristics selected from the group consisting of: H$_2$S is detectable in an amount of less than about 0.1 ppm when L-cysteine is not added to the protein composition, and H$_2$S is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m$^2$/g protein across about pH 4.0 to about pH 8.0.

Embodiment 45 is the method of any one of embodiments 1-38, wherein the protein composition exhibits seven or more characteristics selected from the group consisting of: H$_2$S is detectable in an amount of less than about 0.1 ppm when L-cysteine is not added to the protein composition, and H$_2$S is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m$^2$/g protein across about pH 4.0 to about pH 8.0.

Embodiment 46 is the method of any one of embodiments 1-38, wherein the protein composition exhibits the characteristics:

H$_2$S is detectable in an amount of less than about 0.1 ppm when L-cysteine is not added to the protein composition, and H$_2$S is detectable in an amount of at least about 0.2 ppm in the headspace about 24 hours at 25° C. after about 25 mM L-cysteine is added to the protein composition, the protein composition forms a gel upon heating to 65° C., the protein composition has a particle size distribution D10, D50, and D90 of less than 0.1 µm, 1.0 µm and 5 µm, respectively, the protein composition is least about 80% denatured after about 20 minutes at about 85° C., the protein composition forms a gel with a storage modulus of at least about 100 Pa when heated at or above about 85° C. for about 20 minutes, wherein the protein composition forms a gel between about pH 5.5 and about pH the protein composition forms a gel in solutions with ionic strength below about 0.5 M, wherein the ionic strength is calculated based on the concentration of non-protein solutes, and the protein composition has an emulsion activity index of greater than or equal to about 50 m$^2$/g protein across about pH 4.0 to about pH 8.0.

Embodiment 47 is the method of any one of embodiments 1-45, wherein the protein composition comprises at least about 35%, on a dry weight basis, of compounds larger than 5 kDa.

Embodiment 48 is the method of any one of embodiments 1-45, wherein the protein composition comprises at least about 40%, on a dry weight basis, of compounds larger than 5 kDa.

Embodiment 49 is the method of any one of embodiments 1-45, wherein the protein composition comprises at least about 50%, on a dry weight basis, of compounds larger than 5 kDa.

Embodiment 50 is the method of any one of embodiments 1-45, wherein the protein composition comprises at least about 60%, on a dry weight basis, of compounds larger than 5 kDa.

Embodiment 51 is the method of any one of embodiments 1-45, wherein the protein composition comprises at least about 70%, on a dry weight basis, of compounds larger than 5 kDa.

Embodiment 52 is the method of any one of embodiments 47-51, wherein the compounds larger than 5 kDa are compounds larger than 10 kDa.

Embodiment 53 is the method of any one of embodiments 47-51, wherein the compounds larger than 5 kDa are compounds larger than 15 kDa.

Embodiment 54 is the method of any one of embodiments 47-51, wherein the compounds larger than 5 kDa are compounds larger than 20 kDa.

Embodiment 55 is the method of any one of embodiments 47-51, wherein the compounds larger than 5 kDa are compounds larger than 25 kDa.

Embodiment 56 is the method of any one of embodiments 1-55, further comprising drying the protein composition.

Embodiment 57 is the method of embodiment 56, wherein the protein composition is spray dried.

Embodiment 58 is the method of embodiment 56, wherein the protein composition is freeze dried.

Embodiment 59 is the method of any one of embodiments 1-55, further comprising pasteurizing the protein composition to obtain a pasteurized protein composition.

Embodiment 60 is the method of embodiment 59, wherein the protein composition is pasteurized by microfiltration.

Embodiment 61 is the method of embodiment 59, wherein the protein composition is Embodiment 62 is the method of embodiment 59, wherein the protein composition is pasteurized by adding one or more antimicrobials.

Embodiment 63 is the method of any one of embodiments 59-62, further comprising drying the pasteurized protein composition.

Embodiment 64 is the method of embodiment 63, wherein the pasteurized protein composition is spray dried.

Embodiment 65 is the method of embodiment 63, wherein the pasteurized protein composition is freeze dried.

Embodiment 66 is the method of any one of embodiments 1-65, wherein the amount of one or more volatile compounds is reduced by at least about 1.05-fold compared to a corresponding method in which one or more of the lysing, clarifying, or filtering steps are not performed at a pH between about 8.5 and about 12.0, wherein the volatile compound is selected from the group consisting of cysteine, 1-hexanol, 2-butylfuran, 2-methyl-2-pentenal, 3-octanone, ethyl acetate, 2-ethyl-furan, 2-pentyl-furan, pyrazine, 1-decanol, acetophenone, 1-nonanol, 2,5-dimethyl-pyrazine, dodecanal, benzeneacetaldehyde, nonanal, butyrolactone, octanal, 2-decanone, hexanal, 2-nonanone, benzaldehyde, heptanal, 2-octanone, furfural, 2-heptanone, and pentanal.

Embodiment 67 is the method of any one of embodiments 1-66, wherein the protein composition does not comprise one or more compounds selected from the group consisting of cysteine, 1-hexanol, 2-butylfuran, 2-methyl-2-pentenal, 3-octanone, ethyl acetate, 2-ethyl-furan, 2-pentyl-furan, pyrazine, 1-decanol, acetophenone, 1-nonanol, 2,5-dimethyl-pyrazine, dodecanal, benzeneacetaldehyde, nonanal, butyrolactone, octanal, 2-decanone, hexanal, 2-nonanone, benzaldehyde, heptanal, 2-octanone, furfural, 2-heptanone, and pentanal.

Embodiment 68 is the method of any one of embodiments 1-67, wherein at least about 50% of the protein in the protein composition falls between about 10 kDa and about 200 kDa.

Embodiment 69 is the method of any one of embodiments 1-3, wherein filtering the clarified lysate comprises microfiltering the clarified lysate using a filter having an average pore diameter from 0.2-2.0 μm and/or diafiltering the clarified lysate to produce the filtered lysate.

Embodiment 70 is the method of embodiment 69, wherein the diafiltering comprises using an ultrafiltration membrane system.

Embodiment 71 is the method of any one of embodiments 1-2, wherein the filtered lysate from step c), before concentrating, is further filtered.

Embodiment 72 is the method of embodiment 71, wherein the filtered lysate is ultrafiltered using a membrane having from about 10 kDa to about 30 kDa molecular weight cutoff.

Embodiment 73 is a method for purifying protein from a plurality of cells, the method comprising:
  a) lysing an aqueous suspension of the plurality of cells to obtain a cell lysate;
  b) filtering the cell lysate to obtain a protein composition; and
  c) optionally pasteurizing the protein composition to obtain a pasteurized protein composition,
  wherein steps a), b), and c) independently, are performed at a pH between about 8.5 and about 12.0.

Embodiment 74 is a method for purifying protein from a plurality of cells, the method comprising:
  a) lysing an aqueous suspension of the plurality of cells to obtain a cell lysate;
  b) filtering the cell lysate using microfiltration obtain a first filtered lysate;
  c) filtering the first filtered lysate using diafiltration to obtain a protein composition; and
  d) optionally pasteurizing the protein composition to obtain a pasteurized protein composition,
  wherein steps a), b), c), and d) independently, are performed at a pH between about 8.5 and about 12.0.

Embodiment 75 is a method for purifying protein from a plurality of cells, the method comprising:
  a) lysing an aqueous suspension of the plurality of cells to obtain a cell lysate;
  b) filtering the cell lysate using microfiltration to obtain a protein composition; and
  c) optionally pasteurizing the protein composition to obtain a pasteurized protein composition,
  wherein steps a), b), and c) independently, are performed at a pH between about 8.5 and about 12.0.

Embodiment 76 is the method of any one of embodiments 73-75, wherein filtering comprises microfiltration.

Embodiment 77 is the method of any one of embodiments 73-76, wherein filtering comprises ultrafiltration.

Embodiment 78 is the method of any one of embodiments 73-77, wherein filtering comprises diafiltration Embodiment 79 is the method of embodiment 78, where diafiltration is performed for at least two diavolumes.

Embodiment 80 is the method of any one of embodiments 73-79, wherein the plurality of cells comprises microbial cells.

Embodiment 81 is the method of any one of embodiments 73-80, wherein the plurality of cells comprises fungal cells.

Embodiment 82 is the method of embodiment 81, wherein the fungal cells are selected from the group consisting of *Saccharomyces, Pichia, Candida, Hansenula, Torulopsis, Kluyveromyces, Yarrowia*, and *Fusarium* cells.

Embodiment 83 is the method of embodiment 81, wherein the fungal cells are selected from the group consisting of *Saccharomyces cerevisiae, Pichia pastoris, Candida boidinii, Hansenula polymorpha, Kluyveromyces lactis, Yarrowia lipolytica*, and *Fusarium venenatum.*

Embodiment 84 is the method of any one of embodiments 73-83, wherein the plurality of cells comprises bacterial cells.

Embodiment 85 is the method of embodiment 84, wherein the bacterial cells are selected from the group consisting of *Bacillus, Escherichia, Lactobacillus, Corynebacterium, Pseudomonas*, and *Methanococcus.*

Embodiment 86 is the method of embodiment 84, wherein the bacterial cells are selected from the group consisting of *Escherichia coli, Bacillus subtilis, Lactobacillus lactis, Corynebacterium glutamicum, Pseudomonas fluorescens*, and *Methanococcus maripaludis.*

Embodiment 87 is the method of any one of embodiments 73-86, wherein the aqueous suspension of the plurality of cells comprises from about 2% to about 25% dry solids.

Embodiment 88 is the method of any one of embodiments 73-87, further comprising washing the aqueous suspension of the plurality of cells at a pH between about 8.5 and about 12.0 before step a).

Embodiment 89 is the method of any one of embodiments 73-88, wherein the lysing step is performed at a temperature between about 4° C. and about 15° C.

Embodiment 90 is the method of any one of embodiments 73-89, wherein the lysing step is performed biochemically.

Embodiment 91 is the method of any one of embodiments 73-90, wherein the lysing step is performed chemically.

Embodiment 92 is the method of any one of embodiments 73-91, wherein the lysing step is performed mechanically.

Embodiment 93 is the method of any one of embodiments 73-92, wherein the lysing step is performed at a pH between about 9.0 and about 12.0.

Embodiment 94 is the method of embodiment 93, wherein the lysing step is performed at a pH between about 9.0 and about 10.0.

Embodiment 95 is the method of embodiment 93, wherein the lysing step is performed at a pH between about 10.0 and about 11.0.

Embodiment 96 is the method of embodiment 93, wherein the lysing step is performed at a pH between about 11.0 and about 12.0.

Embodiment 97 is the method of any one of embodiments 73-96, wherein the lysate is diluted 1:1 with water or aqueous solution of salt or buffer before filtering, wherein the pH is between about 8.5 and about 12.0.

Embodiment 98 is the method of any one of embodiments 73-97, wherein the protein composition has a protein content of about 2 mg/mL to about 250 mg/mL.

Embodiment 99 is the method of any one of embodiments 73-98, wherein the protein composition exhibits one or more characteristics selected from the group consisting of: $H_2S$ is detectable in an amount of less than about 0.1 ppm when L-cysteine is not added to the protein composition, and $H_2S$ is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m$^2$/g protein across about pH 4.0 to about pH 8.0.

Embodiment 100 is the method of any one of embodiments 73-98, wherein the protein composition exhibits two or more characteristics selected from the group consisting of: $H_2S$ is detectable in an amount of less than about 0.1 ppm when L-cysteine is not added to the protein composition, and $H_2S$ is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m$^2$/g protein across about pH 4.0 to about pH 8.0.

Embodiment 101 is the method of any one of embodiments 73-98, wherein the protein composition exhibits three or more characteristics selected from the group consisting of: $H_2S$ is detectable in an amount of less than about 0.1 ppm when L-cysteine is not added to the protein composition, and $H_2S$ is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m$^2$/g protein across about pH 4.0 to about pH 8.0.

Embodiment 102 is the method of any one of embodiments 73-98, wherein the protein composition exhibits four or more characteristics selected from the group consisting of: $H_2S$ is detectable in an amount of less than about 0.1 ppm when L-cysteine is not added to the protein composition, and $H_2S$ is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m$^2$/g protein across about pH 4.0 to about pH 8.0.

Embodiment 103 is the method of any one of embodiments 73-98, wherein the protein composition exhibits five or more characteristics selected from the group consisting of: $H_2S$ is detectable in an amount of less than about 0.1 ppm when L-cysteine is not added to the protein composition, and $H_2S$ is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than about 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m²/g protein across about pH 4.0 to about pH 8.0.

Embodiment 104 is the method of any one of embodiments 73-98, wherein the protein composition exhibits six or more characteristics selected from the group consisting of: H$_2$S is detectable in an amount of less than about 0.1 ppm when L-cysteine is not added to the protein composition, and H$_2$S is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m²/g protein across about pH 4.0 to about pH 8.0.

Embodiment 105 is the method of any one of embodiments 73-98, wherein the protein composition exhibits seven or more characteristics selected from the group consisting of: H$_2$S is detectable in an amount of less than about 0.1 ppm when L-cysteine is not added to the protein composition, and H$_2$S is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m²/g protein across about pH 4.0 to about pH 8.0.

Embodiment 106 is the method of any one of embodiments 73-98, wherein the protein composition exhibits the characteristics:
H$_2$S is detectable in an amount of less than about 0.1 ppm when L-cysteine is not added to the protein composition, and H$_2$S is detectable in an amount of at least about 0.2 ppm in the headspace about 24 hours at 25° C. after about 25 mM L-cysteine is added to the protein composition,
the protein composition forms a gel upon heating to 65° C.,
the protein composition has a particle size distribution D10, D50, and D90 of less than 0.1 µm, 1.0 µm and 5 µm, respectively,
the protein composition is least about 80% denatured after about 20 minutes at about 85° C.,
the protein composition forms a gel with a storage modulus of at least about 100 Pa when heated at or above about 85° C. for about 20 minutes,
wherein the protein composition forms a gel between about pH 5.5 and about pH
the protein composition forms a gel in solutions with ionic strength below about 0.5 M, wherein the ionic strength is calculated based on the concentration of non-protein solutes, and
the protein composition has an emulsion activity index of greater than or equal to about 50 m²/g protein across about pH 4.0 to about pH 8.0.

Embodiment 107 is the method of any one of embodiments 73-106, wherein the protein composition comprises at least about 35%, on a dry weight basis, of compounds larger than 5 kDa.

Embodiment 108 is the method of any one of embodiments 73-106, wherein the protein composition comprises at least about 40%, on a dry weight basis, of compounds larger than 5 kDa.

Embodiment 109 is the method of any one of embodiments 73-106, wherein the protein composition comprises at least about 50%, on a dry weight basis, of compounds larger than 5 kDa.

Embodiment 110 is the method of any one of embodiments 73-106, wherein the protein composition comprises at least about 60%, on a dry weight basis, of compounds larger than 5 kDa.

Embodiment 111 is the method of any one of embodiments 73-106, wherein the protein composition comprises at least about 70%, on a dry weight basis, of compounds larger than 5 kDa.

Embodiment 112 is the method of any one of embodiments 107-111, wherein the compounds larger than 5 kDa are compounds larger than 10 kDa.

Embodiment 113 is the method of any one of embodiments 107-111, wherein the compounds larger than 5 kDa are compounds larger than 15 kDa.

Embodiment 114 is the method of any one of embodiments 107-111, wherein the compounds larger than 5 kDa are compounds larger than 20 kDa.

Embodiment 115 is the method of any one of embodiments 107-111, wherein the compounds larger than 5 kDa are compounds larger than 25 kDa.

Embodiment 116 is the method of any one of embodiments 73-115, further comprising drying the protein composition.

Embodiment 117 is the method of embodiment 116, wherein the protein composition is spray dried.

Embodiment 118 is the method of embodiment 116, wherein the protein composition is freeze dried.

Embodiment 119 is the method of any one of embodiments 73-115, further comprising pasteurizing the protein composition to obtain a pasteurized protein composition.

Embodiment 120 is the method of embodiment 119, wherein the protein composition is pasteurized by microfiltration.

Embodiment 121 is the method of embodiment 119, wherein protein composition is

Embodiment 122 is the method of embodiment 119, wherein the protein composition is pasteurized by adding one or more antimicrobials.

Embodiment 123 is the method of any one of embodiments 119-122, further comprising drying the pasteurized protein composition.

Embodiment 124 is the method of embodiment 123, wherein the pasteurized protein composition is spray dried.

Embodiment 125 is the method of embodiment 123, wherein the pasteurized protein composition is freeze dried.

Embodiment 126 is the method of any one of embodiments 73-125, wherein the amount of one or more volatile compounds is reduced by at least about 1.05-fold compared to a corresponding method in which one or more of the lysing or filtering steps are not performed at a pH between about 8.5 and about 12.0, wherein the volatile compound is selected from the group consisting of cysteine, 1-hexanol, 2-butylfuran, 2-methyl-2-pentenal, 3-octanone, ethyl acetate, 2-ethyl-furan, 2-pentyl-furan, pyrazine, 1-decanol, acetophenone, 1-nonanol, 2,5-dimethyl-pyrazine, dodecanal, benzeneacetaldehyde, nonanal, butyrolactone, octanal, 2-decanone, hexanal, 2-nonanone, benzaldehyde, heptanal, 2-octanone, furfural, 2-heptanone, and pentanal.

Embodiment 127 is the method of any one of embodiments 73-126, wherein the protein composition does not comprise one or more compounds selected from the group consisting of cysteine, 1-hexanol, 2-butylfuran, 2-methyl-2-pentenal, 3-octanone, ethyl acetate, 2-ethyl-furan, 2-pentyl-furan, pyrazine, 1-decanol, acetophenone, 1-nonanol, 2,5-dimethyl-pyrazine, dodecanal, benzeneacetaldehyde, nonanal, butyrolactone, octanal, 2-decanone, hexanal, 2-nonanone, benzaldehyde, heptanal, 2-octanone, furfural, 2-heptanone, and pentanal.

Embodiment 128 is the method of any one of embodiments 73-127, wherein at least about 50% of the protein in the protein composition falls between about 10 kDa and about 200 kDa.

Embodiment 129 is a protein composition comprising:
a plurality of functional proteins,
wherein the protein composition comprises at least about 35%, on a dry weight basis, compounds larger than 5 kDa.

Embodiment 130 is a protein composition comprising:
a plurality of functional proteins,
wherein the protein composition has a buffering capacity of less than about 2.5 mmol NaOH per gram dry solids.

Embodiment 131 is a protein composition comprising:
a plurality of functional proteins,
wherein heating a 10% (w/v) suspension of the protein composition to at least about 95° C. results in a gel with a storage modulus of at least about 100 Pa.

Embodiment 132 is the protein composition of any one of embodiments 129-131, wherein $H_2S$ is detectable in an amount of less than about 0.1 ppm in the headspace after about 24 hours at 25° C. when L-cysteine is not added to 5 mL of a 2% (w/v) suspension of the protein composition at pH 7.0.

Embodiment 133 is the protein composition of any one of embodiments 129-132, wherein $H_2S$ is detectable an amount of at least about 0.2 ppm in the headspace about 24 hours at 25° C. after about 25 mM L-cysteine is added to 5 mL of a 2% (w/v) suspension of the protein composition at pH 7.0.

Embodiment 134 is a protein composition comprising:
a plurality of functional proteins,
wherein $H_2S$ is detectable in an amount of less than about 0.1 ppm in the headspace after about 24 hours at 25° C. when L-cysteine is not added to 5 mL of a 2% (w/v) suspension of the protein composition at pH 7.0.

Embodiment 135 is the protein composition of embodiment 134, wherein $H_2S$ is detectable in an amount of at least about 0.2 ppm in the headspace about 24 hours at 25° C. after about 25 mM L-cysteine is added to 5 mL of a 2% (w/v) suspension of the protein composition at pH 7.0.

Embodiment 136 is the protein composition of any one of embodiments 129-127, wherein the protein composition comprises at least about 35%, on a dry weight basis, of compounds larger than 5 kDa.

Embodiment 137 is the protein composition of any one of embodiments 129-136, wherein the protein composition transitions to a gel upon heating to 65° C.

Embodiment 138 is the protein composition of any one of embodiments 129-137, wherein the protein composition is at least about 80% denatured after about 20 minutes at about 85° C.

Embodiment 139 is the protein composition of any one of embodiments 129-138, wherein the protein composition forms a gel with a storage modulus of at least about 100 Pa when heated at or above about 85° C. for about 20 minutes.

Embodiment 140 is the protein composition of any one of embodiments 129-139, wherein the protein composition can form a gel between about pH 5.5 and about pH 10.0.

Embodiment 141 is the protein composition of any one of embodiments 129-140, wherein the protein composition can form a gel in solutions with ionic strength below about 0.5 M, wherein the ionic strength is calculated based on the concentration of non-protein solutes.

Embodiment 142 is the protein composition of any one of embodiments 129-141, wherein the protein composition has a particle size distribution D10 of less than about 0.1 µm.

Embodiment 143 is the protein composition of any one of embodiments 129-142, wherein the protein composition has a particle size distribution D50 of less than about 1.0 µm.

Embodiment 144 is the protein composition of any one of embodiments 129-143, wherein the protein composition has a particle size distribution D90 of less than about 5 µm.

Embodiment 145 is the protein composition of any one of embodiments 129-144, wherein the protein composition has an emulsion activity index of greater than or equal to about 50 m²/g protein across about pH 4.0 to about pH 8.0.

Embodiment 146 is the protein composition of any one of embodiments 129 or 131-145, wherein the protein composition has a buffering capacity of less than about 2.5 mmol NaOH per gram dry solids Embodiment 147 is the protein composition of any one of embodiments 129-146, wherein the protein composition displays activity in one or more multi-step metabolic pathways.

Embodiment 148 is the protein composition of any one of embodiments 129-147, wherein the plurality of functional proteins comprises at least 10 different functional proteins.

Embodiment 149 is the protein composition of any one of embodiments 129-148, wherein the plurality of functional proteins comprises at least 20 different functional proteins.

Embodiment 150 is the protein composition of any one of embodiments 129-149, wherein the plurality of functional proteins comprises at least 50 different functional proteins.

Embodiment 151 is the protein composition of any one of embodiments 129-150, wherein the plurality of functional proteins comprises functional microbial proteins.

Embodiment 152 is the protein composition of any one of embodiments 129-151, wherein the plurality of functional proteins comprises functional fungal proteins.

Embodiment 153 is the protein composition of any one of embodiments 129-152, wherein the plurality of functional proteins comprises functional bacterial proteins.

Embodiment 154 is the protein composition of any one of embodiments 129-153, wherein the plurality of functional proteins comprises functional proteins from *Saccharomyces, Pichia, Candida, Hansenula, Torulopsis, Kluyveromyces, Yarrowia, Aspergillus, Trichoderma,* or *Fusarium.*

Embodiment 155 is the protein composition of any one of embodiments 129-154, wherein the plurality of functional proteins comprises functional proteins from *Saccharomyces cerevisiae, Pichia pastoris, Candida boidinii, Hansenula polymorpha, Kluyveromyces lactis, Yarrowia lipolytica,* or *Fusarium venenatum.*

Embodiment 156 is the protein composition of any one of embodiments 129-155, wherein the plurality of functional proteins comprises functional proteins from *Bacillus, Escherichia, Lactobacillus, Corynebacterium, Pseudomonas,* or *Methanococcus.*

Embodiment 157 is the protein composition of any one of embodiments 129-156, wherein the plurality of functional proteins comprises functional proteins from *E. coli, Bacillus subtilis, Lactobacillus lactis, Corynebacterium glutamicum, Pseudomonas fluorescens,* or *Methanococcus maripaludis.*

Embodiment 158 is the protein composition of any one of embodiments 129-157, wherein the plurality of functional proteins comprises one or more heterologous functional proteins.

Embodiment 159 is the protein composition of any one of embodiments 129 or 136-158, wherein the protein composition comprises at least about 40%, on a dry weight basis, of compounds larger than 5 kDa.

Embodiment 160 is the protein composition of any one of embodiments 129 or 136-158, wherein the protein composition comprises at least about 50%, on a dry weight basis, of compounds larger than 5 kDa.

Embodiment 161 is the protein composition of any one of embodiments 129 or 136-158, wherein the protein composition comprises at least about 60%, on a dry weight basis, of compounds larger than 5 kDa.

Embodiment 162 is the protein composition of any one of embodiments 129 or 136-158, wherein the protein composition comprises at least about 70%, on a dry weight basis, of compounds larger than 5 kDa.

Embodiment 163 is the protein composition of any one of embodiments 129 or 136-158, wherein the protein composition comprises at least about 80%, on a dry weight basis, of compounds larger than 5 kDa.

Embodiment 164 is the protein composition of any one of embodiments 129 or 136-163, wherein the compounds larger than 5 kDa are compounds larger than 10 kDa.

Embodiment 165 is the protein composition of any one of embodiments 129 or 136-163, wherein the compounds larger than 5 kDa are compounds larger than 15 kDa.

Embodiment 166 is the protein composition of any one of embodiments 129 or 136-163, wherein the compounds larger than 5 kDa are compounds larger than 20 kDa.

Embodiment 167 is the protein composition of any one of embodiments 129 or 136-163, wherein the compounds larger than 5 kDa are compounds larger than 25 kDa.

Embodiment 168 is the protein composition of any one of embodiments 129-167, wherein the protein composition does not comprise one or more compounds selected from the group consisting of cysteine, 1-hexanol, 2-butylfuran, 2-methyl-2-pentenal, 3-octanone, ethyl acetate, 2-ethyl-furan, 2-pentyl-furan, pyrazine, 1-decanol, acetophenone, 1-nonanol, 2,5-dimethylpyrazine, dodecanal, benzeneacetaldehyde, nonanal, butyrolactone, octanal, 2-decanone, hexanal, 2-nonanone, benzaldehyde, heptanal, 2-octanone, furfural, 2-heptanone, and pentanal.

Embodiment 169 is the protein composition of any one of embodiments 129-168, wherein at least about 50% of the protein in the protein composition falls between about kDa and about 200 kDa.

Embodiment 170 is a *Saccharomyces cerevisiae* protein composition comprising:
a plurality of functional *Saccharomyces cerevisiae* proteins,
wherein the *Saccharomyces cerevisiae* protein composition comprises at least about 35%, on a dry weight basis, compounds larger than 5 kDa, and
wherein the *Saccharomyces cerevisiae* protein composition exhibits two or more characteristics selected from the group consisting of: H₂S is detectable in an amount of less than about 0.1 ppm when L-cysteine is not added to the *Saccharomyces cerevisiae* protein composition, and H₂S is detectable in an amount of at least about 0.2 ppm in the headspace about 24 hours at 25° C. after about 25 mM L-cysteine is added to the *Saccharomyces cerevisiae* protein composition; the *Saccharomyces cerevisiae* protein composition forms a gel upon heating to 65° C.; the *Saccharomyces cerevisiae* protein composition has a particle size distribution D10, D50, and D90 of less than 0.1 μm, 1.0 μm and 5 μm, respectively; the *Saccharomyces cerevisiae* protein composition is least about 80% denatured after about 20 minutes at about 85° C.; the *Saccharomyces cerevisiae* protein composition forms a gel with a storage modulus of at least about 100 Pa when heated at or above about 85° C. for about 20 minutes; the *Saccharomyces cerevisiae* protein composition forms a gel between about pH 5.5 and about pH 10.0; the *Saccharomyces cerevisiae* protein composition forms a gel in solutions with ionic strength below about 0.5 M, wherein the ionic strength is calculated based on the concentration of non-protein solutes; and the *Saccharomyces cerevisiae* protein composition has an emulsion activity index of greater than or equal to about 50 m$^2$/g protein across about pH 4.0 to about pH 8.0.

Embodiment 171 is the *Saccharomyces cerevisiae* protein composition of embodiment 170, wherein the *Saccharomyces cerevisiae* protein composition exhibits three or more characteristics selected from the group consisting of: H$_2$S is detectable in an amount of less than about 0.1 ppm when L-cysteine is not added to the *Saccharomyces cerevisiae* protein composition, and H$_2$S is detectable in an amount of at least about 0.2 ppm in the headspace about 24 hours at 25° C. after about 25 mM L-cysteine is added to the *Saccharomyces cerevisiae* protein composition; the *Saccharomyces cerevisiae* protein composition forms a gel upon heating to 65° C.; the *Saccharomyces cerevisiae* protein composition has a particle size distribution D10, D50, and D90 of less than 0.1 μm, 1.0 μm and 5 μm, respectively; the *Saccharomyces cerevisiae* protein composition is least about 80% denatured after about 20 minutes at about 85° C.; the *Saccharomyces cerevisiae* protein composition forms a gel with a storage modulus of at least about 100 Pa when heated at or above about 85° C. for about 20 minutes; the *Saccharomyces cerevisiae* protein composition forms a gel between about pH 5.5 and about pH 10.0; the *Saccharomyces cerevisiae* protein composition forms a gel in solutions with ionic strength below about 0.5 M, wherein the ionic strength is calculated based on the concentration of non-protein solutes; and the *Saccharomyces cerevisiae* protein composition has an emulsion activity index of greater than or equal to about 50 m$^2$/g protein across about pH 4.0 to about pH 8.0.

Embodiment 172 is the *Saccharomyces cerevisiae* protein composition of embodiment 170, wherein the *Saccharomyces cerevisiae* protein composition exhibits four or more characteristics selected from the group consisting of: H$_2$S is detectable in an amount of less than about 0.1 ppm when L-cysteine is not added to the *Saccharomyces cerevisiae* protein composition, and H$_2$S is detectable in an amount of at least about 0.2 ppm in the headspace about 24 hours at 25° C. after about 25 mM L-cysteine is added to the *Saccharomyces cerevisiae* protein composition; the *Saccharomyces cerevisiae* protein composition forms a gel upon heating to 65° C.; the *Saccharomyces cerevisiae* protein composition has a particle size distribution D10, D50, and D90 of less than 0.1 μm, 1.0 μm and 5 μm, respectively; the *Saccharomyces cerevisiae* protein composition is least about 80% denatured after about 20 minutes at about 85° C.; the *Saccharomyces cerevisiae* protein composition forms a gel with a storage modulus of at least about 100 Pa when heated at or above about 85° C. for about 20 minutes; the *Saccharomyces cerevisiae* protein composition forms a gel between about pH 5.5 and about pH 10.0; the *Saccharomyces cerevisiae* protein composition forms a gel in solutions with ionic strength below about 0.5 M, wherein the ionic strength is calculated based on the concentration of non-protein solutes; and the *Saccharomyces cerevisiae* protein composition has an emulsion activity index of greater than or equal to about 50 m$^2$/g protein across about pH 4.0 to about pH 8.0.

Embodiment 173 is the *Saccharomyces cerevisiae* protein composition of embodiment 170, wherein the *Saccharomyces cerevisiae* protein composition exhibits five or more characteristics selected from the group consisting of: H$_2$S is detectable in an amount of less than about 0.1 ppm when L-cysteine is not added to the *Saccharomyces cerevisiae* protein composition, and H$_2$S is detectable in an amount of at least about 0.2 ppm in the headspace about 24 hours at 25° C. after about 25 mM L-cysteine is added to the *Saccharomyces cerevisiae* protein composition; the *Saccharomyces cerevisiae* protein composition forms a gel upon heating to 65° C.; the *Saccharomyces cerevisiae* protein composition has a particle size distribution D10, D50, and D90 of less than 0.1 μm, 1.0 μm and 5 μm, respectively; the *Saccharomyces cerevisiae* protein composition is least about 80% denatured after about 20 minutes at about 85° C.; the *Saccharomyces cerevisiae* protein composition forms a gel with a storage modulus of at least about 100 Pa when heated at or above about 85° C. for about 20 minutes; the *Saccharomyces cerevisiae* protein composition forms a gel between about pH 5.5 and about pH 10.0; the *Saccharomyces cerevisiae* protein composition forms a gel in solutions with ionic strength below about 0.5 M, wherein the ionic strength is calculated based on the concentration of non-protein solutes; and the *Saccharomyces cerevisiae* protein composition has an emulsion activity index of greater than or equal to about 50 m$^2$/g protein across about pH 4.0 to about pH 8.0.

Embodiment 174 is the *Saccharomyces cerevisiae* protein composition of embodiment 170, wherein the *Saccharomyces cerevisiae* protein composition exhibits six or more characteristics selected from the group consisting of: H$_2$S is detectable in an amount of less than about 0.1 ppm when L-cysteine is not added to the *Saccharomyces cerevisiae* protein composition, and H$_2$S is detectable in an amount of at least about 0.2 ppm in the headspace about 24 hours at 25° C. after about 25 mM L-cysteine is added to the *Saccharomyces cerevisiae* protein composition; the *Saccharomyces cerevisiae* protein composition forms a gel upon heating to 65° C.; the *Saccharomyces cerevisiae* protein composition has a particle size distribution D10, D50, and D90 of less than 0.1 μm, 1.0 μm and 5 μm, respectively; the *Saccharomyces cerevisiae* protein composition is least about 80% denatured after about 20 minutes at about 85° C.; the *Saccharomyces cerevisiae* protein composition forms a gel with a storage modulus of at least about 100 Pa when heated at or above about 85° C. for about 20 minutes; the *Saccharomyces cerevisiae* protein composition forms a gel between about pH 5.5 and about pH 10.0; the *Saccharomyces cerevisiae* protein composition forms a gel in solutions with ionic strength below about 0.5 M, wherein the ionic strength is calculated based on the concentration of non-protein solutes; and the *Saccharomyces cerevisiae* protein composition has an emulsion activity index of greater than or equal to about 50 m$^2$/g protein across about pH 4.0 to about pH 8.0.

Embodiment 175 is the *Saccharomyces cerevisiae* protein composition of embodiment 170, wherein the *Saccharomyces cerevisiae* protein composition exhibits seven or more characteristics selected from the group consisting of: H$_2$S is detectable in an amount of less than about 0.1 ppm when L-cysteine is not added to the *Saccharomyces cerevisiae* protein composition, and H$_2$S is detectable in an amount of at least about 0.2 ppm in the headspace about 24 hours at 25° C. after about 25 mM L-cysteine is added to the *Saccharomyces cerevisiae* protein composition; the *Saccharomyces cerevisiae* protein composition forms a gel upon heating to 65° C.; the *Saccharomyces cerevisiae* protein composition has a particle size distribution D10, D50, and D90 of less than 0.1 μm, 1.0 μm and 5 μm, respectively; the *Saccharomyces cerevisiae* protein composition is least about 80% denatured after about 20 minutes at about 85° C.; the *Saccharomyces cerevisiae* protein composition forms a gel with a storage modulus of at least about 100 Pa when heated at or above about 85° C. for about 20 minutes; the *Saccharomyces cerevisiae* protein composition forms a gel between about pH 5.5 and about pH 10.0; the *Saccharomyces cerevisiae* protein composition forms a gel in solutions with ionic strength below about 0.5 M, wherein the ionic strength is calculated based on the concentration of non-protein solutes; and the *Saccharomyces cerevisiae* protein composition has an emulsion activity index of greater than or equal to about 50 m$^2$/g protein across about pH 4.0 to about pH 8.0.

Embodiment 176 is the *Saccharomyces cerevisiae* protein composition of embodiment 170, wherein the *Saccharomyces cerevisiae* protein composition exhibits the characteristics:

H$_2$S is detectable in an amount of less than about 0.1 ppm when L-cysteine is not added to the *Saccharomyces cerevisiae* protein composition, and H$_2$S is detectable in an amount of at least about 0.2 ppm in the headspace about 24 hours at 25° C. after about 25 mM L-cysteine is added to the *Saccharomyces cerevisiae* protein composition, wherein the *Saccharomyces cerevisiae* protein composition forms a gel upon heating to 65° C., wherein the *Saccharomyces cerevisiae* protein composition has a particle size distribution D10, D50, and D90 of less than 0.1 μm, 1.0 μm and 5 μm, respectively, wherein the *Saccharomyces cerevisiae* protein composition is least about 80% denatured after about 20 minutes at about 85° C., wherein the *Saccharomyces cerevisiae* protein composition forms a gel with a storage modulus of at least about 100 Pa when heated at or above about 85° C. for about 20 minutes, wherein the *Saccharomyces cerevisiae* protein composition forms a gel between about pH 5.5 and about pH 10.0, wherein the *Saccharomyces cerevisiae* protein composition forms a gel in solutions with ionic strength below about 0.5 M, wherein the ionic strength is calculated based on the concentration of non-protein solutes, and wherein the *Saccharomyces cerevisiae* protein composition has an emulsion activity index of greater than or equal to about 50 m$^2$/g protein across about pH 4.0 to about pH 8.0.

Embodiment 177 is the *Saccharomyces cerevisiae* protein composition of any one of embodiments 170-176, wherein the protein composition comprises at least about 40%, on a dry weight basis, of compounds larger than 5 kDa.

Embodiment 178 is the *Saccharomyces cerevisiae* protein composition of any one of embodiments 170-176, wherein the protein composition comprises at least about 50%, on a dry weight basis, of compounds larger than 5 kDa.

Embodiment 179 is the *Saccharomyces cerevisiae* protein composition of any one of embodiments 170-176, wherein the protein composition comprises at least about 60%, on a dry weight basis, of compounds larger than 5 kDa.

Embodiment 180 is the *Saccharomyces cerevisiae* protein composition of any one of embodiments 170-176, wherein the protein composition comprises at least about 70%, on a dry weight basis, of compounds larger than 5 kDa.

Embodiment 181 is the *Saccharomyces cerevisiae* protein composition of any one of embodiments 170-176, wherein the protein composition comprises at least about 80%, on a dry weight basis, of compounds larger than 5 kDa.

Embodiment 182 is the *Saccharomyces cerevisiae* protein composition of any one of embodiments 170-181, wherein the compounds larger than 5 kDa are compounds larger than 10 kDa.

Embodiment 183 is the *Saccharomyces cerevisiae* protein composition of any one of embodiments 170-181, wherein the compounds larger than 5 kDa are compounds larger than 15 kDa.

Embodiment 184 is the *Saccharomyces cerevisiae* protein composition of any one of embodiments 170-181, wherein the compounds larger than 5 kDa are compounds larger than 20 kDa.

Embodiment 185 is the *Saccharomyces cerevisiae* protein composition of any one of embodiments 170-181, wherein the compounds larger than 5 kDa are compounds larger than 25 kDa.

Embodiment 186 is the *Saccharomyces cerevisiae* protein composition of any one of embodiments 170-185, wherein the protein composition does not comprise one or more compounds selected from the group consisting of cysteine, 1-hexanol, 2-butylfuran, 2-methyl-2-pentenal, 3-octanone, ethyl acetate, 2-ethyl-furan, 2-pentyl-furan, pyrazine, 1-decanol, acetophenone, 1-nonanol, 2,5-dimethyl-pyrazine, dodecanal, benzeneacetaldehyde, nonanal, butyrolactone, octanal, 2-decanone, hexanal, 2-nonanone, benzaldehyde, heptanal, 2-octanone, furfural, 2-heptanone, and pentanal.

Embodiment 187 is the *Saccharomyces cerevisiae* protein composition of any one of embodiments 170-186, wherein at least about 50% of the protein in the protein composition falls between about 10 kDa and about 200 kDa.

Embodiment 188 is a *Pichia pastoris* protein composition comprising:

a plurality of functional *Pichia pastoris* proteins, wherein the *Pichia pastoris* protein composition comprises at least about 35%, on a dry weight basis, compounds larger than 5 kDa, and wherein the *Pichia pastoris* protein composition exhibits two or more characteristics selected from the group consisting of: H$_2$S is detectable in an amount of less than about 0.1 ppm when L-cysteine is not added to the *Pichia pastoris* protein composition, and H$_2$S is detectable in an amount of at least about ppm in the headspace about 24 hours at 25° C. after about 25 mM L-cysteine is added to the *Pichia pastoris* protein composition; the *Pichia pastoris* protein composition forms a gel upon heating to 65° C.; the *Pichia pastoris* protein composition has a particle size distribution D10, D50, and D90 of less than 0.1 µm, 1.0 µm and 5 µm, respectively; the *Pichia pastoris* protein composition is least about 80% denatured after about 20 minutes at about 85° C.; the *Pichia pastoris* protein composition forms a gel with a storage modulus of at least about 100 Pa when heated at or above about 85° C. for about 20 minutes; the *Pichia pastoris* protein composition forms a gel between about pH 5.5 and about pH 10.0; the *Pichia pastoris* protein composition forms a gel in solutions with ionic strength below about 0.5 M, wherein the ionic strength is calculated based on the concentration of non-protein solutes; and the *Pichia pastoris* protein composition has an emulsion activity index of greater than or equal to about 50 m$^2$/g protein across about pH 4.0 to about pH 8.0.

Embodiment 189 is the *Pichia pastoris* protein composition of embodiment 188, wherein the *Pichia pastoris* protein composition exhibits three or more characteristics selected from the group consisting of: H$_2$S is detectable in an amount of less than about 0.1 ppm when L-cysteine is not added to the *Pichia pastoris* protein composition, and H$_2$S is detectable in an amount of at least about 0.2 ppm in the headspace about 24 hours at 25° C. after about 25 mM L-cysteine is added to the *Pichia pastoris* protein composition; the *Pichia pastoris* protein composition forms a gel upon heating to 65° C.; the *Pichia pastoris* protein composition has a particle size distribution D10, D50, and D90 of less than 0.1 µm, 1.0 µm and 5 µm, respectively; the *Pichia pastoris* protein composition is least about 80% denatured after about 20 minutes at about 85° C.; the *Pichia pastoris* protein composition forms a gel with a storage modulus of at least about 100 Pa when heated at or above about 85° C. for about 20 minutes; the *Pichia pastoris* protein composition forms a gel between about pH 5.5 and about pH 10.0; the *Pichia pastoris* protein composition forms a gel in solutions with ionic strength below about 0.5 M, wherein the ionic strength is calculated based on the concentration of non-protein solutes; and the *Pichia pastoris* protein composition has an emulsion activity index of greater than or equal to about 50 m$^2$/g protein across about pH 4.0 to about pH 8.0.

Embodiment 190 is the *Pichia pastoris* protein composition of embodiment 188, wherein the *Pichia pastoris* protein composition exhibits four or more characteristics selected from the group consisting of: H$_2$S is detectable in an amount of less than about 0.1 ppm when L-cysteine is not added to the *Pichia pastoris* protein composition, and H$_2$S is detectable in an amount of at least about 0.2 ppm in the headspace about 24 hours at 25° C. after about 25 mM L-cysteine is added to the *Pichia pastoris* protein composition; the *Pichia pastoris* protein composition forms a gel upon heating to 65° C.; the *Pichia pastoris* protein composition has a particle size distribution D10, D50, and D90 of less than 0.1 µm, 1.0 µm and 5 µm, respectively; the *Pichia pastoris* protein composition is least about 80% denatured after about 20 minutes at about 85° C.; the *Pichia pastoris* protein composition forms a gel with a storage modulus of at least about 100 Pa when heated at or above about 85° C. for about 20 minutes; the *Pichia pastoris* protein composition forms a gel between about pH 5.5 and about pH 10.0; the *Pichia pastoris* protein composition forms a gel in solutions with ionic strength below about 0.5 M, wherein the ionic strength is calculated based on the concentration of non-protein solutes; and the *Pichia pastoris* protein composition has an emulsion activity index of greater than or equal to about 50 m$^2$/g protein across about pH 4.0 to about pH 8.0.

Embodiment 191 is the *Pichia pastoris* protein composition of embodiment 188, wherein the *Pichia pastoris* protein composition exhibits five or more characteristics selected from the group consisting of: H$_2$S is detectable in an amount of less than about 0.1 ppm when L-cysteine is not added to the *Pichia pastoris* protein composition, and H$_2$S is detectable in an amount of at least about 0.2 ppm in the headspace about 24 hours at 25° C. after about 25 mM L-cysteine is added to the *Pichia pastoris* protein composition; the *Pichia pastoris* protein composition forms a gel upon heating to 65° C.; the *Pichia pastoris* protein composition has a particle size distribution D10, D50, and D90 of less than 0.1 µm, 1.0 µm and 5 µm, respectively; the *Pichia pastoris* protein composition is least about 80% denatured after about 20 minutes at about 85° C.; the *Pichia pastoris* protein composition forms a gel with a storage modulus of at least about 100 Pa when heated at or above about 85° C. for about 20 minutes; the *Pichia pastoris* protein composition forms a gel between about pH 5.5 and about pH 10.0; the *Pichia pastoris* protein composition forms a gel in solutions with ionic strength below about 0.5 M, wherein the ionic strength is calculated based on the concentration of non-protein solutes; and the *Pichia pastoris* protein composition has an emulsion activity index of greater than or equal to about 50 m$^2$/g protein across about pH 4.0 to about pH 8.0.

Embodiment 192 is the *Pichia pastoris* protein composition of embodiment 188, wherein the *Pichia pastoris* protein composition exhibits six or more characteristics selected from the group consisting of: H$_2$S is detectable in an amount of less than about 0.1 ppm when L-cysteine is not added to the *Pichia pastoris* protein composition, and H$_2$S is detectable in an amount of at least about 0.2 ppm in the headspace about 24 hours at 25° C. after about 25 mM L-cysteine is added to the *Pichia pastoris* protein composition; the *Pichia pastoris* protein composition forms a gel upon heating to 65° C.; the *Pichia pastoris* protein composition has a particle size distribution D10, D50, and D90 of less than 0.1 µm, 1.0 µm and 5 µm, respectively; the *Pichia pastoris* protein composition is least about 80% denatured after about 20 minutes at about 85° C.; the *Pichia pastoris* protein composition forms a gel with a storage modulus of at least about 100 Pa when heated at or above about 85° C. for about 20 minutes; the *Pichia pastoris* protein composition forms a gel between about pH 5.5 and about pH 10.0; the *Pichia pastoris* protein composition forms a gel in solutions with ionic strength below about 0.5 M, wherein the ionic strength is calculated based on the concentration of non-protein solutes; and the *Pichia pastoris* protein composition has an emulsion activity index of greater than or equal to about 50 m$^2$/g protein across about pH 4.0 to about pH 8.0.

Embodiment 193 is the *Pichia pastoris* protein composition of embodiment 188, wherein the *Pichia pastoris* protein composition exhibits seven or more characteristics selected from the group consisting of: H$_2$S is detectable in an amount of less than about 0.1 ppm when L-cysteine is not added to the *Pichia pastoris* protein composition, and $H_2S$ is detectable in an amount of at least about 0.2 ppm in the headspace about 24 hours at 25° C. after about 25 mM L-cysteine is added to the *Pichia pastoris* protein composition; the *Pichia pastoris* protein composition forms a gel upon heating to 65° C.; the *Pichia pastoris* protein composition has a particle size distribution D10, D50, and D90 of less than 0.1 µm, 1.0 µm and 5 µm, respectively; the *Pichia pastoris* protein composition is least about 80% denatured after about 20 minutes at about 85° C.; the *Pichia pastoris* protein composition forms a gel with a storage modulus of at least about 100 Pa when heated at or above about 85° C. for about 20 minutes; the *Pichia pastoris* protein composition forms a gel between about pH 5.5 and about pH 10.0; the *Pichia pastoris* protein composition forms a gel in solutions with ionic strength below about 0.5 M, wherein the ionic strength is calculated based on the concentration of non-protein solutes; and the *Pichia pastoris* protein composition has an emulsion activity index of greater than or equal to about 50 $m^2/g$ protein across about pH 4.0 to about pH 8.0.

Embodiment 194 is the *Pichia pastoris* protein composition of embodiment 188, wherein the *Pichia pastoris* protein composition exhibits the characteristics:
  $H_2S$ is detectable in an amount of less than about 0.1 ppm when L-cysteine is not added to the *Pichia pastoris* protein composition, and $H_2S$ is detectable in an amount of at least about 0.2 ppm in the headspace about 24 hours at 25° C. after about 25 mM L-cysteine is added to the *Pichia pastoris* protein composition, wherein the *Pichia pastoris* protein composition forms a gel upon heating to 65° C.,
  wherein the *Pichia pastoris* protein composition has a particle size distribution D10, D50, and D90 of less than 0.1 µm, 1.0 µm and 5 µm, respectively, wherein the *Pichia pastoris* protein composition is least about 80% denatured after about 20 minutes at about 85° C.,
  wherein the *Pichia pastoris* protein composition forms a gel with a storage modulus of at least about 100 Pa when heated at or above about 85° C. for about 20 minutes,
  wherein the *Pichia pastoris* protein composition forms a gel between about pH 5.5 and about pH 10.0,
  wherein the *Pichia pastoris* protein composition forms a gel in solutions with ionic strength below about 0.5 M, wherein the ionic strength is calculated based on the concentration of non-protein solutes, and
  wherein the *Pichia pastoris* protein composition has an emulsion activity index of greater than or equal to about 50 $m^2/g$ protein across about pH 4.0 to about pH 8.0.

Embodiment 195 is the *Pichia pastoris* protein composition of any one of embodiments 188-194, wherein the protein composition comprises at least about 40%, on a dry weight basis, of compounds larger than 5 kDa.

Embodiment 196 is the *Pichia pastoris* protein composition of any one of embodiments 188-194, wherein the protein composition comprises at least about 50%, on a dry weight basis, of compounds larger than 5 kDa.

Embodiment 197 is the *Pichia pastoris* protein composition of any one of embodiments 188-194, wherein the protein composition comprises at least about 60%, on a dry weight basis, of compounds larger than 5 kDa.

Embodiment 198 is the *Pichia pastoris* protein composition of any one of embodiments 188-194, wherein the protein composition comprises at least about 70%, on a dry weight basis, of compounds larger than 5 kDa.

Embodiment 199 is the *Pichia pastoris* protein composition of any one of embodiments 188-194, wherein the protein composition comprises at least about 80%, on a dry weight basis, of compounds larger than 5 kDa.

Embodiment 200 is the *Pichia pastoris* protein composition of any one of embodiments 188-199, wherein the compounds larger than 5 kDa are compounds larger than 10 kDa.

Embodiment 201 is the *Pichia pastoris* protein composition of any one of embodiments 188-199, wherein the compounds larger than 5 kDa are compounds larger than 15 kDa.

Embodiment 202 is the *Pichia pastoris* protein composition of any one of embodiments 188-199, wherein the compounds larger than 5 kDa are compounds larger than 20 kDa.

Embodiment 203 is the *Pichia pastoris* protein composition of any one of embodiments 188-199, wherein the compounds larger than 5 kDa are compounds larger than 25 kDa.

Embodiment 204 is the *Pichia pastoris* protein composition of any one of embodiments 188-203, wherein the protein composition does not comprise one or more compounds selected from the group consisting of cysteine, 1-hexanol, 2-butylfuran, 2-methyl-2-pentenal, 3-octanone, ethyl acetate, 2-ethyl-furan, 2-pentyl-furan, pyrazine, 1-decanol, acetophenone, 1-nonanol, 2,5-dimethyl-pyrazine, dodecanal, benzeneacetaldehyde, nonanal, butyrolactone, octanal, 2-decanone, hexanal, 2-nonanone, benzaldehyde, heptanal, 2-octanone, furfural, 2-heptanone, and pentanal.

Embodiment 205 is the *Pichia pastoris* protein composition of any one of embodiments 188-204, wherein at least about 50% of the protein in the protein composition falls between about 10 kDa and about 200 kDa.

Embodiment 206 is an *Escherichia coli* protein composition comprising:
  a plurality of functional *Escherichia coli* proteins,
  wherein the *Escherichia coli* protein composition comprises at least about 35%, on a dry weight basis, compounds larger than 5 kDa, and
  wherein the *Escherichia coli* protein composition exhibits two or more characteristics selected from the group consisting of: $H_2S$ is detectable in an amount of less than about 0.1 ppm when L-cysteine is not added to the *Escherichia coli* protein composition, and $H_2S$ is detectable in an amount of at least about 0.2 ppm in the headspace about 24 hours at 25° C. after about 25 mM L-cysteine is added to the *Escherichia coli* protein composition; the *Escherichia coli* protein composition forms a gel upon heating to 65° C.; the *Escherichia coli* protein composition has a particle size distribution D10, D50, and D90 of less than 0.1 µm, 1.0 µm and 5 µm, respectively; the *Escherichia coli* protein composition is least about 80% denatured after about 20 minutes at about 85° C.; the *Escherichia coli* protein composition forms a gel with a storage modulus of at least about 100 Pa when heated at or above about 85° C. for about 20 minutes; the *Escherichia coli* protein composition forms a gel between about pH 5.5 and about pH 10.0; the *Escherichia coli* protein composition forms a gel in solutions with ionic strength below about 0.5 M, wherein the ionic strength is calculated based on the concentration of non-protein solutes; and the *Escherichia coli* protein composition has an emulsion activity index of greater than or equal to about 50 m$^2$/g protein across about pH 4.0 to about pH 8.0.

Embodiment 207 is the *Escherichia coli* protein composition of embodiment 206, wherein the *Escherichia coli* protein composition exhibits three or more characteristics selected from the group consisting of: H$_2$S is detectable in an amount of less than about 0.1 ppm when L-cysteine is not added to the *Escherichia coli* protein composition, and H$_2$S is detectable in an amount of at least about 0.2 ppm in the headspace about 24 hours at 25° C. after about 25 mM L-cysteine is added to the *Escherichia coli* protein composition; the *Escherichia coli* protein composition forms a gel upon heating to 65° C.; the *Escherichia coli* protein composition has a particle size distribution D10, D50, and D90 of less than 0.1 µm, 1.0 µm and 5 µm, respectively; the *Escherichia coli* protein composition is least about 80% denatured after about 20 minutes at about 85° C.; the *Escherichia coli* protein composition forms a gel with a storage modulus of at least about 100 Pa when heated at or above about 85° C. for about 20 minutes; the *Escherichia coli* protein composition forms a gel between about pH 5.5 and about pH 10.0; the *Escherichia coli* protein composition forms a gel in solutions with ionic strength below about 0.5 M, wherein the ionic strength is calculated based on the concentration of non-protein solutes; and the *Escherichia coli* protein composition has an emulsion activity index of greater than or equal to about 50 m$^2$/g protein across about pH 4.0 to about pH 8.0.

Embodiment 208 is the *Escherichia coli* protein composition of embodiment 206, wherein the *Escherichia coli* protein composition exhibits four or more characteristics selected from the group consisting of: H$_2$S is detectable in an amount of less than about 0.1 ppm when L-cysteine is not added to the *Escherichia coli* protein composition, and H$_2$S is detectable in an amount of at least about 0.2 ppm in the headspace about 24 hours at 25° C. after about 25 mM L-cysteine is added to the *Escherichia coli* protein composition; the *Escherichia coli* protein composition forms a gel upon heating to 65° C.; the *Escherichia coli* protein composition has a particle size distribution D10, D50, and D90 of less than 0.1 µm, 1.0 µm and 5 µm, respectively; the *Escherichia coli* protein composition is least about 80% denatured after about 20 minutes at about 85° C.; the *Escherichia coli* protein composition forms a gel with a storage modulus of at least about 100 Pa when heated at or above about 85° C. for about 20 minutes; the *Escherichia coli* protein composition forms a gel between about pH 5.5 and about pH 10.0; the *Escherichia coli* protein composition forms a gel in solutions with ionic strength below about 0.5 M, wherein the ionic strength is calculated based on the concentration of non-protein solutes; and the *Escherichia coli* protein composition has an emulsion activity index of greater than or equal to about 50 m$^2$/g protein across about pH 4.0 to about pH 8.0.

Embodiment 209 is the *Escherichia coli* protein composition of embodiment 206, wherein the *Escherichia coli* protein composition exhibits five or more characteristics selected from the group consisting of: H$_2$S is detectable in an amount of less than about 0.1 ppm when L-cysteine is not added to the *Escherichia coli* protein composition, and H$_2$S is detectable in an amount of at least about 0.2 ppm in the headspace about 24 hours at 25° C. after about 25 mM L-cysteine is added to the *Escherichia coli* protein composition; the *Escherichia coli* protein composition forms a gel upon heating to 65° C.; the *Escherichia coli* protein composition has a particle size distribution D10, D50, and D90 of less than 0.1 µm, 1.0 µm and 5 µm, respectively; the *Escherichia coli* protein composition is least about 80% denatured after about 20 minutes at about 85° C.; the *Escherichia coli* protein composition forms a gel with a storage modulus of at least about 100 Pa when heated at or above about 85° C. for about 20 minutes; the *Escherichia coli* protein composition forms a gel between about pH 5.5 and about pH 10.0; the *Escherichia coli* protein composition forms a gel in solutions with ionic strength below about 0.5 M, wherein the ionic strength is calculated based on the concentration of non-protein solutes; and the *Escherichia coli* protein composition has an emulsion activity index of greater than or equal to about 50 m$^2$/g protein across about pH 4.0 to about pH 8.0.

Embodiment 210 is the *Escherichia coli* protein composition of embodiment 206, wherein the *Escherichia coli* protein composition exhibits six or more characteristics selected from the group consisting of: H$_2$S is detectable in an amount of less than about 0.1 ppm when L-cysteine is not added to the *Escherichia coli* protein composition, and H$_2$S is detectable in an amount of at least about 0.2 ppm in the headspace about 24 hours at 25° C. after about 25 mM L-cysteine is added to the *Escherichia coli* protein composition; the *Escherichia coli* protein composition forms a gel upon heating to 65° C.; the *Escherichia coli* protein composition has a particle size distribution D10, D50, and D90 of less than 0.1 µm, 1.0 µm and 5 µm, respectively; the *Escherichia coli* protein composition is least about 80% denatured after about 20 minutes at about 85° C.; the *Escherichia coli* protein composition forms a gel with a storage modulus of at least about 100 Pa when heated at or above about 85° C. for about 20 minutes; the *Escherichia coli* protein composition forms a gel between about pH 5.5 and about pH 10.0; the *Escherichia coli* protein composition forms a gel in solutions with ionic strength below about 0.5 M, wherein the ionic strength is calculated based on the concentration of non-protein solutes; and the *Escherichia coli* protein composition has an emulsion activity index of greater than or equal to about 50 m$^2$/g protein across about pH 4.0 to about pH 8.0.

Embodiment 211 is the *Escherichia coli* protein composition of embodiment 206, wherein the *Escherichia coli* protein composition exhibits seven or more characteristics selected from the group consisting of: H$_2$S is detectable in an amount of less than about 0.1 ppm when L-cysteine is not added to the *Escherichia coli* protein composition, and H$_2$S is detectable in an amount of at least about 0.2 ppm in the headspace about 24 hours at 25° C. after about 25 mM L-cysteine is added to the *Escherichia coli* protein composition; the *Escherichia coli* protein composition forms a gel upon heating to 65° C.; the *Escherichia coli* protein composition has a particle size distribution D10, D50, and D90 of less than 0.1 µm, 1.0 µm and 5 µm, respectively; the *Escherichia coli* protein composition is least about 80% denatured after about 20 minutes at about 85° C.;

the *Escherichia coli* protein composition forms a gel with a storage modulus of at least about 100 Pa when heated at or above about 85° C. for about 20 minutes; the *Escherichia coli* protein composition forms a gel between about pH 5.5 and about pH 10.0; the *Escherichia coli* protein composition forms a gel in solutions with ionic strength below about 0.5 M, wherein the ionic strength is calculated based on the concentration of non-protein solutes; and the *Escherichia coli* protein composition has an emulsion activity index of greater than or equal to about 50 m$^2$/g protein across about pH 4.0 to about pH 8.0.

Embodiment 212 is the *Escherichia coli* protein composition of embodiment 206, wherein the *Escherichia coli* protein composition exhibits the characteristics:
  H$_2$S is detectable in an amount of less than about 0.1 ppm when L-cysteine is not added to the *Escherichia coli* protein composition, and H$_2$S is detectable in an amount of at least about 0.2 ppm in the headspace about 24 hours at 25° C. after about 25 mM L-cysteine is added to the *Escherichia coli* protein composition, wherein the *Escherichia coli* protein composition forms a gel upon heating to 65° C.,
  wherein the *Escherichia coli* protein composition has a particle size distribution D10, D50, and D90 of less than 0.1 µm, 1.0 µm and 5 µm, respectively,
  wherein the *Escherichia coli* protein composition is least about 80% denatured after about 20 minutes at about 85° C.,
  wherein the *Escherichia coli* protein composition forms a gel with a storage modulus of at least about 100 Pa when heated at or above about 85° C. for about 20 minutes,
  wherein the *Escherichia coli* protein composition forms a gel between about pH 5.5 and about pH 10.0,
  wherein the *Escherichia coli* protein composition forms a gel in solutions with ionic strength below about 0.5 M, wherein the ionic strength is calculated based on the concentration of non-protein solutes, and
  wherein the *Escherichia coli* protein composition has an emulsion activity index of greater than or equal to about 50 m$^2$/g protein across about pH 4.0 to about pH 8.0.

Embodiment 213 is the *Escherichia coli* protein composition of any one of embodiments 206-212, wherein the protein composition comprises at least about 40%, on a dry weight basis, of compounds larger than 5 kDa.

Embodiment 214 is the *Escherichia coli* protein composition of any one of embodiments 206-212, wherein the protein composition comprises at least about 50%, on a dry weight basis, of compounds larger than 5 kDa.

Embodiment 215 is the *Escherichia coli* protein composition of any one of embodiments 206-212, wherein the protein composition comprises at least about 60%, on a dry weight basis, of compounds larger than 5 kDa.

Embodiment 216 is the *Escherichia coli* protein composition of any one of embodiments 206-212, wherein the protein composition comprises at least about 70%, on a dry weight basis, of compounds larger than 5 kDa.

Embodiment 217 is the *Escherichia coli* protein composition of any one of embodiments 206-216, wherein the protein composition comprises at least about 80%, on a dry weight basis, of compounds larger than 5 kDa.

Embodiment 218 is the *Escherichia coli* protein composition of any one of embodiments 206-216, wherein the compounds larger than 5 kDa are compounds larger than 10 kDa.

Embodiment 219 is the *Escherichia coli* protein composition of any one of embodiments 206-216, wherein the compounds larger than 5 kDa are compounds larger than 15 kDa.

Embodiment 220 is the *Escherichia coli* protein composition of any one of embodiments 206-216, wherein the compounds larger than 5 kDa are compounds larger than 20 kDa.

Embodiment 221 is the *Escherichia coli* protein composition of any one of embodiments 206-216, wherein the compounds larger than 5 kDa are compounds larger than 25 kDa.

Embodiment 222 is the *Escherichia coli* protein composition of any one of embodiments 206-221, wherein the protein composition does not comprise one or more compounds selected from the group consisting of cysteine, 1-hexanol, 2-butylfuran, 2-methyl-2-pentenal, 3-octanone, ethyl acetate, 2-ethyl-furan, 2-pentylfuran, pyrazine, 1-decanol, acetophenone, 1-nonanol, 2,5-dimethyl-pyrazine, dodecanal, benzeneacetaldehyde, nonanal, butyrolactone, octanal, 2-decanone, hexanal, 2-nonanone, benzaldehyde, heptanal, 2-octanone, furfural, 2-heptanone, and pentanal.

Embodiment 223 is the *Escherichia coli* protein composition of any one of embodiments 206-222, wherein at least about 50% of the protein in the protein composition falls between about 10 kDa and about 200 kDa.

Embodiment 224 is a protein composition produced by a method comprising:
  a) lysing an aqueous suspension of the plurality of cells to obtain a cell lysate;
  b) clarifying the cell lysate, optionally in the presence of one or more flocculants, to obtain a clarified lysate;
  c) filtering the clarified lysate to obtain a filtered lysate;
  d) concentrating the filtered lysate to obtain a protein composition; and
  e) optionally pasteurizing the protein composition of protein to obtain a pasteurized protein composition,
  wherein steps a), b), c), d), and e) independently, are performed at a pH between about 8.5 and about 12.0.

Embodiment 225 is a protein composition produced by a method comprising:
  a) lysing an aqueous suspension of the plurality of cells to obtain a cell lysate;
  b) clarifying the cell lysate, optionally in the presence of one or more flocculants, to obtain a clarified lysate;
  c) concentrating the clarified lysate to obtain a protein composition; and
  d) optionally pasteurizing the protein composition of protein to obtain a pasteurized protein composition,
  wherein steps a), b), c), and d) independently, are performed at a pH between about 8.5 and about 12.0.

Embodiment 226 is a protein composition produced by a method comprising:
  a) lysing an aqueous suspension of the plurality of cells to obtain a cell lysate;
  b) clarifying the cell lysate, optionally in the presence of one or more flocculants, to obtain a clarified lysate;
  c) filtering the clarified lysate to obtain a protein composition; and d) optionally pasteurizing the protein composition, to obtain a pasteurized protein composition,
wherein steps a), b), c), and d) independently, are performed at a pH between about 8.5 and about 12.0.

Embodiment 227 is a protein composition produced by a method comprising:
a) lysing an aqueous suspension of the plurality of cells to obtain a cell lysate;
b) clarifying the cell lysate, optionally in the presence of one or more flocculants, to obtain a clarified lysate;
c) filtering the clarified lysate using microfiltration to obtain a first filtered lysate;
d) filtering the first filtered lysate using diafiltration to obtain a second filtered lysate;
e) filtering the second filtered lysate using ultrafiltration obtain a third filtered lysate;
f) filtering the third filtered lysate using diafiltration to obtain a protein composition; and
g) optionally pasteurizing the protein composition to obtain a pasteurized protein composition,
wherein steps a), b), c), d), e), f), and g) independently, are performed at a pH between about 8.5 and about 12.0.

Embodiment 228 is a protein composition produced by a method comprising:
a) lysing an aqueous suspension of the plurality of cells to obtain a cell lysate;
b) clarifying the cell lysate, optionally in the presence of one or more flocculants, to obtain a clarified lysate;
c) filtering the clarified lysate using ultrafiltration to obtain a first filtered lysate;
d) filtering the first filtered lysate using diafiltration to obtain a protein composition; and
e) optionally pasteurizing the protein composition to obtain a pasteurized protein composition,
wherein steps a), b), c), d), and e) independently, are performed at a pH between about 8.5 and about 12.0.

Embodiment 229 is a protein composition produced by a method comprising:
a) lysing an aqueous suspension of the plurality of cells to obtain a cell lysate;
b) filtering the cell lysate to obtain a protein composition; and
c) optionally pasteurizing the protein composition to obtain a pasteurized protein composition,
wherein steps a), b), and c) independently, are performed at a pH between about 8.5 and about 12.0.

Embodiment 230 is a protein composition produced by a method comprising:
a) lysing an aqueous suspension of the plurality of cells to obtain a cell lysate;
b) filtering the cell lysate using ultrafiltration obtain a first filtered lysate;
c) filtering the first filtered lysate using diafiltration to obtain a protein composition; and
d) optionally pasteurizing the protein composition to obtain a pasteurized protein composition,
wherein steps a) b), c), and d) independently, are performed at a pH between about 8.5 and about 12.0.

Embodiment 231 is a protein composition produced by a method comprising:
a) lysing an aqueous suspension of the plurality of cells to obtain a cell lysate;
b) filtering the cell lysate using ultrafiltration to obtain a protein composition; and
c) optionally pasteurizing the protein composition to obtain a pasteurized protein composition,
wherein steps a), b), and c) independently, are performed at a pH between about 8.5 and about 12.0.

Embodiment 232 is the protein composition of any one of embodiments 224-228 wherein the clarifying step is performed, optionally in the presence of one or more flocculants, at a pH between about 9.0 and about 12.0.

Embodiment 233 is the protein composition of embodiment 232, wherein the clarifying step is performed at a pH between about 9.0 and about 10.0.

Embodiment 234 is the protein composition of embodiment 232, wherein the clarifying step is performed at a pH between about 10.0 and about 11.0.

Embodiment 235 is the protein composition of embodiment 232, wherein the clarifying step is performed at a pH between about 11.0 and about 12.0.

Embodiment 236 is the protein composition of any one of embodiments 224-228 or 232-235, wherein clarifying step is performed by centrifugation to less than about 20% dry solids.

Embodiment 237 is the protein composition of any one of embodiments 224-228 or 232-236, wherein the clarifying step is performed by gravity settling to less than about 20% dry solids.

Embodiment 238 is the protein composition of any one of embodiments 224-228 or 232-237, wherein the clarifying step is performed by diatomaceous earth filtration to less than about 20% dry solids.

Embodiment 239 is the protein composition of any one of embodiments 224-228 or 232-238, wherein the lysate is diluted 1:1 with water or aqueous solution of salt or buffer before clarifying, wherein the pH is between about 8.5 and about 12.0.

Embodiment 240 is the protein composition of any one of embodiments 224-228 or 232-239, wherein the cell lysate from step a) is clarified in the presence of one or more flocculants.

Embodiment 241 is the protein composition of embodiment 240, wherein the one or more flocculants comprise one or more of alkylamine epichlorohydrin, polydimethyldiallylammonium chloride, a polyamine, lime, hydrated lime, ferric chloride, ferric sulfate, ferrous sulfate, aluminum sulfate, sodium aluminate, aluminum chloride, magnesium carbonate hydroxide, calcium carbonate, calcium hydroxide, an activated silicate, a guar gum, a starch, a tannin, sodium alginate, polyaluminum sulfate, polyaluminum hydroxy chloride, BIO-FLOCK®, and a synthetic polyelectrolyte.

Embodiment 242 is the protein composition of embodiment 240, wherein the one or more flocculants are selected from the group consisting of alkylamine epichlorohydrin, polydimethyldiallylammonium chloride, a polyamine, lime, hydrated lime, ferric chloride, ferric sulfate, ferrous sulfate, aluminum sulfate, sodium aluminate, aluminum chloride, magnesium carbonate hydroxide, calcium carbonate, calcium hydroxide, an activated silicate, a guar gum, a starch, a tannin, sodium alginate, polyaluminum sulfate, polyaluminum hydroxy chloride, BIO-FLOCK®, and a synthetic polyelectrolyte.

Embodiment 243 is the method of any one of embodiments 224-242, wherein filtering comprises microfiltration.

Embodiment 244 is the method of any one of embodiments 224-243, wherein filtering comprises ultrafiltration.

Embodiment 245 is the method of any one of embodiments 224-244, wherein filtering comprises diafiltration.

Embodiment 246 is the method of embodiment 245, where diafiltration is performed for at least two diavolumes.

Embodiment 247 is the protein composition of any one of embodiments 224-246, wherein the plurality of cells comprises microbial cells.

Embodiment 248 is the protein composition of any one of embodiments 224-247, wherein the plurality of cells comprises fungal cells.

Embodiment 249 is the protein composition of embodiment 248, wherein the fungal cells are selected from the group consisting of *Saccharomyces, Pichia, Candida, Hansenula, Torulopsis, Kluyveromyces, Yarrowia*, and *Fusarium* cells.

Embodiment 250 is the protein composition of embodiment 248, wherein the fungal cells are selected from the group consisting of *Saccharomyces cerevisiae, Pichia pastoris, Candida boidinii, Hansenula polymorpha, Kluyveromyces lactis, Yarrowia lipolytica*, and *Fusarium venenatum*.

Embodiment 251 is the protein composition of any one of embodiments 224-250, wherein the plurality of cells comprises bacterial cells.

Embodiment 252 is the protein composition of embodiment 251, wherein the bacterial cells are selected from the group consisting of *Bacillus, Escherichia, Lactobacillus, Corynebacterium, Pseudomonas*, and *Methanococcus*.

Embodiment 253 is the protein composition of embodiment 251, wherein the bacterial cells are selected from the group consisting of *Escherichia coli, Bacillus subtilis, Lactobacillus lactis, Corynebacterium glutamicum, Pseudomonas fluorescens*, and *Methanococcus maripaludis*.

Embodiment 254 is the protein composition of any one of embodiments 224-253, wherein the aqueous suspension of the plurality of cells comprises from about 2% to about 25% dry solids.

Embodiment 255 is the protein composition of any one of embodiments 224-254, further comprising washing the aqueous suspension of the plurality of cells at a pH between about 8.5 and about 12.0 before step a).

Embodiment 256 is the protein composition of any one of embodiments 224-255, wherein the lysing step is performed at a temperature between about 4° C. and about 15° C.

Embodiment 257 is the protein composition of any one of embodiments 224-256, wherein the lysing step is performed biochemically.

Embodiment 258 is the protein composition of any one of embodiments 224-257, wherein the lysing step is performed chemically.

Embodiment 259 is the protein composition of any one of embodiments 224-258, wherein the lysing step is performed mechanically.

Embodiment 260 is the protein composition of any one of embodiments 224-259, wherein the lysing step is performed at a pH between about 9.0 and about 12.0.

Embodiment 261 is the protein composition of embodiment 260, wherein the lysing step is performed at a pH between about 9.0 and about 10.0.

Embodiment 262 is the protein composition of embodiment 260, wherein the lysing step is performed at a pH between about 10.0 and about 11.0.

Embodiment 263 is the protein composition of embodiment 260, wherein the lysing step is performed at a pH between about 11.0 and about 12.0.

Embodiment 264 is the protein composition of any one of embodiments 224-263, wherein the lysate is diluted 1:1 with water or aqueous solution of salt or buffer before filtering, wherein the pH is between about 8.5 and about 12.0.

Embodiment 265 is the protein composition of any one of embodiments 224-264, wherein the protein composition has a protein content of about 2 mg/mL to about 250 mg/mL.

Embodiment 266 is the protein composition of any one of embodiments 224-265, wherein the protein composition exhibits one or more characteristics selected from the group consisting of: $H_2S$ is detectable in an amount of less than about 0.1 ppm when L-cysteine is not added to the protein composition, and $H_2S$ is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 $m^2$/g protein across about pH 4.0 to about pH 8.0.

Embodiment 267 is the protein composition of any one of embodiments 224-265, wherein the protein composition exhibits two or more characteristics selected from the group consisting of: $H_2S$ is detectable in an amount of less than about 0.1 ppm when L-cysteine is not added to the protein composition, and $H_2S$ is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 $m^2$/g protein across about pH 4.0 to about pH 8.0.

Embodiment 268 is the protein composition of any one of embodiments 224-265, wherein the protein composition exhibits three or more characteristics selected from the group consisting of: $H_2S$ is detectable in an amount of less than about 0.1 ppm when L-cysteine is not added to the protein composition, and H₂S is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m²/g protein across about pH 4.0 to about pH 8.0.

Embodiment 269 is the protein composition of any one of embodiments 224-265, wherein the protein composition exhibits four or more characteristics selected from the group consisting of: H₂S is detectable in an amount of less than about 0.1 ppm when L-cysteine is not added to the protein composition, and H₂S is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m²/g protein across about pH 4.0 to about pH 8.0.

Embodiment 270 is the protein composition of any one of embodiments 224-265, wherein the protein composition exhibits five or more characteristics selected from the group consisting of: H₂S is detectable in an amount of less than about 0.1 ppm when L-cysteine is not added to the protein composition, and H₂S is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m²/g protein across about pH 4.0 to about pH 8.0.

Embodiment 271 is the protein composition of any one of embodiments 224-265, wherein the protein composition exhibits six or more characteristics selected from the group consisting of: H₂S is detectable in an amount of less than about 0.1 ppm when L-cysteine is not added to the protein composition, and H₂S is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m²/g protein across about pH 4.0 to about pH 8.0.

Embodiment 272 is the protein composition of any one of embodiments 224-265, wherein the protein composition exhibits seven or more characteristics selected from the group consisting of: H₂S is detectable in an amount of less than about 0.1 ppm when L-cysteine is not added to the protein composition, and H₂S is detectable in an amount of at least about 0.2 ppm in the headspace about 24 hours at 25° C. after about 25 mM L-cysteine is added to the protein composition; the protein composition forms a gel upon heating to 65° C.; the protein composition has a particle size distribution D10, D50, and D90 of less than 0.1 µm, 1.0 µm and 5 µm, respectively; the protein composition is least about 80% denatured after about 20 minutes at about 85° C.; the protein composition forms a gel with a storage modulus of at least about 100 Pa when heated at or above about 85° C. for about 20 minutes; the protein composition forms a gel between about pH 5.5 and about pH 10.0; the protein composition forms a gel in solutions with ionic strength below about 0.5 M, wherein the ionic strength is calculated based on the concentration of non-protein solutes; and the protein composition has an emulsion activity index of greater than or equal to about 50 m²/g protein across about pH 4.0 to about pH 8.0.

Embodiment 273 is the protein composition of any one of embodiments 224-265, wherein the protein composition exhibits the characteristics:

H₂S is detectable in an amount of less than about 0.1 ppm when L-cysteine is not added to the protein composition, and H₂S is detectable in an amount of at least about 0.2 ppm in the headspace about 24 hours at 25° C. after about 25 mM L-cysteine is added to the protein composition, the protein composition forms a gel upon heating to 65° C., the protein composition has a particle size distribution D10, D50, and D90 of less than 0.1 µm, 1.0 µm and 5 µm, respectively, the protein composition is least about 80% denatured after about 20 minutes at about 85° C., the protein composition forms a gel with a storage modulus of at least about 100 Pa when heated at or above about 85° C. for about 20 minutes, wherein the protein composition forms a gel between about pH 5.5 and about pH 10.0, the protein composition forms a gel in solutions with ionic strength below about 0.5 M, wherein the ionic strength is calculated based on the concentration of non-protein solutes, and the protein composition has an emulsion activity index of greater than or equal to about 50 $m^2/g$ protein across about pH 4.0 to about pH 8.0.

Embodiment 274 is the protein composition of any one of embodiments 224-273, wherein the protein composition comprises at least about 35%, on a dry weight basis, of compounds larger than 5 kDa.

Embodiment 275 is the protein composition of any one of embodiments 224-273, wherein the protein composition comprises at least about 40%, on a dry weight basis, of compounds larger than 5 kDa.

Embodiment 276 is the protein composition of any one of embodiments 224-273, wherein the protein composition comprises at least about 50%, on a dry weight basis, of compounds larger than 5 kDa.

Embodiment 277 is the protein composition of any one of embodiments 224-273, wherein the protein composition comprises at least about 60%, on a dry weight basis, of compounds larger than 5 kDa.

Embodiment 278 is the protein composition of any one of embodiments 224-273, wherein the protein composition comprises at least about 70%, on a dry weight basis, of compounds larger than 5 kDa.

Embodiment 279 is the protein composition of any one of embodiments 274-278, wherein the compounds larger than 5 kDa are compounds larger than 10 kDa.

Embodiment 280 is the protein composition of any one of embodiments 274-278, wherein the compounds larger than 5 kDa are compounds larger than 15 kDa.

Embodiment 281 is the protein composition of any one of embodiments 274-278, wherein the compounds larger than 5 kDa are compounds larger than 20 kDa.

Embodiment 282 is the protein composition of any one of embodiments 274-278, wherein the compounds larger than 5 kDa are compounds larger than 25 kDa.

Embodiment 283 is the protein composition of any one of embodiments 224-282, further comprising drying the protein composition.

Embodiment 284 is the protein composition of embodiment 283, wherein the protein composition is spray dried.

Embodiment 285 is the protein composition of embodiment 283, wherein the protein composition is freeze dried.

Embodiment 286 is the protein composition of any one of embodiments 224-282, further comprising pasteurizing the protein composition to obtain a pasteurized protein composition.

Embodiment 287 is the protein composition of embodiment 286, wherein the protein composition is pasteurized by microfiltration.

Embodiment 288 is the protein composition of embodiment 286, wherein protein composition is pasteurized by high temperature short time pasteurization.

Embodiment 289 is the protein composition of embodiment 286, wherein the protein composition is pasteurized by adding one or more antimicrobials.

Embodiment 290 is the protein composition of any one of embodiments 286-289, further comprising drying the pasteurized protein composition.

Embodiment 291 is the protein composition of embodiment 290, wherein the pasteurized protein composition is spray dried.

Embodiment 292 is the protein composition of embodiment 290, wherein the pasteurized protein composition is freeze dried.

Embodiment 293 is the protein composition of any one of embodiments 224-292, wherein the amount of one or more volatile compounds is reduced by at least about 1.05-fold compared to a corresponding method in which one or more of the lysing, clarifying, or filtering steps are not performed at a pH between about 8.5 and about 12.0, wherein the volatile compound is selected from the group consisting of cysteine, 1-hexanol, 2-butylfuran, 2-methyl-2-pentenal, 3-octanone, ethyl acetate, 2-ethyl-furan, 2-pentyl-furan, pyrazine, 1-decanol, acetophenone, 1-nonanol, 2,5-dimethyl-pyrazine, dodecanal, benzeneacetaldehyde, nonanal, butyrolactone, octanal, 2-decanone, hexanal, 2-nonanone, benzaldehyde, heptanal, 2-octanone, furfural, 2-heptanone, and pentanal.

Embodiment 294 is the protein composition of any one of embodiments 224-293, wherein the protein composition does not comprise one or more compounds selected from the group consisting of cysteine, 1-hexanol, 2-butylfuran, 2-methyl-2-pentenal, 3-octanone, ethyl acetate, 2-ethyl-furan, 2-pentyl-furan, pyrazine, 1-decanol, acetophenone, 1-nonanol, 2,5-dimethyl-pyrazine, dodecanal, benzeneacetaldehyde, nonanal, butyrolactone, octanal, 2-decanone, hexanal, 2-nonanone, benzaldehyde, heptanal, 2-octanone, furfural, 2-heptanone, and pentanal.

Embodiment 295 is the protein composition of any one of embodiments 224-294, wherein at least about 50% of the protein in the protein composition falls between about 10 kDa and about 200 kDa Embodiment 296 is a food product comprising:
a protein composition of any one of embodiments 129-169.

Embodiment 297 is a food product comprising:
a *Saccharomyces cerevisiae* protein composition of any one of embodiments 170-187.

Embodiment 298 is a food product comprising:
a *Pichia pastoris* protein composition of any one of embodiments 188-205.

Embodiment 299 is a food product comprising:
an *Escherichia coli* protein composition of any one of embodiments 206-223.

Embodiment 300 is the food product of any one of embodiments 296-290, wherein the food product is a dairy replica.

Embodiment 301 is the food product of embodiment 300, wherein the food product is a milk replica.

Embodiment 302 is the food product of embodiment 300, wherein the food product is a cheese replica.

Embodiment 303 is the food product of any one of embodiments 300-302, wherein the food product further comprises one or more microbes.

Embodiment 304 is the food product of embodiment 303, wherein the one or more microbes are selected from the group consisting of a *Lactococcus* species, a *Lactoba-* cillus species, a *Leuconostocaceae* species, a *Streptococcus* species, a *Pediococcus* species, a *Clostridium* species, a *Staphylococcus* species, a *Brevibacterium* species, a *Propioniibacteria* species, a *Penicillium* species, a *Debaryomyces*, a *Geotrichum* species, a *Corynebacteria* species, a *Verticillium* species, a *Kluyveromyces* species, a *Saccharomyces* species, a *Candida* species, a *Rhodosporidum* species, a *Micrococcus* species, a *Halomonas* species, a *Psychrobacter* species, or a combination thereof.

Embodiment 305 is the food product of embodiment 303, wherein the one or more microbes are selected from the group consisting of *Lactococcus lactis lactis, Lactococcus lactis cremoris, Lactococcus lactis* biovar diacetylactis, *Lactobacillus delbrueckii lactis, Lactobacillus delbrueckii bulgaricus, Lactobacillus helveticus, Lactobacillus plantarum, Lactobacillus casei, Lactobacillus rhamnosus, Leuconostoc mesenteroides cremoris, Streptococcus thermophiles, Pediococcus pentosaceus, Clostridium butyricum, Staphylococcus xylosus, Brevibacterium linens, Penicillium candidum, Penicillium camemberti, Penicillium roqueforti, Debaryomyces hansenii, Geotrichum candidum, Verticillium lecanii, Kluyveromyces lactis, Saccharomyces cerevisiae, Candida jefer, Candida utilis, Rhodosporidum infirmominiatum,*

Embodiment 306 is the food product of any one of embodiments 296-299, wherein the food product is a meat replica.

Embodiment 307 is the food product of embodiment 306, further comprising a heme.

Embodiment 308 is the food product of embodiment 308, wherein the heme is provided in the form of a heme-containing protein.

Embodiment 309 is the food product of any one of embodiments 306-308, further comprising one or more flavor precursors.

Embodiment 310 is the food product of embodiment 309 wherein the one or more flavor precursors comprise a compound selected from the group consisting of a sugar, a sugar alcohol, a sugar acid, a sugar derivative, a sulfur-containing compound, an amino acids or derivative thereof, a nucleotide, a nucleoside, a vitamin, an acid, a peptides, a protein hydrolysate, an extract, and combinations thereof.

Embodiment 311 is the food product of embodiment 309, wherein the flavor precursors comprise a sugar and a sulfur-containing compound.

Embodiment 312 is the food product of any one of embodiments 310-311, wherein the sufur-containing compound is selected from the group consisting of cysteine, cystine, a cysteine sulfoxide, allicin, selenocysteine, methionine, thiamine, and combinations thereof.

Embodiment 313 is the food product of any one of embodiments 310-312, wherein the sugar is selected from the group consisting of glucose, fructose, ribose, sucrose, arabinose, glucose-6-phosphate, fructose-6-phosphate, fructose 1,6-diphosphate, inositol, maltose, molasses, maltodextrin, glycogen, galactose, lactose, ribitol, gluconic acid and glucuronic acid, amylose, amylopectin, xylose, and combinations thereof.

Embodiment 314 is the food product of any one of embodiments 306-313, further comprising an oil.

Embodiment 315 is the food product of embodiment 314, wherein the oil is selected from the group consisting of coconut oil, mango oil, sunflower oil, cottonseed oil, safflower oil, rice bran oil, cocoa butter, palm fruit oil, palm oil, soybean oil, canola oil, corn oil, sesame oil, walnut oil, flaxseed, jojoba oil, castor, grapeseed oil, peanut oil, olive oil, algal oil, oil from bacteria or fungi, and combinations thereof.

Embodiment 316 is the food product of any one of embodiments 296-299, wherein the food product is a protein supplement.

Embodiment 317 is the food product of any one of embodiments 296-316, wherein the food product contains less than 10% (by weight of the food product) animal products.

Embodiment 318 is the food product of any one of embodiments 296-316, wherein the food product contains less than 5% (by weight of the food product) animal products.

Embodiment 319 is the food product of any one of embodiments 296-316, wherein the food product contains less than 1% (by weight of the food product) animal products.

Embodiment 320 is the food product of any one of embodiments 296-316, wherein the food product contains no animal products.

Embodiment 321 is the food product of any one of embodiments 296-316, wherein the food product contains less than 10% (by weight of the food product) animal-derived products.

Embodiment 322 is the food product of any one of embodiments 296-316, wherein the food product contains less than 5% (by weight of the food product) animal-derived products.

Embodiment 323 is the food product of any one of embodiments 296-316, wherein the food product contains less than 1% (by weight of the food product) animal-derived products.

Embodiment 324 is the food product of any one of embodiments 296-316, wherein the food product contains no animal-derived products.

Embodiment 325 is the food product of any one of embodiments 296-316, wherein the food product contains less than 10% (by weight of the food product) animal meat.

Embodiment 326 is the food product of any one of embodiments 296-316, wherein the food product contains less than 5% (by weight of the food product) animal meat.

Embodiment 327 is the food product of any one of embodiments 296-316, wherein the food product contains less than 1% (by weight of the food product) animal meat.

Embodiment 328 is the food product of any one of embodiments 296-316, wherein the food product contains no animal meat.

The invention will be further described in the following examples, which do not limit the scope of the invention described in the claims.

EXAMPLES

Example 1

Lysis of Yeast Cells at pH 6.0 or 9.0

Aqueous suspensions of *S. cerevisiae* were prepared using yeast crumble (Cool Smart Yeast, LeSaffre Yeast Corporation Item No #05518) at 1:1 crumble:MILLI-Q® water at either pH 6.0 or pH 9.0. The yeast crumbles were lysed using bead milling while maintaining a pH or either 6.0 or 9.0, as appropriate. The lysed cells were clarified by centrifuging at 8,000×g for 3 minutes using a small-scale model of a pilot scale disc-stack centrifuge. The clarified lysate was filtered.

The use of pH 9.0 versus 6.0 had several desirable results. After centrifugation, the clarified lysate maintained at pH 9.0 had a 25-50% increase in yield relative to the lysate maintained at pH 6.0 (e.g., in one experiment, pH 6.0 gave 10% dry-basis (DB) yield vs. 15% DB yield at pH 9.0) and a 30% decrease in protein loss during microfiltration (0.2 μm membrane). At the sensory level, the development of undesirable off-flavors in supernatant/centrate were significantly reduced, such that a panel of experienced sniffers were immediately able to sort blinded samples.

Example 2

Lysis of Yeast Cells at pH 6.0 or 9.0

Aqueous suspensions of P. pastoris expressing soybean leghemoglobin were prepared using broth fermented by Impossible Foods. Whole cells were isolated by centrifugation using a pilot-scale disk stack centrifuge (Alfa Laval BRPX 810 SGV-34CG; feed rate: 10 LPM; initial discharge timer: 5 min; feed % SS: 10-13; centrate solids % SS: 55-60; 2-10° C.). Cells were resuspended at 1:1 ratio using deionized water (2-Cell suspension pH was adjusted to pH 6.0 or 9.0 using 5M HCl or 5M NaOH until cell suspension pH was stable for 30 minutes. Cell suspensions were lysed using a small-scale homogenizer (Gaulin 30CD; 13,000-15,000 psi; 3 passes) with cooling to 2-10° C. nd pH adjustment between passes. The lysed cells were clarified by centrifuging at 12,000×g for 20 minutes using a small-scale model of a pilot scale disc-stack centrifuge. Clarified lysate ("centrate") was applied directly to a hollow-fiber ultrafiltration membrane (Koch Romicon part #0721039; 30 kDa molecular weight cutoff (MWCO), 1.1 mm diameter fibers), concentrated to ~10% dry solids (DS) and diafiltered using deionized water at either pH 6.0 or pH 9.0. Final product was obtained after drying in a lyophilizer. After drying, 10% (w/v) suspensions using each final product were prepared at a final pH of approximately 7.0 and analyzed using a hybrid rheometer (TA Instruments, DEER series; 4 C/min steps).

The use of pH 9.0 versus 6.0 had several desirable results. After centrifugation, the clarified lysate maintained at pH 9.0 had a 35% increase in protein yield relative to the lysate maintained at pH 6.0. When heated to 95° C. at 10% (w/v) DS, thermally-set gels using the pH 9.0 final product were about 10-fold stronger (i.e., higher storage modulus) than those obtained from final product from the pH 6.0 process.

Example 3

Lysis of Bacterial Cells at pH 6.0 or 9.0

Cultures of E. coli cells (DH5alpha, 8 liters total) were prepared by growth in lysogeny broth (LSB media) at 37° C. in shake flasks. Whole cells were isolated by centrifugation at 15,000×g for 20 minutes using a floor model laboratory centrifuge.

Cells were resuspended at 1:5 ratio (grams cell pellet: mL water) using MILLI-Q® water (2-10° C.). Cell suspension was split into two halves, with pH was adjusted to pH 6.0 or 9.0 using 5M HCl or 5M NaOH until cell suspension pH was stable for 30 minutes. Cell suspensions were lysed using a small-scale homogenizer (Gaulin 30CD; 13,000-15,000 psi; 3 passes) with cooling to 2-10° C. and pH adjustment between passes. The lysed cells were dialyzed directly on 30 kDa dialysis membranes (Pierce Slide-a-Lyzer)

The use of pH 9.0 versus 6.0 had several desirable results: 1) protein released after cell lysis increased by 30%; 2) storage modulus (firmness) increase of thermally-set gels improved by about 6-fold (final product of Process Variant C, pH 9 vs. pH 6; 10% w/v suspensions prepared in MILLI-Q® water to pH 7.0; assayed by rheometer as described previously); key odor-active volatiles from a range of classes were decreased by 30-75% (e.g., 3-octanone, ethyl acetate, pyrazine, nonanal, acetaldehyde).

Example 4

Purification of Protein at pH 6.5 or 9.5

Total cellular protein was purified from cultures of S. cerevisiae in two different experiments using the same methods and materials, except the pH of the solutions throughout the purification were at either pH 6.5 or pH 9.5. Aqueous suspensions of S. cerevisiae were prepared using yeast crumble (Cool Smart Yeast, LeSaffre Yeast Corporation Item No #05518) at 1:1 crumble:MILLI-Q® water. The yeast crumbles were lysed using bead milling while maintaining a pH of or either 6.5 or 9.5, as appropriate, to make cell lysates. The lysates were clarified by centrifuging at 8,000×g for 3 minutes using a small-scale model of a pilot scale disc-stack centrifuge. The clarified lysates (centrates) were incubated at 4° C. overnight. A panel of trained tasters and smellers then tested the resulting product after cold storage. The panel was able to correctly sort the pH 6.5 from the pH 9.5 process samples by scoring off-odors in the absence of other visual cues.

Example 5

Filtration, Concentration and/or Desalting of Protein Concentration or Isolate at pH 9.5

Figure 3:
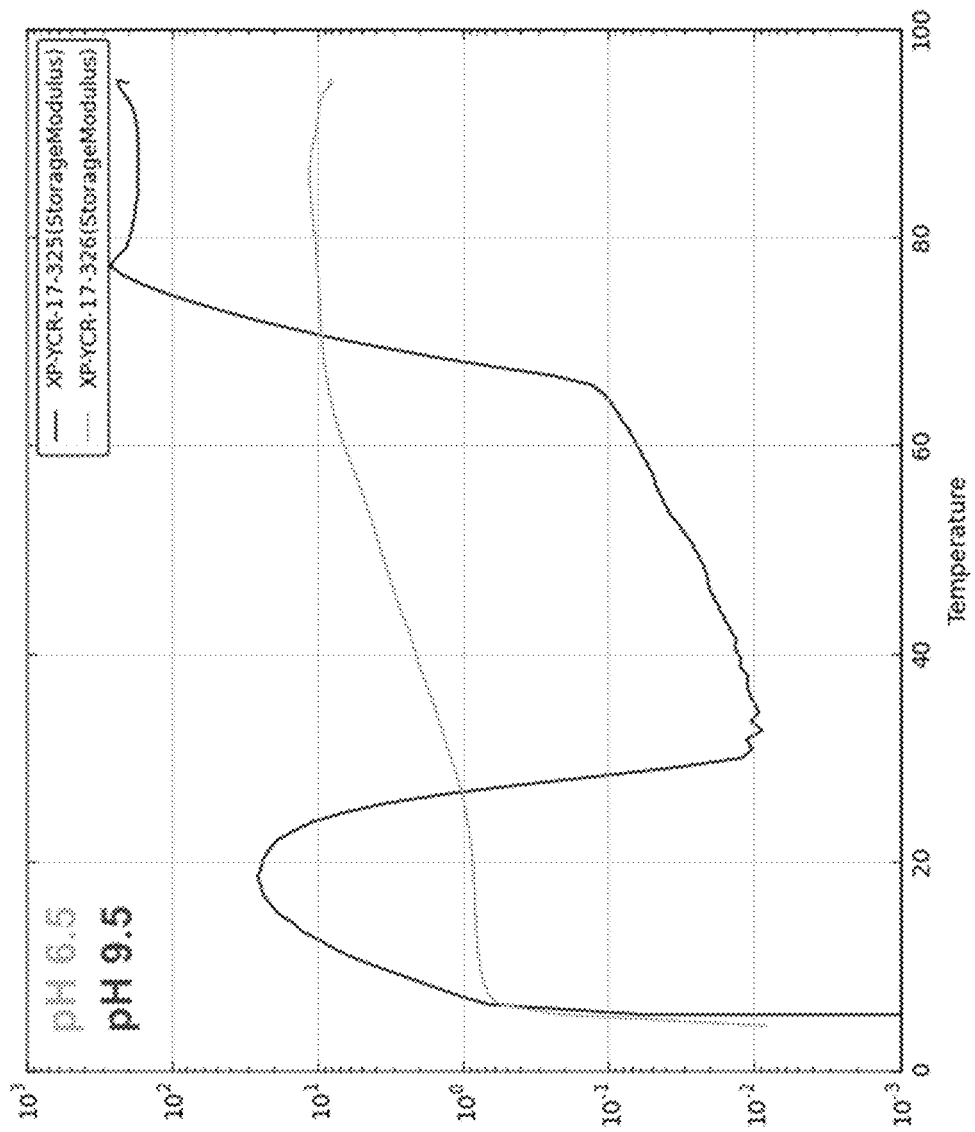
FIG. 3 is a plot showing that the product of high pH process creates firmer gels when heated. Process Variant A (see FIG. 2) was conducted at pH 6.5 or at pH 9.5. Rheology of the resulting material was measured using a hybrid rheometer. Vertical axis shows storage modulus (Pa) in log scale. Horizontal axis shows incubation temperature.
Figure 4:
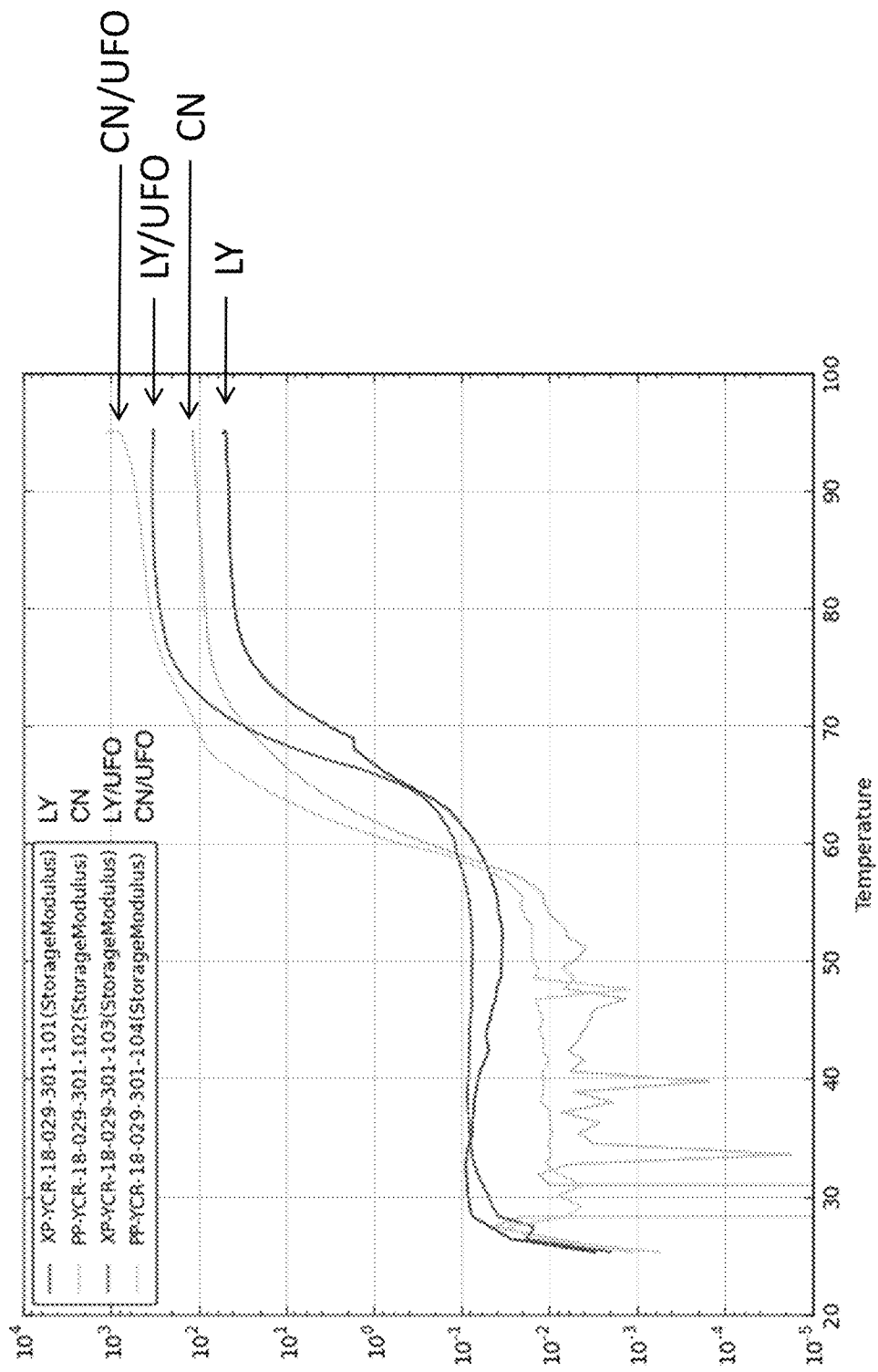
FIG. 4 is a plot showing that removing small molecules from microbial protein isolates and concentrates increased gel firmness by >5×; the effect was independent of solids removal. Process Variants B and C (see FIG. 2) were conducted at pH 9.3. In-process samples were taken of centrate ("CN") or lysate ("LY") and the final product of respective process B ("CN/UFO") or process C ("LY/UFO"). Each sample was freeze dried, then suspended to 10% (w/v) in MILLI-Q® water. Suspensions were assayed at pH 7.5. Rheology of the resulting material was measured using a hybrid rheometer. Vertical axis shows storage modulus (Pa) in log scale. Horizontal axis shows incubation temperature.
Figure 5:
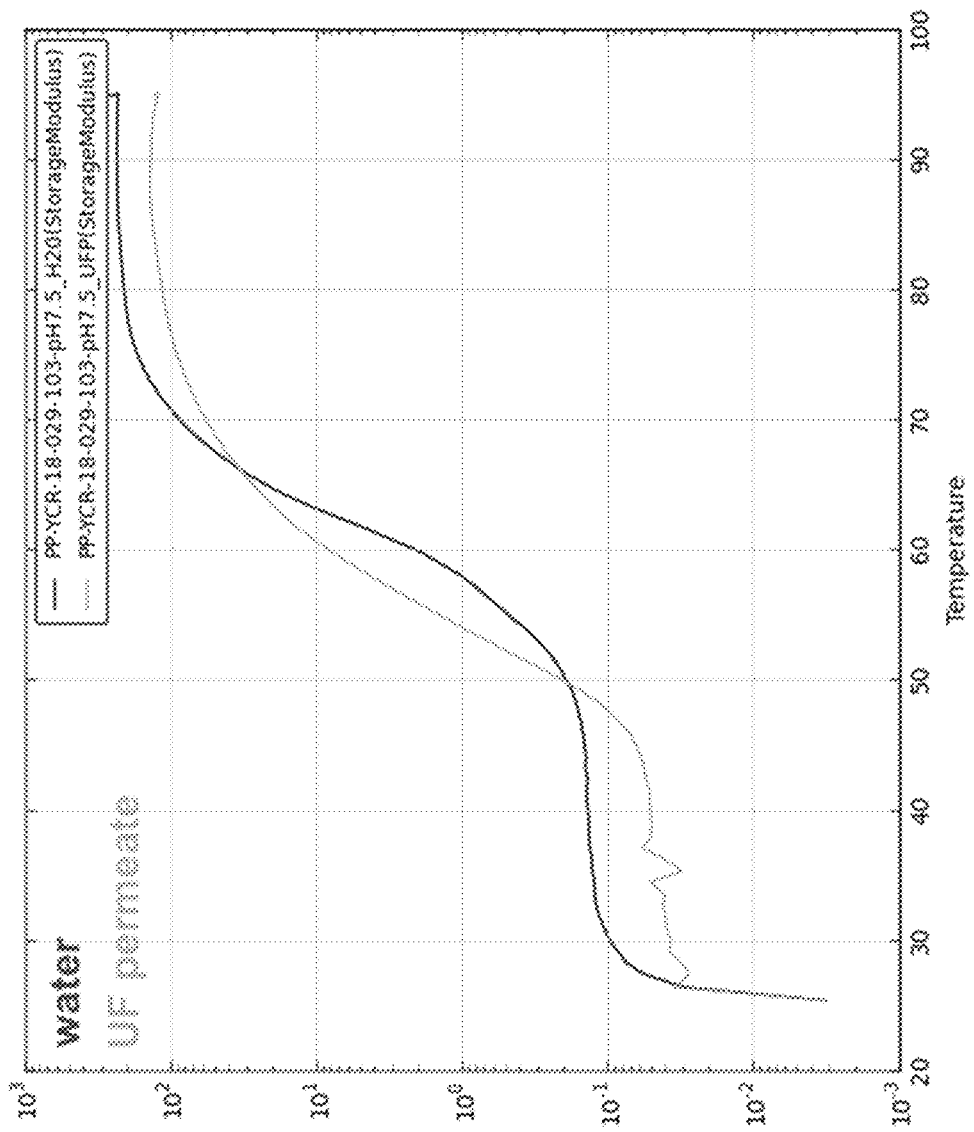
FIG. 5 is a plot showing that reconstituting protein isolates and concentrates with native small molecules reduces gel firmness by >2×. Process Variant C (see FIG. 2) was conducted at pH 9.3. The final material was freeze dried, then resuspended to 10% (w/v) in either MILLI-Q® water or in the initial UF permeate taken as an in-process sample. Suspensions were assayed at pH 7.5. Rheology of the resulting material was measured using a hybrid rheometer. Vertical axis shows storage modulus (Pa) in log scale. Horizontal axis shows incubation temperature.

Lysis of yeast cells was performed as indicated in previous examples. The material may be optionally microfiltered to remove in-process microbial counts (e.g., using a WaterSep Mini-BioProducer41, HF 0.2 μm microfilter, cat WA 920 10MPR41 SG), yielding the improved protein passage of 30%. With or without microfiltration, the material may be concentrated, diafiltered and depleted of small molecules using ultrafiltration. For example, the material has been applied to both WaterSep (cat: BC 030 20GRA43 1L) and Koch (cat: HF, 6043-97-43-PM30) using 4-10 diavolumes prior to a final concentration down to 10-16% dry solids. The alkaline processing method described produced a superior ingredient that demonstrates improved food activities: firmer gels upon cooking (FIGS. 3-5) with lower off-odor and off-flavor (See, e.g., Table 4). Table 2 lists some exemplary specifications of protein produced by this process. Table 3 lists some exemplary benefits of the pH 9.5 technique compared to the pH 6.5 technique. Table 4 lists some exemplary compounds depleted by the pH 9.5 technique.

TABLE 2

Material Specifications

| Property | Assay | Specification |
|---|---|---|
| Protein Denaturation | Differential Scanning Fluorimetry | >80% detectable hydrophobic exposure is complete between 50° C. and 85° C.; maximal hydrophobic exposure occurs between 50° C. and 75° C.; pH 5.5-10.0; non-protein ionic strength 0-0.5M |
| Gelation | Hybrid Rheometer | 10% (w/v) suspension gels to 100 Pa storage modulus when heated to 95° C. and cooled back to 25° C. |
| Particle Size Distribution | Laser diffraction (Mastersizer, Malvern) | D10 <0.1 µm; D50 <1.0 µm; D90 <5 µm |
| Polypeptide Integrity | Reducing, denaturing SDS-PAGE | Greater than 50% of Coommassie-stained polypeptides fall between 10 kDa and 200 kDa as measured by densitometry |
| H2S release | Hach Hydrogen Sulfide Test Kit (Cat. No. 25379-00). Test 45 mL head space in 50 mL Falcon tube with 5 mL product, 2% (w/v, aqueous), pH 7.0 at RT × 24 hours. Filters fitted under cap. No effervescent tablet added | No added cysteine: $H_2S$ <0.1 ppm; 25 mM added cysteine: $H_2S$ >0.2 ppm |
| Buffer Capacity | Buffer capacity measured by titration with NaOH or HCl between pH 3 and pH 12 | less than 2.5 mmol NaOH per gram dry solids |
| Volatile Aroma Compounds | GCMS on pH- and volume-matched sample | >2.5X reduction in the following volatile compounds: 3-Octanone; Acetophenone; 1-Nonanol; Benzeneacetaldehyde; Nonanal, when headspace of a 2 mL of a 10% (w/v) suspension is assayed in a 20 mL glass vial at 50 C. by adsorption onto SPME fiber, followed by GCMS |
| Emulsion Activity Index | Mechanical homogenization of aqueous protein solution with canola oil; EAI = (2T)/(c*vol_fx_oil) where T = ln(10)*$A_{600}$/path_length | >50 $m^2$/g protein across pH 4.0-8.0 |

TABLE 3

Process and composition benefits obtained using alkaline process technique combined with filtration

| Process or composition feature | Benefit (pH 9.5 vs. pH 6.5) |
|---|---|
| Protein Released | 25-50% increase |
| Microfiltration performance | 30% increase in permeated protein |
| Solids removal (e.g., by centrifugation) | >20% recovery of aqueous phase volume |
| Gel strength at 10% (w/v) | ≥10-fold increase in storage modulus at 95° C. |
| Buffer capacity of isolate/concentrate | Less than or equal to the equivalent of 2.5 mmol NaOH per gram dry solids required to shift pH from pH 3.0-pH 12.0 of material at 2% dry solids (w/v) in MILLI-Q ® water. |
| Gelation capacity after pasteurization; assayed at 10% (w/v) dry solids | ≥2-fold increase in storage modulus at 95° C. PZ at 65° C. × 30 sec |

TABLE 4

Small Molecules depleted using alkaline processing technique

| Compound | Pichia processed without alkaline process | Pichia processed with alkaline process | Pichia Factor Change | Saccharomyces processed without alkaline process | Saccharomyces processed with alkaline process | Saccharomyces factor change | Odor Descriptor |
|---|---|---|---|---|---|---|---|
| 3-Octanone | 1,661,170.00 | 169,881 | 9.78 | Not Detected | Not Detected | Not Detected | Musty, mushroom, ketonic, moldy and cheesy fermented with a green, vegetative nuance |
| Ethyl Acetate | 15,927,040.00 | 5,408,039 | 2.95 | Not Detected | Not Detected | Not Detected | Etherial, fruity, sweet, with a grape and cherry nuance |
| Pyrazine | 2,592,053 | 1,656,755 | 1.56 | Not Detected | Not Detected | Not Detected | pungent sweet corn like roasted hazelnut barly |
| Acetophenone | 9,416,779 | 321,953 | 29.25 | 120,697,700 | 9,104,363 | 13.25 | Powdery, bitter almond cherry pit-like with coumarinic and fruity nuances |
| 1-Nonanol | 831,649 | Not Detected | INF | 92,858,790 | 9,737,588 | 9.53 | fresh clean fatty floral rose orange dusty wet oily |
| 2,5-dimethyl-Pyrazine | Not Detected | Not Detected | Not Detected | 3,615,044 | 405,892 | 8.90 | Nutty, peanut, musty, earthy, powdery and slightly roasted with a cocoa powder nuance |
| Nonanal | 2,819,845 | 456,452 | 6.18 | 467,067,300 | 186,830,400 | 2.49 | waxy aldehydic rose fresh orris orange peel fatty peely |
| 2-Decanone | 592,550 | Not Detected | INF | 2,333,218 | 2,163,738 | 1.07 | orange floral fatty peach |

Listed values correspond to peak integration areas as described in the data processing in example 4.
Factor change = (compound area of non alkaline process/compound area of alkaline process)
INF = factor change unable to be determined Example 6

Measurement of Polypeptide Integrity in Protein Compositions

Dried protein compositions from using Process Variants B or C (FIG. 2), from S. cerevisiae, P. pastoris or E. coli, were brought to 10% (w/v) final suspension of material in MILLI-Q® water. The pH was adjusted to pH 9.0 using NaOH or HCl and protein concentration was measured using the Pierce 660 nm Protein Assay Reagent (cat #22660), following the manufacturer's instructions. Suspensions were then adjusted to final protein concentration of 0.1 mg/mL in 1× final concentration SDS-PAGE loading buffer (4× Laemmli Sample Buffer Bio-Rad #1610747) with 0.1 mM DTT final added freshly. Samples were incubated as 50-500 uL aliquots in tightly sealed container (1.7 mL Eppendorf tube) at 95° C. for 10 minutes to denature protein. Heated samples were clarified at 20,000×g, 25° C. for 5 minutes prior to resolving on a gradient (e.g., 4-10% polyacrylamide) SDS-PAGE gel (Bio-Rad Criterion gel, cat #5671091) according to the manufacturer's instructions. Between 100 ng-5 ug protein was loaded per gel lane depending on staining method. In adjacent lanes, molecular weight markers covering range 10-200 kDa (Bio-Rad Precision Plus markers, cat #1610373) were loaded according to the manufacturer's recommendations. In one example, protein bands were visualized using Bio-Rad QC Colloidal Coomassie Stain (cat #1610803) according to the manufacturer's instructions.

Destained gels were scanned before measuring band intensity using the Bio-Rad Gel Doc system equipped with Image Lab (cat #1708270EDU). Bands were detected, quantified and sized using automated band detection and molecular weight calibration against the standard loaded. Data was exported to Microsoft Excel. Individual band intensity was summed to demonstrate that more than 50% of individual band intensities resided between 10 kDa and 200 kDa.

Example 7

Measurement of Change in Buffering Capacity Before and After Process Variant

Two independent pilot-scale process replicates of protein compositions derived from the beginning ("Lysate") and end ("Final Product") Process Variant C (FIG. 2) using *S. cerevisiae* cells as starting material were obtained as freeze-dried powders. Suspensions (500 mL) were made of each replicate to 2% (w/v) final suspension, transferring 200 mL to a glass beaker equipped with a magnetic stir bar. The suspension was mixed well (200 rpm-700 rpm). Suspension pH was measured using a pH meter equipped with pH probe (ThermoFisher Orion module cat #VSTAR82) calibrated against standardized buffer solutions (ThermoFisher cat #810199).

In 0.2 mL increments, 5M NaOH was added until pH=12.0+/−0.1 unit. Total volume of NaOH solution added was recorded, then the sample was discarded. The process was repeated with a fresh aliquot of 200 mL suspension, except increments of 5M HCl were added in 0.2 mL increments until pH=3.0+/−0.1 unit. Total volume of HCl solution added was recorded, then the sample was discarded.

To compute buffering capacity of each suspension, total volumes of HCl and NaOH added during titration were summed and expressed in milliliters (mL). This number was multiplied by 5 to obtain total millimoles (mmol) NaOH required to adjust 200 mL of the 2% (w/v) solution (4 grams dry solids) from a starting pH of 3.0 to a final pH of 12.0. Using this method, a protein composition (Final Product) required only 2.5 mmol per gram dry solids, whereas the starting material (Lysate) required about 50% more NaOH to achieve the same shift in pH.

Example 8

Measure of Hydrogen Sulfide Release Capacity of Protein Composition

Freeze-dried final product of Process Variants B or C (FIG. 2), from *S. cerevisiae, P. pastoris* or *E. coli*, were suspended to 2% (w/v) in MILLIQ® water and adjusted to a final pH of about 7.0 using HCl, using the method as described above for measuring buffer capacity. A volume of 5 mL of the pH-adjusted sample was transferred to a 50 mL Falcon conical tube (Corning cat #352070). Triplicate samples were made, either with 25 mM final concentration of L-cysteine (Acros cat #173600250) or with an equivalent volume of water added (control). Into the cap of each tube was fitted a single filter from the Hach kit for detecting hydrogen sulfide (Hach HS-C cat #2537900). Capped tubes were left at room temperature (25° C.) for about 24 hours to detect released hydrogen sulfide.

Figure 6:
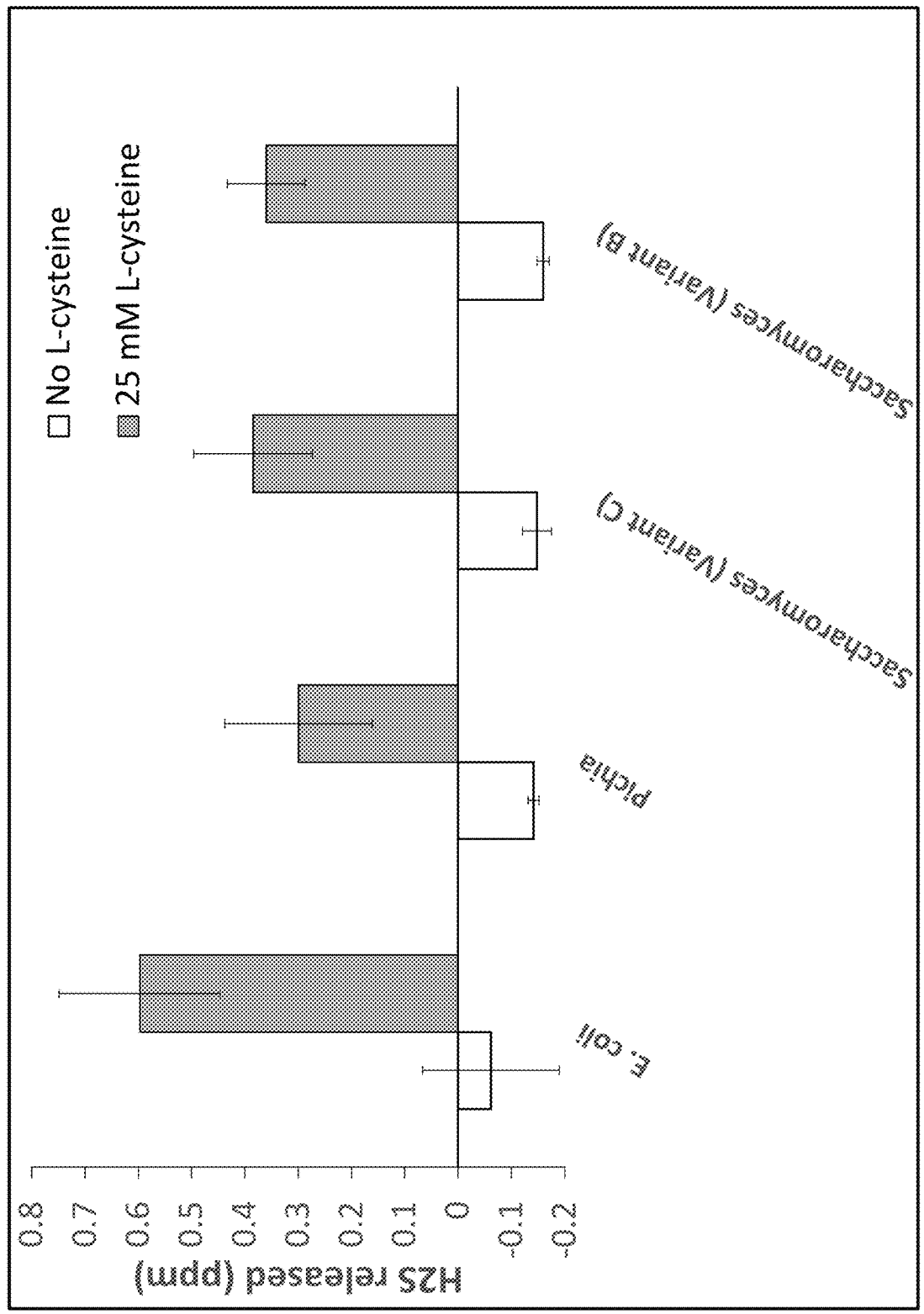
FIG. 6 is a plot showing the absence of detectable hydrogen sulfide ($H_2S$) in the headspace and the appearance of >0.1 ppm hydrogen sulfide ($H_2S$) after addition of 25 mM L-cysteine to microbial protein compositions prepared using Process Variants C or Process Variant D. Microbes used to prepare the protein compositions are representatives of either Bacteria (*Escherichia coli*) or Eukarya (*Pichia pastoris* or *Saccharomyces cerevisiae*).
Figure 7:
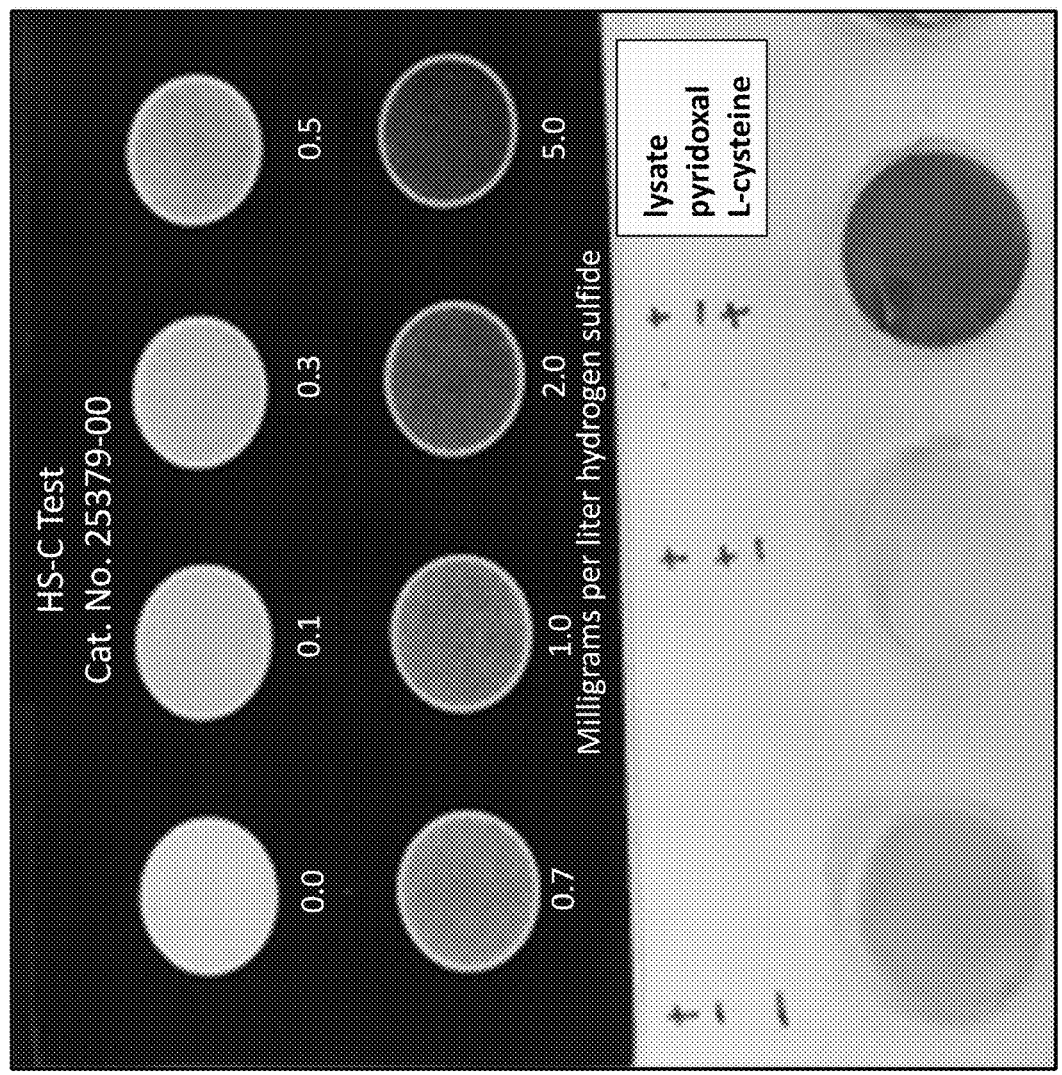
FIG. 7 is a photograph of the results of assaying for $H_2S$ in the headspace of lysates from *Saccharomyces* cells were prepared at about 2% (w/v) final by taking an in-process sample after homogenizer lysis during Process Variant C. The upper half shows standards, and the lower half shows the results of the lysate with no added cysteine (left), Process Variant C with added pyridoxal hydrochloride (center), and Process Variant C with added L-cysteine (right).

A standard curve was used to determine hydrogen sulfide released, as follows. The Hach detection kit used provides a reference set of images for use in determining hydrogen sulfide (expressed as ppm). The colorimetric intensity of these images was measured using a Konica Minolta Chroma Meter CR-5 E350, with each reference image measured against a black background. This produced a standard curve linear in the "b" channel (yellow) between 0 and 1 ppm hydrogen sulfide. To determine hydrogen sulfide release in the four unknown samples (*E. coli* (Variant C), *Pichia* (Variant B), *Saccharomyces* (Variant C), and *Saccharomyces* (Variant B)), filter colors were measured with same device, and the "b" (yellow) intensity compared to the standard curve. Results of this assay, given in FIG. 6, show cysteine-dependent increase in hydrogen sulfide release. Control experiments (FIGS. 6 and 7) demonstrated that this activity: 1) decreased from high (>1 ppm) in starting lysates of *S. cerevisiae* with no added L-cysteine to undetectable in final products of Process Variants B or C; 2) was inhibited by pyridoxal hydrochloride, consistent with this being a characterized sulfhydrylase enzyme (Yamagata and Takeshima (1976) J. Biochem 80: 777). In the experiment shown in FIG. 7, lysates from *Saccharomyces* cells were prepared at about 2% (w/v) final by taking an in-process sample after homogenizer lysis during Process Variant C, quantifying dry solids, then supplementing with water (control), or to 50 mM final pyridoxal hydrochloride (pH 7) or 50 mM final cysteine (pH 7). Sulfide release was measured as described, using HS-C sulfide detection filters and comparing to the kit standard given (shown in FIG. 7). Note that pyridoxal inhibits sulfide release, while non-diafiltered lysate yields a strong sulfide signal that is further increased upon addition of L-cysteine.

Example 9

Measure Rheology of Lysates, Centrates and Final Product Protein Compositions During Heating Freeze-dried lysates, centrates or final products of Process Variants B or C, from *S. cerevisiae* or *P. pastoris*, were suspended to 10% (w/v) in MILLI-Q® water and adjusted to a final pH of about 7.0 using NaOH or HCl, using the method as described above for measuring buffer capacity. A volume of 1.25 mL of pH-adjusted sample was transferred to a steel (Peltier) plate in a hybrid rheometer (TA instruments, DEER unit). Storage modulus was measured following manufacturer's recommendations while temperature was increased at a ramp rate of 3° C. per minute from 25° C. to 95° C. Resulting storage modulus data was plotted in log scale against corresponding temperature in linear scale to yield FIGS. 3, 4 and 5.

Example 10

Measure Thermal Exposure of Hydrophobic Amino Acids

Freeze-dried lysates, centrates or final products of Process Variants B or C were prepared as suspensions at various pH (e.g., pH 6, 7, 8, 9) and concentrations (e.g. 0.5%, 1%, 2% w/v). The relative and total fluorescent signal increase during thermal denaturation was measured using the "Thermal Shift" method as described in Lo et al (2004) Anal. Biochem. 332(1):153. Samples were run on a Bio-Rad CFX96 (C1000 Touch) device using factory calibrations. Data from Channel 2 (HEX) were plotted as relative fluorescence intensity (RFI) vs. temperature. Fluorescence was read once per minute during a 1° C. per minute ramp rate from 25° C. to 100° C. After subtracting baseline and dye-only signal, maximal fluorescence was assigned as maximum peak height to calculate hydrophobic exposure). Maximal peak height was taken as '100% denaturation' of a sample.

Example 11

Measurement of Particle Size Distribution (PSD)

Suspensions of S. cerevisiae or P. pastoris lysates or final product (Process Variant B or C) (FIG. 2) were prepared at 10% (w/v). These were dispersed in a Malvern Mastersizer 3000 unit equipped with a Hydro MV unit until obscuration reached about 15%. Distributions were measured using the following instrument parameters. Material properties: refractive index 1.45; Absorbance index 0.001; density 1 g/cm$^3$; Dispersant: water; refractive index 1.33; non-spherical particles; background measurement time 10 seconds; sample measurement time 10 seconds; obscuration limits 0.1%-50%; ultrasound power, 50%; stirrer, 2000 rpm. Using these values and Process Variants B and C, PSD values were observed as given in the Table 2: D10<0.1 µm; D50<1.0 µm; D90<5 µm. Characteristic PSD values were considerably larger when pH 6 process was used, presumably due to electrostatic-mediated aggregation.

Example 12

Sampling and Characterization of Headspace Profile for Microbial Protein Samples In-process samples prepared from microbial extracts of S. cerevisiae, P. pastoris and E. coli (LY, CN, MF retentate, MF permeate, UF retentate, UF permeate, final product) prepared at process pH of 6.0-6.5 (control) or pH 9.0-9.5 (test) were all made to 10% solutions (wt/wt) with MILLI-Q® water. All samples were adjusted to pH 6.5 (or pH 9.5) with 10M NaOH or 3 M HCl. Three mL of each sample were measured into 20 mL GCMS vials. To evaluate the production of volatile compounds, an Agilent 7890A GC coupled with a Leco Pegasus HT-C High Throughput TOFMS was used along with a Gerstel MultiPurpose Sampler for auto-sampling. The Gerstel auto-sampler was used perform HS-SPME on each of the samples. Each sample was incubated at 50° C. for 15 mins with 250 rpm agitation before being extracted for 20 minutes at 50° C. with 250 rpm agitation using a 2 cm 50/30 µm Divinylbenzene/Carboxen/Polydimethylsiloxane (DVB/CAR/PDMS), Stable flex, 23 Ga, Autosampler (Supleco, Cat #57299-U) SPME fiber.

Extracted samples were run on the GCMS by desorbing the SPME fiber into a Gerstel septum-less head with a PTV inlet set to 240° C. for 60 seconds and cryofocused at −50° C. with a Gerstel Cooled Injection System (CIS). The CIS was held at −50° C. for 0.1 min, temperature was ramped at +12° C./second to 240° C., and held for the remainder of the run. The desorbed sample was separated on a 60-meter wax column (Agilent, VF-WAXms 60 m×0.25 mm×0.25 mm, Part #CP9207) using a 50 minute GC method (35° C. for 2 minutes, ramp of 5° C./min until 255° C., hold at 255° C. for 4 minutes) and 1.5 mL/min helium flow rate in splitless mode. Separated compounds were analyzed by the mass spectrometer, and all data was collected over a 20-500µ mass range, with an acquisition rate of 10 spectra/sec, and a detector voltage off-set of 200.

Samples were then analyzed using Leco ChromaTOF optimized for Pegasus 4D (Version 4.71.0.0) coupled with the NIST MS Search 2.2. The identity of each peak in each sample was identified in a two-step process. First, the mass spectrum of each peak with a signal to noise greater than 30 was matched to a mass spectrum in the NIST library using a similarity threshold of 650. Additionally, an internally developed calibration method was applied to the data set to confirm the identity of the compounds of interest. In the second step, the Statistical Compare function of ChromaTOF was used to align the named analyses across all samples in a set. The criteria for aligning a single peak across all samples were a match score (similarity between the peak spectra across all samples) of 700, a maximum retention time difference of 10 seconds, and the peak must have been present in at least two samples.

Table 4 includes compounds assayed using this technique.

Disclosed are methods and compositions that can be used for, can be used in conjunction with, can be used in preparation for, or are products of the disclosed methods and compositions. These and other materials are disclosed herein, and it is understood that combinations, subsets, interactions, groups, etc. of these methods and compositions are disclosed. That is, while specific reference to each various individual and collective combinations and permutations of these compositions and methods may not be explicitly disclosed, each is specifically contemplated and described herein. For example, if a particular composition of matter or a particular method is disclosed and discussed and a number of compositions or methods are discussed, each and every combination and permutation of the compositions and the methods are specifically contemplated unless specifically indicated to the contrary. Likewise, any subset or combination of these is also specifically contemplated and disclosed It is to be understood that, while the methods and compositions of matter have been described herein in conjunction with a number of different aspects, the foregoing description of the various aspects is intended to illustrate and not limit the scope of the methods and compositions of matter. Other aspects, advantages, and modifications are within the scope of the following claims.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Appendix 1

| Compound | Compound Type | Beef Reference | Chicken Reference | Pork Reference |
|---|---|---|---|---|
| 1-Heptanol | Alcohol | Macleod, G., & Ames, J. M. (1986). Flavour and Fragrance Journal, 1(3), 91-104. Macleod, G., & Ames, J. M. (1986). Journal of Food Science, 51(6), 1427-1434. Min, D., Ina, K., Peterson, R. J., & Chang, S. S. (1979). Journal of Food Science, 44(3), 639-642. Umano, K., & Shibamoto, T. (1987). Journal of Agricultural and Food Chemistry, 35(1), 14-18. | Wilson, R. A., & Katz, I. (1972). Journal of Agricultural and Food Chemistry, 20(4), 741-747. Minor, L. J., et al. (1965). Journal of Food Science, 30(4), 686-696. Schroll, W., et al. (1988). Zeitschrift für Lebensmittel-Untersuchung und Forschung, 187(6), 558-560. Tang, J., et al. (1983). Journal of Agricultural and Food Chemistry, 31(6), 1287-1292. Delort, E., et al. (2011). Journal of Agricultural and Food Chemistry, 59(21), 11752-11763. (Supplemental Information) Noleau, I., & Toulemonde, B. (1986). Lebensmittel-Wissenschaft+Technologie. 19(2): 122-125 Noleau, I., & Toulemonde, B. (1987). Lebensmittel-Wissenschaft+Technologie, 20(1), 37-41. | Mottram, D. S., et al. (1984). Journal of the Science of Food and Agriculture, 35(2), 233-239. Ho, C. T., et a;. (1983). Journal of Agricultural and Food Chemistry, 31(2), 336-342. Mottram, D. S. (1985). Journal of the Science of Food and Agriculture, 36(5), 377-382. |

| Compound | Compound Type | Beef Reference | Chicken Reference | Pork Reference |
|---|---|---|---|---|
| 1-Hexanol | Alcohol | Macleod, G., & Ames, J. M. (1986). Flavour and Fragrance Journal, 1(3), 91-104. Macleod, G., & Ames, J. M. (1986). Journal of Food Science, 51(6), 1427-1434. Persson, T., & Sydow, E. (1973). Journal of Food Science, 38(3), 377-385. Frank, D., et al. (2016). Journal of Agricultural and Food Chemistry, 64(21), 4299-4311. | Wilson, R. A., & Katz, I. (1972). Journal of Agricultural and Food Chemistry, 20(4), 741-747. Minor, L. J., et al. (1965). Journal of Food Science, 30(4), 686-696., Schroll, W., et al. (1988). Zeitschrift für Lebensmittel-Untersuchung und Forschung, 187(6), 558-560. Tang, J., et al. (1983). Journal of Agricultural and Food Chemistry, 31(6), 1287-1292. Delort, E., et al. (2011). Journal of Agricultural and Food Chemistry, 59(21), 11752-11763. (Supplemental Information) Noleau, I., & Toulemonde, B. (1986). Lebensmittel-Wissenschaft+ Technologie. 19(2): 122-125 Noleau, I., & Toulemonde, B. (1987). Lebensmittel-Wissenschaft+ Technologie, 20(1), 37-41. | Mottram, D. S., et al. (1984). Journal of the Science of Food and Agriculture, 35(2), 233-239. Heidemann, F. H., & Wismer-Pedersen, J. (1976). Proceedings of the European Meeting of Meat Research Workers, A6:1-A6:6 Ho, C. T., et a;. (1983). Journal of Agricultural and Food Chemistry, 31(2), 336-342. García-González, D. L., et al. (2008). Meat Science, 80(2), 315-325. Mottram, D. S. (1985). Journal of the Science of Food and Agriculture, 36(5), 377-382. |
| 1-Octanol | Alcohol | Macleod, G., & Ames, J. M. (1986). Flavour and Fragrance Journal, 1(3), 91-104. Macleod, G., & Ames, J. M. (1986). Journal of Food Science, 51(6), 1427-1434., Umano, K., & Shibamoto, T. (1987). Journal of Agricultural and Food Chemistry, 35(1), 14-18. | Wilson, R. A., & Katz, I. (1972). Journal of Agricultural and Food Chemistry, 20(4), 741-747. Schroll, W., et al. (1988). Zeitschrift für Lebensmittel-Untersuchung und Forschung, 187(6), 558-560. Tang, J., et al. (1983). Journal of Agricultural and Food Chemistry, 31(6), 1287-1292. Delort, E., et al. (2011). Journal of Agricultural and Food Chemistry, 59(21), 11752-11763. (Supplemental Information) | Mottram, D. S., et al. (1984). Journal of the Science of Food and Agriculture, 35(2), 233-239. Heidemann, F. H., & Wismer-Pedersen, J. (1976). Proceedings of the European Meeting of Meat Research Workers, A6:1-A6:6 Ho, C. T., et a;. (1983). Journal of Agricultural and Food Chemistry, 31(2), 336-342. García-González, D. L., et al. (2008). Meat Science, 80(2), 315-325. |

| Compound | Compound Type | Beef Reference | Chicken Reference | Pork Reference |
|---|---|---|---|---|
| | | | Noleau, I., & Toulemonde, B. (1986). Lebensmittel-Wissenschaft+Technologie. 19(2): 122-125 Noleau, I., & Toulemonde, B. (1987). Lebensmittel-Wissenschaft+Technologie, 20(1), 37-41. | Mottram, D. S. (1985). Journal of the Science of Food and Agriculture, 36(5), 377-382. |
| 1-Undecanol | Alcohol | Watanabe, K., & Sato, Y. (1972). Journal of Agricultural and Food Chemistry, 20(2), 174-176. | Schroll, W., et al. (1988). Zeitschrift für Lebensmittel-Untersuchung und Forschung, 187(6), 558-560. | Mottram, D. S., et al. (1984). Journal of the Science of Food and Agriculture, 35(2), 233-239. |
| 2-Butanol | Alcohol | Macleod, G., & Ames, J. M. (1986). Flavour and Fragrance Journal, 1(3), 91-104. | Noleau, I., & Toulemonde, B. (1986). Lebensmittel-Wissenschaft+Technologie. 19(2): 122-125 | Mussinan, C. J., & Walradt, J. P. (1974). Journal of Agricultural and Food Chemistry, 22(5), 827-831. Ho, C. T., et a;. (1983). Journal of Agricultural and Food Chemistry, 31(2), 336-342. García-González, D. L., et al. (2008). Meat Science, 80(2), 315-325. |
| 2-Octen-1-ol, (E)- | Alcohol | | Wilson, R. A., & Katz, I. (1972). Journal of Agricultural and Food Chemistry, 20(4), 741-747. Schroll, W., et al. (1988). Zeitschrift für Lebensmittel-Untersuchung und Forschung, 187(6), 558-560. Delort, E., et al. (2011). Journal of Agricultural and Food Chemistry, 59(21), 11752-11763. (Supplemental Information) | |

| Compound | Compound Type | Beef Reference | Chicken Reference | Pork Reference |
|---|---|---|---|---|
| | | | Noleau, I., & Toulemonde, B. (1986). Lebensmittel-Wissenschaft+ Technologie. 19(2): 122-125 | |
| 2,4-Hexadienal, (E,E)- | Aldehyde | Frank, D., et al. (2016). Journal of Agricultural and Food Chemistry. 64(21), 4299-4311. | | |
| 2-Butenal | aldehyde | Uralets, V. P., & Golovnja, R. V. (1980). Molecular Nutrition & Food Research, 24(2), 155-162. | Golovkin, N. A., & Galkin, A. V. (1974). Applied Biochemistry and Microbiology, 9(1), 65-68. | Mussinan, C. J., & Walradt, J. P. (1974). Journal of Agricultural and Food Chemistry, 22(5), 827-831. |
| 2-Butenal, 2-methyl-, (E)- | aldehyde | | Noleau, I., & Toulemonde, B. (1986). Lebensmittel-Wissenschaft+ Technologie. 19(2): 122-125 | |
| 2-Butenal, 3-methyl- | aldehyde | | Noleau, I., & Toulemonde, B. (1987). Lebensmittel-Wissenschaft+ Technologie, 20(1), 37-41. | |
| 2-Decenal, (E)- | aldehyde | Umano, K., & Shibamoto, T. (1987). Journal of Agricultural and Food Chemistry, 35(1), 14-18. | Wilson, R. A., & Katz, I. (1972). Journal of Agricultural and Food Chemistry, 20(4), 741-747. Schroll, W., et al. (1988). Zeitschrift für Lebensmittel-Untersuchung und Forschung, 187(6), 558-560. Gasser, U., & Grosch, W. (1990). Zeitschrift für Lebensmittel-Untersuchung und Forschung, 190(1), 3-8. Delort, E., et al. (2011). Journal of Agricultural and Food Chemistry, 59(21), 11752-11763. (Supplemental Information) | |

| Compound | Compound Type | Beef Reference | Chicken Reference | Pork Reference |
|---|---|---|---|---|
| | | | Noleau, I., & Toulemonde, B. (1986). Lebensmittel-Wissenschaft+Technologie. 19(2): 122-125 Noleau, I., & Toulemonde, B. (1987). Lebensmittel-Wissenschaft+Technologie, 20(1), 37-41. | |
| 2-Heptenal, (E)- | aldehyde | Umano, K., & Shibamoto, T. (1987). Journal of Agricultural and Food Chemistry, 35(1), 14-18. | Wilson, R. A., & Katz, I. (1972). Journal of Agricultural and Food Chemistry, 20(4), 741-747. Schroll, W., et al. (1988). Zeitschrift für Lebensmittel-Untersuchung und Forschung, 187(6), 558-560. Gasser, U., & Grosch, W. (1990). Zeitschrift für Lebensmittel-Untersuchung und Forschung, 190(1), 3-8. Delort, E., et al. (2011). Journal of Agricultural and Food Chemistry, 59(21), 11752-11763. (Supplemental Information) Noleau, I., & Toulemonde, B. (1986). Lebensmittel-Wissenschaft+Technologie. 19(2): 122-125 Noleau, I., & Toulemonde, B. (1987). Lebensmittel-Wissenschaft+Technologie, 20(1), 37-41. | García-González, D. L., et al. (2008). Meat Science, 80(2), 315-325. |

| Compound | Compound Type | Beef Reference | Chicken Reference | Pork Reference |
|---|---|---|---|---|
| 2-Nonenal, (E)- | aldehyde | Frank, D., et al. (2016). Journal of Agricultural and Food Chemistry, 64(21), 4299-4311. Umano, K., & Shibamoto, T. (1987). Journal of Agricultural and Food Chemistry, 35(1), 14-18. | Wilson, R. A., & Katz, I. (1972). Journal of Agricultural and Food Chemistry, 20(4), 741-747. Gasser, U., & Grosch, W. (1990). Zeitschrift für Lebensmittel-Untersuchung und Forschung, 190(1), 3-8. Delort, E., et al. (2011). Journal of Agricultural and Food Chemistry, 59(21), 11752-11763. (Supplemental Information) Noleau, I., & Toulemonde, B. (1986). Lebensmittel-Wissenschaft+Technologie. 19(2): 122-125 Noleau, I., & Toulemonde, B. (1987). Lebensmittel-Wissenschaft+Technologie, 20(1), 37-41. | García-González, D. L., et al. (2008). Meat Science, 80(2), 315-325. |
| 2-Octenal, (E)- | aldehyde | Frank, D., et al. (2016). Journal of Agricultural and Food Chemistry, 64(21), 4299-4311. Umano, K., & Shibamoto, T. (1987). Journal of Agricultural and Food Chemistry, 35(1), 14-18. | Wilson, R. A., & Katz, I. (1972). Journal of Agricultural and Food Chemistry, 20(4), 741-747. Schroll, W., et al. (1988). Zeitschrift für Lebensmittel-Untersuchung und Forschung, 187(6), 558-560. Delort, E., et al. (2011). Journal of Agricultural and Food Chemistry, 59(21), 11752-11763. (Supplemental Information) Noleau, I., & Toulemonde, B. (1986). Lebensmittel-Wissenschaft+Technologie. 19(2): 122-125 Noleau, I., & Toulemonde, B. (1987). Lebensmittel-Wissenschaft+Technologie, 20(1), 37-41. | García-González, D. L., et al. (2008). Meat Science, 80(2), 315-325. |

| Compound | Compound Type | Beef Reference | Chicken Reference | Pork Reference |
|---|---|---|---|---|
| 2-Undecenal, E- | aldehyde | Umano, K., & Shibamoto, T. (1987). Journal of Agricultural and Food Chemistry, 35(1), 14-18. | Wilson, R. A., & Katz, I. (1972). Journal of Agricultural and Food Chemistry, 20(4), 741-747. Schroll, W., et al. (1988). Zeitschrift für Lebensmittel-Untersuchung und Forschung, 187(6), 558-560. Delort, E., et al. (2011). Journal of Agricultural and Food Chemistry, 59(21), 11752-11763. (Supplemental Information), Noleau, I., & Toulemonde, B. (1986). Lebensmittel-Wissenschaft+Technologie. 19(2): 122-125 Noleau, I., & Toulemonde, B. (1987). Lebensmittel-Wissenschaft+Technologie, 20(1), 37-41. | |
| 4-Pentenal | aldehyde | Min, D., Ina, K., Peterson, R. J., & Chang, S. S. (1979). Journal of Food Science, 44(3), 639-642. | | |
| Acetaldehyde | aldehyde | Macleod, G., & Ames, J. M. (1986). Flavour and Fragrance Journal, 1(3), 91-104. Macleod, G., & Ames, J. M. (1986). Journal of Food Science, 51(6), 1427-1434. Uralets, V. P., & Golovnja, R. V. (1980). Molecular Nutrition & Food Research, 24(2), 155-162. Persson, T., & Sydow, E. (1973). Journal of Food Science, 38(3), 377-385. | Minor, L. J., et al. (1965). Journal of Food Science, 30(4), 686-696. Golovkin, N. A., & Galkin, A. V. (1974). Applied Biochemistry and Microbiology, 9(1), 65-68. | Mussinan, C. J., & Walradt, J. P. (1974). Journal of Agricultural and Food Chemistry, 22(5), 827-831. Heidemann, F. H., & Wismer-Pedersen, J. (1976). Proceedings of the European Meeting of Meat Research Workers, A6:1-A6:6 |

| Compound | Compound Type | Beef Reference | Chicken Reference | Pork Reference |
|---|---|---|---|---|
| Benzaldehyde | Aldehyde | Macleod, G., & Ames, J. M. (1986). Flavour and Fragrance Journal, 1(3), 91-104.<br>Macleod, G., & Ames, J. M. (1986). Journal of Food Science, 51(6), 1427-1434.<br>Persson, T., & Sydow, E. (1973). Journal of Food Science, 38(3), 377-385.<br>Frank, D., et al. (2016). Journal of Agricultural and Food Chemistry, 64(21), 4299-4311.<br>Min, D., Ina, K., Peterson, R. J., & Chang, S. S. (1979). Journal of Food Science, 44(3), 639-642.<br>Umano, K., & Shibamoto, T. (1987). Journal of Agricultural and Food Chemistry, 35(1), 14-18. | Wilson, R. A., & Katz, I. (1972). Journal of Agricultural and Food Chemistry, 20(4), 741-747.<br>Schroll, W., et al. (1988). Zeitschrift für Lebensmittel-Untersuchung und Forschung, 187(6), 558-560.<br>Tang, J., et al. (1983). Journal of Agricultural and Food Chemistry, 31(6), 1287-1292.<br>Delort, E., et al. (2011). Journal of Agricultural and Food Chemistry, 59(21), 11752-11763. (Supplemental Information)<br>Noleau, I., & Toulemonde, B. (1986). Lebensmittel-Wissenschaft+Technologie. 19(2): 122-125<br>Noleau, I., & Toulemonde, B. (1987). Lebensmittel-Wissenschaft+Technologie. 20(1), 37-41. | Mussinan, C. J., & Walradt, J. P. (1974). Journal of Agricultural and Food Chemistry, 22(5), 827-831.<br>Baloga, D. W., et al. (1990). Journal of Agricultural and Food Chemistry, 38(11), 2021-2026.<br>Mottram, D. S., et al. (1984). Journal of the Science of Food and Agriculture, 35(2), 233-239.<br>Heidemann, F. H., & Wismer-Pedersen, J. (1976). Proceedings of the European Meeting of Meat Research Workers, A6:1-A6:6<br>Ho, C. T., et a;. (1983). Journal of Agricultural and Food Chemistry, 31(2), 336-342.<br>García-González, D. L., et al. (2008). Meat Science, 80(2), 315-325.<br>Mottram, D. S. (1985). Journal of the Science of Food and Agriculture, 36(5), 377-382. |
| Benzaldehyde, 2-hydroxy- | aldehyde | | Noleau, I., & Toulemonde, B. (1986). Lebensmittel-Wissenschaft+Technologie. 19(2): 122-125<br>Noleau, I., & Toulemonde, B. (1987). Lebensmittel-Wissenschaft+Technologie, 20(1), 37-41. | |

| Compound | Compound Type | Beef Reference | Chicken Reference | Pork Reference |
|---|---|---|---|---|
| Benzeneacetaldehyde | aldehyde | Macleod, G., & Ames, J. M. (1986). Flavour and Fragrance Journal, 1(3), 91-104. | Gasser, U., & Grosch, W. (1990). Zeitschrift für Lebensmittel-Untersuchung und Forschung, 190(1), 3-8.<br>Delort, E., et al. (2011). Journal of Agricultural and Food Chemistry, 59(21), 11752-11763. (Supplemental Information)<br>Noleau, I., & Toulemonde, B. (1986). Lebensmittel-Wissenschaft+ Technologie. 19(2): 122-125<br>Noleau, I., & Toulemonde, B. (1987). Lebensmittel-Wissenschaft+ Technologie, 20(1), 37-41. | Mussinan, C. J., & Walradt, J. P. (1974). Journal of Agricultural and Food Chemistry, 22(5), 827-831.<br>Baloga, D. W., et al. (1990). Journal of Agricultural and Food Chemistry, 38(11), 2021-2026. |
| Butanal, 2-methyl- | Aldehyde | Macleod, G., & Ames, J. M. (1986). Flavour and Fragrance Journal, 1(3), 91-104.<br>Macleod, G., & Ames, J. M. (1986). Journal of Food Science, 51(6), 1427-1434.<br>Uralets, V. P., & Golovnja, R. V. (1980). Molecular Nutrition & Food Research, 24(2), 155-162.<br>Persson, T., & Sydow, E. (1973). Journal of Food Science, 38(3), 377-385.<br>Min, D., Ina, K., Peterson, R. J., & Chang, S. S. (1979). Journal of Food Science, 44(3), 639-642. | Tang, J., et al. (1983). Journal of Agricultural and Food Chemistry, 31(6), 1287-1292.<br>Delort, E., et al. (2011). Journal of Agricultural and Food Chemistry, 59(21), 11752-11763. (Supplemental Information)<br>Noleau, I., & Toulemonde, B. (1986). Lebensmittel-Wissenschaft+ Technologie. 19(2): 122-125<br>Noleau, I., & Toulemonde, B. (1987). Lebensmittel-Wissenschaft+ Technologie, 20(1), 37-41. | Mussinan, C. J., & Walradt, J. P. (1974). Journal of Agricultural and Food Chemistry, 22(5), 827-831.<br>Ho, C. T., et a;. (1983). Journal of Agricultural and Food Chemistry, 31(2), 336-342. |

| Compound | Compound Type | Beef Reference | Chicken Reference | Pork Reference |
|---|---|---|---|---|
| Butanal, 3-methyl- | Aldehyde | Macleod, G., & Ames, J. M. (1986). Flavour and Fragrance Journal, 1(3), 91-104. Macleod, G., & Ames, J. M. (1986). Journal of Food Science, 51(6), 1427-1434. Uralets, V. P., & Golovnja, R. V. (1980). Molecular Nutrition & Food Research, 24(2), 155-162. Persson, T., & Sydow, E. (1973). Journal of Food Science, 38(3), 377-385. Frank, D., et al. (2016). Journal of Agricultural and Food Chemistry, 64(21), 4299-4311. | Tang, J., et al. (1983). Journal of Agricultural and Food Chemistry, 31(6), 1287-1292. Delort, E., et al. (2011). Journal of Agricultural and Food Chemistry, 59(21), 11752-11763. (Supplemental Information) Noleau, I., & Toulemonde, B. (1986). Lebensmittel-Wissenschaft+Technologie. 19(2): 122-125 Noleau, I., & Toulemonde, B. (1987). Lebensmittel-Wissenschaft+Technologie. 20(1), 37-41. | Baloga, D. W., et al. (1990). Journal of Agricultural and Food Chemistry, 38(11), 2021-2026. Heidemann, F. H., & Wismer-Pedersen, J. (1976). Proceedings of the European Meeting of Meat Research Workers, A6:1-A6:6 Ho, C. T., et a;. (1983). Journal of Agricultural and Food Chemistry, 31(2), 336-342. García-González, D. L., et al. (2008). Meat Science, 80(2), 315-325. |
| Dodecanal | Aldehyde | Liebich, H. M., et al. (1972). Journal of Agricultural and Food Chemistry, 20(1), 96-99. | Delort, E., et al. (2011). Journal of Agricultural and Food Chemistry, 59(21), 11752-11763. (Supplemental Information) Noleau, I., & Toulemonde, B. (1986). Lebensmittel-Wissenschaft+Technologie. 19(2): 122-125 | Mussinan, C. J., & Walradt, J. P. (1974). Journal of Agricultural and Food Chemistry, 22(5), 827-831. Baloga, D. W., et al. (1990). Journal of Agricultural and Food Chemistry, 38(11), 2021-2026. |
| Furfural | Aldehyde | Macleod, G., & Ames, J. M. (1986). Flavour and Fragrance Journal, 1(3), 91-104. Macleod, G., & Ames, J. M. (1986). Journal of Food Science, 51(6), 1427-1434. Uralets, V. P., & Golovnja, R. V. (1980). Molecular Nutrition & Food Research, 24(2), 155-162. Frank, D., et al. (2016). Journal of Agricultural and Food Chemistry, 64(21), 4299-4311. | | Mussinan, C. J., & Walradt, J. P. (1974). Journal of Agricultural and Food Chemistry, 22(5), 827-831. Baloga, D. W., et al. (1990). Journal of Agricultural and Food Chemistry, 38(11), 2021-2026. Mottram, D. S., et al. (1984). Journal of the Science of Food and Agriculture, 35(2), 233-239. Heidemann, F. H., & Wismer-Pedersen, J. (1976). Proceedings of the European Meeting of Meat |

| Compound | Compound Type | Beef Reference | Chicken Reference | Pork Reference |
|---|---|---|---|---|
| | | Min, D., Ina, K., Peterson, R. J., & Chang, S. S. (1979). Journal of Food Science, 44(3), 639-642. Liu, R. H., et al. (1987). Warmed-over flavor of meat. 193. | | Research Workers, A6:1-A6:6 Ho, C. T., et a;. (1983). Journal of Agricultural and Food Chemistry, 31(2), 336-342. |
| Heptanal | aldehyde | Macleod, G., & Ames, J. M. (1986). Flavour and Fragrance Journal, 1(3), 91-104. Macleod, G., & Ames, J. M. (1986). Journal of Food Science, 51(6), 1427-1434. Uralets, V. P., & Golovnja, R. V. (1980). Molecular Nutrition & Food Research, 24(2), 155-162. Persson, T., & Sydow, E. (1973). Journal of Food Science, 38(3), 377-385. Frank, D., et al. (2016). Journal of Agricultural and Food Chemistry, 64(21), 4299-4311. Min, D., Ina, K., Peterson, R. J., & Chang, S. S. (1979). Journal of Food Science, 44(3), 639-642. Umano, K., & Shibamoto, T. (1987). Journal of Agricultural and Food Chemistry, 35(1), 14-18. | Wilson, R. A., & Katz, I. (1972). Journal of Agricultural and Food Chemistry, 20(4), 741-747. Minor, L. J., et al. (1965). Journal of Food Science, 30(4), 686-696. Schroll, W., et al. (1988). Zeitschrift für Lebensmittel-Untersuchung und Forschung, 187(6), 558-560. Tang, J., et al. (1983). Journal of Agricultural and Food Chemistry, 31(6), 1287-1292. Delort, E., et al. (2011). Journal of Agricultural and Food Chemistry, 59(21), 11752-11763. (Supplemental Information) Noleau, I., & Toulemonde, B. (1986). Lebensmittel-Wissenschaft+Technologie. 19(2): 122-125 Golovkin, N. A., & Galkin, A. V. (1974). Applied Biochemistry and Microbiology, 9(1), 65-68. Noleau, I., & Toulemonde, B. (1987). Lebensmittel-Wissenschaft+Technologie. 20(1), 37-41. | Mussinan, C. J., & Walradt, J. P. (1974). Journal of Agricultural and Food Chemistry, 22(5), 827-831. Heidemann, F. H., & Wismer-Pedersen, J. (1976). Proceedings of the European Meeting of Meat Research Workers, A6:1-A6:6 Ho, C. T., et a;. (1983). Journal of Agricultural and Food Chemistry, 31(2), 336-342. García-González, D. L., et al. (2008). Meat Science, 80(2), 315-325. Mottram, D. S. (1985). Journal of the Science of Food and Agriculture, 36(5), 377-382. |

| Compound | Compound Type | Beef Reference | Chicken Reference | Pork Reference |
|---|---|---|---|---|
| Hexanal | Aldehyde | Macleod, G., & Ames, J. M. (1986). Flavour and Fragrance Journal, 1(3), 91-104.<br>Macleod, G., & Ames, J. M. (1986). Journal of Food Science, 51(6), 1427-1434.<br>Uralets, V. P., & Golovnja, R. V. (1980). Molecular Nutrition & Food Research, 24(2), 155-162.<br>Persson, T., & Sydow, E. (1973). Journal of Food Science, 38(3), 377-385.<br>Frank, D., et al. (2016). Journal of Agricultural and Food Chemistry, 64(21), 4299-4311.<br>Min, D., Ina, K., Peterson, R. J., & Chang, S. S. (1979). Journal of Food Science, 44(3), 639-642.<br>Umano, K., & Shibamoto, T. (1987). Journal of Agricultural and Food Chemistry, 35(1), 14-18. | Wilson, R. A., & Katz, I. (1972). Journal of Agricultural and Food Chemistry, 20(4), 741-747.<br>Minor, L. J., et al. (1965). Journal of Food Science, 30(4), 686-696.<br>Schroll, W., et al. (1988). Zeitschrift für Lebensmittel-Untersuchung und Forschung, 187(6), 558-560.<br>Tang, J., et al. (1983). Journal of Agricultural and Food Chemistry, 31(6), 1287-1292.<br>Delort, E., et al. (2011). Journal of Agricultural and Food Chemistry, 59(21), 11752-11763. (Supplemental Information)<br>Noleau, I., & Toulemonde, B. (1986). Lebensmittel-Wissenschaft+Technologie, 19(2): 122-125<br>Golovkin, N. A., & Galkin, A. V. (1974). Applied Biochemistry and Microbiology, 9(1), 65-68.<br>Noleau, I., & Toulemonde, B. (1987). Lebensmittel-Wissenschaft+Technologie, 20(1), 37-41. | Mussinan, C. J., & Walradt, J. P. (1974). Journal of Agricultural and Food Chemistry, 22(5), 827-831.<br>Baloga, D. W., et al. (1990). Journal of Agricultural and Food Chemistry, 38(11), 2021-2026.<br>Mottram, D. S., et al. (1984). Journal of the Science of Food and Agriculture, 35(2), 233-239.<br>Heidemann, F. H., & Wismer-Pedersen, J. (1976). Proceedings of the European Meeting of Meat Research Workers, A6:1-A6:6.<br>Ho, C. T., et a;. (1983). Journal of Agricultural and Food Chemistry, 31(2), 336-342.<br>García-González, D. L., et al. (2008). Meat Science, 80(2), 315-325.<br>Mottram, D. S. (1985). Journal of the Science of Food and Agriculture, 36(5), 377-382. |
| Propanal, 2-methyl- | Aldehyde | Macleod, G., & Ames, J. M. (1986). Flavour and Fragrance Journal, 1(3), 91-104.<br>Macleod, G., & Ames, J. M. (1986). Journal of Food Science, 51(6), 1427-1434.<br>Uralets, V. P., & Golovnja, R. V. (1980). Molecular Nutrition & Food Research, 24(2), 155-162.<br>Persson, T., & Sydow, E. (1973). | | Heidemann, F. H., & Wismer-Pedersen, J. (1976). Proceedings of the European Meeting of Meat Research Workers, A6:1-A6:6<br>Ho, C. T., et a;. (1983). Journal of Agricultural and Food Chemistry, 31(2), 336-342. |

| Compound | Compound Type | Beef Reference | Chicken Reference | Pork Reference |
|---|---|---|---|---|
| | | Journal of Food Science, 38(3), 377-385.<br>Frank, D., et al. (2016). Journal of Agricultural and Food Chemistry, 64(21), 4299-4311. | | |
| Hexane, 3-methyl- | Alkane | | | Wittkowski, R., et al. (1990). Food Chemistry, 37(2), 135-144. |
| Tetradecane | Alkane | Liebich, H. M., et al. (1972). Journal of Agricultural and Food Chemistry, 20(1), 96-99.<br>Min, D., Ina, K., Peterson, R. J., & Chang, S. S. (1979). Journal of Food Science, 44(3), 639-642. | Tang, J., et al. (1983). Journal of Agricultural and Food Chemistry, 31(6), 1287-1292.<br>Noleau, I., & Toulemonde, B. (1986). Lebensmittel-Wissenschaft+Technologie. 19(2): 122-125<br>Noleau, I., & Toulemonde, B. (1987). Lebensmittel-Wissenschaft+Technologie, 20(1), 37-41. | Mottram, D. S., et al. (1984). Journal of the Science of Food and Agriculture, 35(2), 233-239.<br>Ho, C. T., et al:. (1983). Journal of Agricultural and Food Chemistry, 31(2), 336-342. |
| 2,6-Dimethylpyrazine | aromatic nitrogen | Frank, D., et al. (2016). Journal of Agricultural and Food Chemistry, 64(21), 4299-4311.<br>Liu, R. H., et al. (1987). Warmed-over flavor of meat. 193.<br>Mussinan, C. J., et al. (1973). Journal of Agricultural and Food Chemistry, 21(5), 871-872.<br>Hartman, G. J., et al. (1983). Journal of Agricultural and Food Chemistry, 31(5), 1030-1033. | Tang, J., et al. (1983). Journal of Agricultural and Food Chemistry, 31(6), 1287-1292.<br>Noleau, I., & Toulemonde, B. (1987). Lebensmittel-Wissenschaft+Technologie, 20(1), 37-41.<br>Noleau, I., & Toulemonde, B. (1986). Lebensmittel-Wissenschaft+Technologie. 19(2): 122-125 | Mussinan, C. J., & Walradt, J. P. (1974). Journal of Agricultural and Food Chemistry, 22(5), 827-831.<br>Mottram, D. S., et al. (1984). Journal of the Science of Food and Agriculture, 35(2), 233-239.<br>Ho, C. T., et a;. (1983). Journal of Agricultural and Food Chemistry, 31(2), 336-342.<br>Mottram, D. S. (1985). Journal of the Science of Food and Agriculture, 36(5), 377-382. |

| Compound | Compound Type | Beef Reference | Chicken Reference | Pork Reference |
|---|---|---|---|---|
| Pyrazine, 2,3-dimethyl- | aromatic nitrogen | Macleod, G., & Ames, J. M. (1986). Flavour and Fragrance Journal, 1(3), 91-104. Macleod, G., & Ames, J. M. (1986). Journal of Food Science, 51(6), 1427-1434. Frank, D., et al. (2016). Journal of Agricultural and Food Chemistry, 64(21), 4299-4311. Liu, R. H., et al. (1987). Warmed-over flavor of meat. 193. | Tang, J., et al. (1983). Journal of Agricultural and Food Chemistry, 31(6), 1287-1292. Delort, E., et al. (2011). Journal of Agricultural and Food Chemistry, 59(21), 11752-11763. (Supplemental Information) | Mussinan, C. J., & Walradt, J. P. (1974). Journal of Agricultural and Food Chemistry, 22(5), 827-831. Mottram, D. S., et al. (1984). Journal of the Science of Food and Agriculture, 35(2), 233-239. Ho, C. T., et a;. (1983). Journal of Agricultural and Food Chemistry, 31(2), 336-342. Mottram, D. S. (1985). Journal of the Science of Food and Agriculture, 36(5), 377-382. |
| Pyrazine, 2,5-dimethyl- | aromatic nitrogen | Liu, R. H., et al. (1987). Warmed-over flavor of meat. 193. | Tang, J., et al. (1983). Journal of Agricultural and Food Chemistry, 31(6), 1287-1292. Delort, E., et al. (2011). Journal of Agricultural and Food Chemistry, 59(21), 11752-11763. (Supplemental Information) | Mussinan, C. J., & Walradt, J. P. (1974). Journal of Agricultural and Food Chemistry, 22(5), 827-831. Mottram, D. S., et al. (1984). Journal of the Science of Food and Agriculture, 35(2), 233-239. Ho, C. T., et a;. (1983). Journal of Agricultural and Food Chemistry, 31(2), 336-342. Mottram, D. S. (1985). Journal of the Science of Food and Agriculture, 36(5), 377-382. |
| Pyrazine, ethyl- | aromatic nitrogen | Macleod, G., & Ames, J. M. (1986). Flavour and Fragrance Journal, 1(3), 91-104. Macleod, G., & Ames, J. M. (1986). Journal of Food Science, 51(6), 1427-1434. Frank, D., et al. (2016). Journal of Agricultural and Food Chemistry, 64(21), 4299-4311. | | Mussinan, C. J., & Walradt, J. P. (1974). Journal of Agricultural and Food Chemistry, 22(5), 827-831. |

| Compound | Compound Type | Beef Reference | Chicken Reference | Pork Reference |
|---|---|---|---|---|
| | | Liu, R. H., et al. (1987). Warmed-over flavor of meat. 193. | | |
| Pyrazine, trimethyl- | aromatic nitrogen | Macleod, G., & Ames, J. M. (1986). Flavour and Fragrance Journal, 1(3), 91-104. Macleod, G., & Ames, J. M. (1986). Journal of Food Science, 51(6), 1427-1434. Frank, D., et al. (2016). Journal of Agricultural and Food Chemistry, 64(21), 4299-4311. Liu, R. H., et al. (1987). Warmed-over flavor of meat. 193. | Tang, J., et al. (1983). Journal of Agricultural and Food Chemistry, 31(6), 1287-1292. Noleau, I., & Toulemonde, B. (1986). Lebensmittel-Wissenschaft+Technologie. 19(2): 122-125 | Mussinan, C. J., & Walradt, J. P. (1974). Journal of Agricultural and Food Chemistry, 22(5), 827-831. Ho, C. T., et a;. (1983). Journal of Agricultural and Food Chemistry, 31(2), 336-342. Mottram, D. S. (1985). Journal of the Science of Food and Agriculture, 36(5), 377-382. |
| Pyridine, 3-ethyl- | aromatic nitrogen | Macleod, G., & Ames, J. M. (1986). Flavour and Fragrance Journal, 1(3), 91-104. Macleod, G., & Ames, J. M. (1986). Journal of Food Science, 51(6), 1427-1434. | Tang, J., et al. (1983). Journal of Agricultural and Food Chemistry, 31(6), 1287-1292. Delort, E., et al. (2011). Journal of Agricultural and Food Chemistry, 59(21), 11752-11763. (Supplemental Information) | |
| 5-Methyl-2-thiophenecarboxaldehyde | aromatic sulfure | Wilson, R. A., et al. (1973). Journal of Agricultural and Food Chemistry, 21(5), 873-876. | Gasser, U., & Grosch, W. (1990). Zeitschrift für Lebensmittel-Untersuchung und Forschung, 190(1), 3-8. | Mussinan, C. J., & Walradt, J. P. (1974). Journal of Agricultural and Food Chemistry, 22(5), 827-831. |
| Thiophene, 3-methyl- | aromatic sulfure | Frank, D., et al. (2016). Journal of Agricultural and Food Chemistry, 64(21), 4299-4311. | | |

| Compound | Compound Type | Beef Reference | Chicken Reference | Pork Reference |
|---|---|---|---|---|
| Dimethyl trisulfide | disulfide/trisulfide | Macleod, G., & Ames, J. M. (1986). Flavour and Fragrance Journal, 1(3), 91-104.<br>Macleod, G., & Ames, J. M. (1986). Journal of Food Science, 51(6), 1427-1434.<br>Persson, T., & Sydow, E. (1973). Journal of Food Science, 38(3), 377-385.<br>Frank, D., et al. (2016). Journal of Agricultural and Food Chemistry, 64(21), 4299-4311.<br>Liu, R. H., et al. (1987). Warmed-over flavor of meat. 193. | Noleau, I., & Toulemonde, B. (1986). Lebensmittel-Wissenschaft+ Technologie. 19(2): 122-125 | Baloga, D. W., et al. (1990). Journal of Agricultural and Food Chemistry, 38(11), 2021-2026. |
| 2-n-Butyl furan | Furan | Persson, T., & Sydow, E. (1973). Journal of Food Science, 38(3), 377-385.<br>Min, D., Ina, K., Peterson, R. J., & Chang, S. S. (1979). Journal of Food Science, 44(3), 639-642. | Tang, J., et al. (1983). Journal of Agricultural and Food Chemistry, 31(6), 1287-1292.<br>Noleau, I., & Toulemonde, B. (1987). Lebensmittel-Wissenschaft+ Technologie, 20(1), 37-41. | Mussinan, C. J., & Walradt, J. P. (1974). Journal of Agricultural and Food Chemistry, 22(5), 827-831.<br>Ho, C. T., et a;. (1983). Journal of Agricultural and Food Chemistry, 31(2), 336-342. |
| Furan | Furan | Macleod, G., & Ames, J. M. (1986). Flavour and Fragrance Journal, 1(3), 91-104.<br>Persson, T., & Sydow, E. (1973). Journal of Food Science, 38(3), 377-385. | | Heidemann, F. H., & Wismer-Pedersen, J. (1976). Proceedings of the European Meeting of Meat Research Workers, A6:1-A6:6 |

| Compound | Compound Type | Beef Reference | Chicken Reference | Pork Reference |
|---|---|---|---|---|
| Furan, 2-pentyl- | Furan | Macleod, G., & Ames, J. M. (1986). Flavour and Fragrance Journal, 1(3), 91-104.<br>Macleod, G., & Ames, J. M. (1986). Journal of Food Science, 51(6), 1427-1434.<br>Persson, T., & Sydow, E. (1973). Journal of Food Science, 38(3), 377-385.<br>Frank, D., et al. (2016). Journal of Agricultural and Food Chemistry, 64(21), 4299-4311.<br>Min, D., Ina, K., Peterson, R. J., & Chang, S. S. (1979). Journal of Food Science, 44(3), 639-642.<br>Liu, R. H., et al. (1987). Warmed-over flavor of meat. 193.<br>Umano, K., & Shibamoto, T. (1987). Journal of Agricultural and Food Chemistry, 35(1), 14-18. | Schroll, W., et al. (1988). Zeitschrift für Lebensmittel-Untersuchung und Forschung, 187(6), 558-560.<br>Tang, J., et al. (1983). Journal of Agricultural and Food Chemistry, 31(6), 1287-1292.<br>Delort, E., et al. (2011). Journal of Agricultural and Food Chemistry, 59(21), 11752-11763. (Supplemental Information)<br>Noleau, I., & Toulemonde, B. (1986). Lebensmittel-Wissenschaft+Technologie. 19(2): 122-125<br>Noleau, I., & Toulemonde, B. (1987). Lebensmittel-Wissenschaft+Technologie. 20(1), 37-41. | Mussinan, C. J., & Walradt, J. P. (1974). Journal of Agricultural and Food Chemistry, 22(5), 827-831.<br>Mottram, D. S., et al. (1984). Journal of the Science of Food and Agriculture, 35(2), 233-239.<br>Heidemann, F. H., & Wismer-Pedersen, J. (1976). Proceedings of the European Meeting of Meat Research Workers, A6:1-A6:6<br>Ho, C. T., et a;. (1983). Journal of Agricultural and Food Chemistry, 31(2), 336-342.<br>García-González, D. L., et al. (2008). Meat Science, 80(2), 315-325.<br>Mottram, D. S. (1985). Journal of the Science of Food and Agriculture, 36(5), 377-382. |
| 1-Penten-3-one | Ketone | Macleod, G., & Ames, J. M. (1986). Flavour and Fragrance Journal, 1(3), 91-104.<br>Macleod, G., & Ames, J. M. (1986). Journal of Food Science, 51(6), 1427-1434. | Noleau, I., & Toulemonde, B. (1986). Lebensmittel-Wissenschaft+Technologie. 19(2): 122-125<br>Noleau, I., & Toulemonde, B. (1987). Lebensmittel-Wissenschaft+Technologie. 20(1), 37-41. | |
| 2,3-Hexanedione | ketone | | Noleau, I., & Toulemonde, B. (1986). Lebensmittel-Wissenschaft+Technologie. 19(2): 122-125 | |

| Compound | Compound Type | Beef Reference | Chicken Reference | Pork Reference |
|---|---|---|---|---|
| 2-Butanone | Ketone | Macleod, G., & Ames, J. M. (1986). Flavour and Fragrance Journal, 1(3), 91-104.<br>Macleod, G., & Ames, J. M. (1986). Journal of Food Science, 51(6), 1427-1434.<br>Uralets, V. P., & Golovnja, R. V. (1980). Molecular Nutrition & Food Research, 24(2), 155-162.<br>Persson, T., & Sydow, E. (1973). Journal of Food Science, 38(3), 377-385.<br>Umano, K., & Shibamoto, T. (1987). Journal of Agricultural and Food Chemistry, 35(1), 14-18. | Wilson, R. A., & Katz, I. (1972). Journal of Agricultural and Food Chemistry, 20(4), 741-747.<br>Tang, J., et al. (1983). Journal of Agricultural and Food Chemistry, 31(6), 1287-1292.<br>Noleau, I., & Toulemonde, B. (1986). Lebensmittel-Wissenschaft+Technologie. 19(2): 122-125<br>Golovkin, N. A., & Galkin, A. V. (1974). Applied Biochemistry and Microbiology, 9(1), 65-68.<br>Delort, E., et al. (2011). Journal of Agricultural and Food Chemistry, 59(21), 11752-11763. (Supplemental Information) | Mussinan, C. J., & Walradt, J. P. (1974). Journal of Agricultural and Food Chemistry, 22(5), 827-831.<br>García-González, D. L., et al. (2008). Meat Science, 80(2), 315-325. |
| 2-Heptanone | Ketone | Macleod, G., & Ames, J. M. (1986). Flavour and Fragrance Journal, 1(3), 91-104.<br>Macleod, G., & Ames, J. M. (1986). Journal of Food Science, 51(6), 1427-1434.<br>Uralets, V. P., & Golovnja, R. V. (1980). Molecular Nutrition & Food Research, 24(2), 155-162.<br>Persson, T., & Sydow, E. (1973). Journal of Food Science, 38(3), 377-385.<br>Frank, D., et al. (2016). Journal of Agricultural and Food Chemistry, 64(21), 4299-4311.<br>Umano, K., & Shibamoto, T. (1987). Journal of Agricultural and Food Chemistry, 35(1), 14-18. | Wilson, R. A., & Katz, I. (1972). Journal of Agricultural and Food Chemistry, 20(4), 741-747.<br>Minor, L. J., et al. (1965). Journal of Food Science, 30(4), 686-696.<br>Tang, J., et al. (1983). Journal of Agricultural and Food Chemistry, 31(6), 1287-1292.<br>Delort, E., et al. (2011). Journal of Agricultural and Food Chemistry, 59(21), 11752-11763. (Supplemental Information)<br>Noleau, I., & Toulemonde, B. (1986). Lebensmittel-Wissenschaft+Technologie. 19(2): 122-125<br>Noleau, I., & Toulemonde, B. (1987). Lebensmittel-Wissenschaft+Technologie, 20(1), 37-41. | Mussinan, C. J., & Walradt, J. P. (1974). Journal of Agricultural and Food Chemistry, 22(5), 827-831.<br>Mottram, D. S., et al. (1984). Journal of the Science of Food and Agriculture, 35(2), 233-239.<br>Ho, C. T., et a;. (1983). Journal of Agricultural and Food Chemistry, 31(2), 336-342.<br>García-González, D. L., et al. (2008). Meat Science, 80(2), 315-325., |

| Compound | Compound Type | Beef Reference | Chicken Reference | Pork Reference |
|---|---|---|---|---|
| 2-Propanone, 1-(acetyloxy)- | ketone | Watanabe, K., & Sato, Y. (1972). Journal of Agricultural and Food Chemistry, 20(2), 174-176. | Noleau, I., & Toulemonde, B. (1986). Lebensmittel-Wissenschaft+ Technologie. 19(2): 122-125 | Mussinan, C. J., & Walradt, J. P. (1974). Journal of Agricultural and Food Chemistry, 22(5), 827-831. Ho, C. T., et a;. (1983). Journal of Agricultural and Food Chemistry, 31(2), 336-342. |
| 2-Undecanone | Ketone | Macleod, G., & Ames, J. M. (1986). Flavour and Fragrance Journal, 1(3), 91-104. Macleod, G., & Ames, J. M. (1986). Journal of Food Science, 51(6), 1427-1434. | Delort, E., et al. (2011). Journal of Agricultural and Food Chemistry, 59(21), 11752-11763. (Supplemental Information) Noleau, I., & Toulemonde, B. (1987). Lebensmittel-Wissenschaft+ Technologie. 20(1), 37-41. | |
| 3-Buten-2-one, 3-methyl- | Ketone | | Noleau, I., & Toulemonde, B. (1986). Lebensmittel-Wissenschaft+ Technologie. 19(2): 122-125 | Mussinan, C. J., & Walradt, J. P. (1974). Journal of Agricultural and Food Chemistry, 22(5), 827-831. Ho, C. T., et a;. (1983). Journal of Agricultural and Food Chemistry, 31(2), 336-342. |
| 3-Penten-2-one, (E)- | Ketone | | Noleau, I., & Toulemonde, B. (1986). Lebensmittel-Wissenschaft+ Technologie. 19(2): 122-125 Noleau, I., & Toulemonde, B. (1987). Lebensmittel-Wissenschaft+ Technologie. 20(1), 37-41. | Ho, C. T., et a;. (1983). Journal of Agricultural and Food Chemistry, 31(2), 336-342. |
| 5-Hepten-2-one, 6-methyl- | Ketone | Persson, T., & Sydow, E. (1973). Journal of Food Science, 38(3), 377-385. | | |
| Acetone | Ketone | Macleod, G., & Ames, J. M. (1986). Flavour and Fragrance Journal, 1(3), 91-104. Macleod, G., & Ames, J. M. (1986). Journal of Food Science, 51(6), 1427-1434. | Wilson, R. A., & Katz, I. (1972). Journal of Agricultural and Food Chemistry, 20(4), 741-747. Minor, L. J., et al. (1965). Journal of Food Science, 30(4), 686-696. Golovkin, N. A., & Galkin, A. V. | Mussinan, C. J., & Walradt, J. P. (1974). Journal of Agricultural and Food Chemistry, 22(5), 827-831. García-González, D. L., et al. (2008). Meat Science, 80(2), 315-325. |

| Compound | Compound Type | Beef Reference | Chicken Reference | Pork Reference |
|---|---|---|---|---|
| | | Uralets, V. P., & Golovnja, R. V. (1980). Molecular Nutrition & Food Research, 24(2), 155-162. Persson, T., & Sydow, E. (1973). Journal of Food Science, 38(3), 377-385. | (1974). Applied Biochemistry and Microbiology, 9(1), 65-68. | |
| Acetophenone | Ketone | Macleod, G., & Ames, J. M. (1986). Flavour and Fragrance Journal, 1(3), 91-104. Macleod, G., & Ames, J. M. (1986). Journal of Food Science, 51(6), 1427-1434. Min, D., Ina, K., Peterson, R. J., & Chang, S. S. (1979). Journal of Food Science, 44(3), 639-642. | | Baloga, D. W., et al. (1990). Journal of Agricultural and Food Chemistry, 38(11), 2021-2026. Mottram, D. S., et al. (1984). Journal of the Science of Food and Agriculture, 35(2), 233-239. |
| 2H-Pyran-2-one, tetrahydro- | lactone | | Noleau, I., & Toulemonde, B. (1987). Lebensmittel-Wissenschaft+Technologie, 20(1), 37-41. | |
| Ethanone, 1-(2-furanyl)- | lactone | Macleod, G., & Ames, J. M. (1986). Flavour and Fragrance journal, 1(3), 91-104. Min, D., Ina, K., Peterson, R. J., & Chang, S. S. (1979). Journal of Food Science, 44(3), 639-642. | Noleau, I., & Toulemonde, B. (1986). Lebensmittel-Wissenschaft+Technologie. 19(2): 122-125 | Mussinan, C. J., & Walradt, J. P. (1974). Journal of Agricultural and Food Chemistry, 22(5), 827-831. Baloga, D. W., et al. (1990). Journal of Agricultural and Food Chemistry, 38(11), 2021-2026. Heidemann, F. H., & Wismer-Pedersen, J. (1976). Proceedings of the European Meeting of Meat Research Workers, A6:1-A6:6 Ho, C. T., et a;. (1983). Journal of Agricultural and Food Chemistry, 31(2), 336-342. Mottram, D. S. (1985). Journal of the Science of Food and Agriculture, 36(5), 377-382. |

| Compound | Compound Type | Beef Reference | Chicken Reference | Pork Reference |
|---|---|---|---|---|
| 2-Acetyl-1-pyrroline | Nitrogen | Frank, D., et al. (2016). Journal of Agricultural and Food Chemistry, 64(21), 4299-4311. | Gasser, U., & Grosch, W. (1990). Zeitschrift für Lebensmittel-Untersuchung und Forschung, 190(1), 3-8. | |
| Pyrazine | Nitrogen | Macleod, G., & Ames, J. M. (1986). Flavour and Fragrance Journal, 1(3), 91-104.<br>Macleod, G., & Ames, J. M. (1986). Journal of Food Science, 51(6), 1427-1434.<br>Liu, R. H., et al. (1987). Warmed-over flavor of meat. 193. | Tang, J., et al. (1983). Journal of Agricultural and Food Chemistry, 31(6), 1287-1292. | Mussinan, C. J., & Walradt, J. P. (1974). Journal of Agricultural and Food Chemistry, 22(5), 827-831.<br>Ho, C. T., et a;. (1983). Journal of Agricultural and Food Chemistry, 31(2), 336-342. |
| Pyridine | Nitrogen | Macleod, G., & Ames, J. M. (1986). Flavour and Fragrance Journal, 1(3), 91-104.<br>Macleod, G., & Ames, J. M. (1986). Journal of Food Science, 51(6), 1427-1434. | Tang, J., et al. (1983). Journal of Agricultural and Food Chemistry, 31(6), 1287-1292.<br>Noleau, I., & Toulemonde, B. (1987). Lebensmittel-Wissenschaft+Technologie. 20(1), 37-41. | Ho, C. T., et a;. (1983). Journal of Agricultural and Food Chemistry, 31(2), 336-342. |
| Disulfide, dimethyl | sulfure | Macleod, G., & Ames, J. M. (1986). Flavour and Fragrance Journal, 1(3), 91-104.<br>Macleod, G., & Ames, J. M. (1986). Journal of Food Science, 51(6), 1427-1434.<br>Persson, T., & Sydow, E. (1973). Journal of Food Science, 38(3), 377-385.<br>Frank, D., et al. (2016). Journal of Agricultural and Food Chemistry, 64(21), 4299-4311.<br>Liu, R. H., et al. (1987). Warmed-over flavor of meat. 193. | Minor, L. J., et al. (1965). Journal of Food Science, 30(4), 686-696.<br>Noleau, I., & Toulemonde, B. (1986). Lebensmittel-Wissenschaft+Technologie. 19(2): 122-125<br>Delort, E., et al. (2011). Journal of Agricultural and Food Chemistry, 59(21), 11752-11763. (Supplemental Information) | Mussinan, C. J., & Walradt, J. P. (1974). Journal of Agricultural and Food Chemistry, 22(5), 827-831.<br>Heidemann, F. H., & Wismer-Pedersen, J. (1976). Proceedings of the European Meeting of Meat Research Workers, A6:1-A6:6<br>García-González, D. L., et al. (2008). Meat Science, 80(2), 315-325. |

| Compound | Compound Type | Beef Reference | Chicken Reference | Pork Reference |
|---|---|---|---|---|
| 2-Acetylthiazole | thiazole | Macleod, G., & Ames, J. M. (1986). Flavour and Fragrance Journal, 1(3), 91-104. Macleod, G., & Ames, J. M. (1986). Journal of Food Science, 51(6), 1427-1434. | Gasser, U., & Grosch, W. (1990). Zeitschrift für Lebensmittel-Untersuchung und Forschung, 190(1), 3-8. Delort, E., et al. (2011). Journal of Agricultural and Food Chemistry, 59(21), 11752-11763. (Supplemental Information) | Mussinan, C. J., & Walradt, J. P. (1974). Journal of Agricultural and Food Chemistry, 22(5), 827-831. Mottram, D. S. (1985). Journal of the Science of Food and Agriculture, 36(5), 377-382. |
| 2-Propenal | thiazole | Macleod, G., & Ames, J. M. (1986). Flavour and Fragrance Journal, 1(3), 91-104. | | |
| Thiazole, 2,4-dimethyl- | thiazole | Wilson, R. A., et al. (1973). Journal of Agricultural and Food Chemistry, 21(5), 873-876. | | Mottram, D. S. (1985). Journal of the Science of Food and Agriculture, 36(5), 377-382. |
| Thiazole, 2-methyl- | thiazole | Wilson, R. A., et al. (1973). Journal of Agricultural and Food Chemistry, 21(5), 873-876. | Tang, J., et al. (1983). Journal of Agricultural and Food Chemistry, 31(6), 1287-1292. | Baloga, D. W., et al. (1990). Journal of Agricultural and Food Chemistry, 38(11), 2021-2026. |
| Methional | thioether | Frank, D., et al. (2016). Journal of Agricultural and Food Chemistry, 64(21), 4299-4311. | Schroll, W., et al. (1988). Zeitschrift für Lebensmittel-Untersuchung und Forschung, 187(6), 558-560. Gasser, U., & Grosch, W. (1990). Zeitschrift für Lebensmittel-Untersuchung und Forschung, 190(1), 3-8. Delort, E., et al. (2011). Journal of Agricultural and Food Chemistry, 59(21), 11752-11763. (Supplemental Information) Noleau, I., & Toulemonde, B. (1986). Lebensmittel-Wissenschaft+Technologie. 19(2): 122-125 | |
| Thiirane, methyl- | thioether | Macleod, G., & Ames, J. M. (1986). Flavour and Fragrance Journal, 1(3), 91-104. | | |

| Compound | Compound Type | Beef Reference | Chicken Reference | Pork Reference |
|---|---|---|---|---|
| | | Persson, T., & Sydow, E. (1973). Journal of Food Science, 38(3), 377-385. | | |
| Propyl mercaptan | thiol | Macleod, G., & Ames, J. M. (1986). Flavour and Fragrance Journal, 1(3), 91-104. Frank, D., et al. (2016). Journal of Agricultural and Food Chemistry, 64(21), 4299-4311. | Minor, L. J., et al. (1965). Journal of Food Science, 30(4), 686-696. | |

What is claimed is:

1. A protein composition produced by a method comprising:
   a) lysing an aqueous suspension of a plurality of cells to obtain a cell lysate; and
   b) filtering the cell lysate to obtain a protein composition, wherein steps a) and b) independently, are performed at a pH between about 8.5 and about 12.0; and
   wherein:
   (i) the protein composition forms a gel upon heating to 65° C.;
   (ii) the protein composition forms a gel with a storage modulus of at least about 100 Pa when heated at or above about 85° C. for about 20 minutes;
   (iii) heating a 10% (w/v) suspension of the protein composition to at least about 95° C. results in a gel with a storage modulus of at least about 100 Pa;
   (iv) the protein composition forms a gel between about pH 5.5 and about pH 10.0, or
   (v) the protein composition forms a gel in solution with ionic strength below about 0.5 M, wherein the ionic strength is calculated based on the concentration of non-protein solutes.

2. The protein composition of claim 1, wherein filtering comprises microfiltration, ultrafiltration, diafiltration, or a combination thereof.

3. The protein composition of claim 1, further comprising washing the aqueous suspension of the plurality of cells at a pH between about 8.5 and about 12.0 before step a).

4. The protein composition of claim 1, wherein at least about 50% of the protein in the protein composition falls between about 10 kDa and about 200 kDa.

5. The protein composition of claim 1, wherein the plurality of cells comprises microbial cells.

6. The protein composition of claim 1, wherein the lysing is performed biochemically or chemically.

7. The protein composition of claim 1, further comprising pasteurizing the protein composition to obtain a pasteurized protein composition.

8. The protein composition of claim 1, wherein the protein composition forms a gel upon heating to 65° C.

9. The protein composition of claim 1, wherein the protein composition forms a gel with a storage modulus of at least about 100 Pa when heated at or above about 85° C. for about 20 minutes.

10. The protein composition of claim 1, wherein heating a 10% (w/v) suspension of the protein composition to at least about 95° C. results in a gel with a storage modulus of at least about 100 Pa.

11. The protein composition of claim 1, wherein the protein composition forms a gel between about pH 5.5 and about pH 10.0.

12. The protein composition of claim 1, wherein the protein composition forms a gel in solution with ionic strength below about 0.5 M, wherein the ionic strength is calculated based on the concentration of non-protein solutes.

13. The protein composition of claim 1, wherein the protein composition exhibits two or more characteristics selected from the group consisting of: (i)-(v).

14. The protein composition of claim 1, wherein the protein composition exhibits three or more characteristics selected from the group consisting of: (i)-(v).

15. The protein composition of claim 1, wherein the plurality of cells comprises fungal cells.

16. The protein composition of claim 15, wherein the fungal cells are selected from the group consisting of *Saccharomyces, Pichia, Candida, Hansenula, Torulopsis, Kluyveromyces, Yarrowia*, and *Fusarium* cells.

17. The protein composition of claim 1, wherein the plurality of cells comprises bacterial cells.

18. The protein composition of claim 17, wherein the bacterial cells are selected from the group consisting of *Bacillus, Escherichia, Lactobacillus, Corynebacterium, Pseudomonas*, and *Methanococcus*.

19. The protein composition of claim 1, further comprising clarifying the cell lysate to obtain a clarified lysate.

20. The protein composition of claim 19, wherein the clarifying is performed by centrifugation to less than about 20% dry solids.

* * * * *

SEQUENCE LISTING

```
Sequence total quantity: 27
SEQ ID NO: 1                  moltype = AA   length = 161
FEATURE                       Location/Qualifiers
source                        1..161
                              mol_type = protein
                              organism = Vigna radiata
SEQUENCE: 1
MTTTLERGFT EEQEALVVKS WNVMKKNSGE LGLKFFLKIF EIAPSAQKLF SFLRDSTVPL    60
EQNPKLKPHA VSVFVMTCDS AVQLRKAGKV TVRESNLKKL GATHFRTGVA NEHFEVTKFA   120
LLETIKEAVP EMWSPAMKNA WGEAYDQLVD AIKYEMKPPS S                       161

SEQ ID NO: 2                  moltype = AA   length = 133
FEATURE                       Location/Qualifiers
source                        1..133
                              mol_type = protein
                              organism = Methylacidiphilum infernorum
SEQUENCE: 2
MIDQKEKELI KESWKRIEPN KNEIGLLFYA NLFKEEPTVS VLFQNPISSQ SRKLMQVLGI    60
LVQGIDNLEG LIPTLQDLGR RHKQYGVVDS HYPLVGDCLL KSIQEYLGQG FTEEAKAAWT   120
KVYGIAAQVM TAE                                                      133

SEQ ID NO: 3                  moltype = AA   length = 139
FEATURE                       Location/Qualifiers
source                        1..139
                              mol_type = protein
                              organism = Aquifex aeolicus
SEQUENCE: 3
MLSEETIRVI KSTVPLLKEH GTEITARMYE LLFSKYPKTK ELFAGASEEQ PKKLANAIIA    60
YATYIDRLEE LDNAISTIAR SHVRRNVKPE HYPLVKECLL QAIEEVLNPG EEVLKAWEEA   120
YDFLAKTLIT LEKKLYSQP                                                139

SEQ ID NO: 4                  moltype = AA   length = 145
FEATURE                       Location/Qualifiers
source                        1..145
                              mol_type = protein
                              organism = Glycine max
SEQUENCE: 4
MGAFTEKQEA LVSSSFEAPK ANIPQYSVVF YTSILEKAPA AKDLFSFLSN GVDPSNPKLT    60
GHAEKLFGLV RDSAGQLKAN GTVVADAALG SIHAQKAITD PQFVVVKEAL LKTIKEAVGD   120
KWSDELSSAW EVAYDELAAA IKKAF                                         145

SEQ ID NO: 5                  moltype = AA   length = 162
FEATURE                       Location/Qualifiers
source                        1..162
                              mol_type = protein
                              organism = Hordeum vulgare
SEQUENCE: 5
MSAAEGAVVF SEEKEALVLK SWAIMKKDSA NLGLRFFLKI FEIAPSARQM FPFLRDSDVP    60
LETNPKLKTH AVSVFVMTCE AAAQLRKAGK ITVRETTLKR LGGTHLKYGV ADGHFEVTRF   120
ALLETIKEAL PADMWGPEMR NAWGEAYDQL VAAIKQEMKP AE                      162

SEQ ID NO: 6                  moltype = AA   length = 1153
FEATURE                       Location/Qualifiers
source                        1..1153
                              mol_type = protein
                              organism = Magnaporthe oryzae
SEQUENCE: 6
MDGAVRLDWT GLDLTGHEIH DGVPIASRVQ VMVSFPLFKD QHIIMSSKES PSRKSSTIGQ    60
STRNGSCQAD TQKGQLPPVG EKPKPVKENP MKKLKEMSQR PLPTQHGDGT YPTEKKLTGI   120
GEDLKHIRGY DVKTLLAMVK SKLKGEKLKD DKTMLMERVM QLVARLPTES KKRAELTDSL   180
INELWESLDH PPLNYLGPEH SYRTPDGSYN HPFNPQLGAA GSRYARSVIP TVTPPGALPD   240
PGLIFDSIMG RTPNSYRKHP NNVSSILWYW ATIIIHDIFW TDPRDINTNK SSSYLDLAPL   300
YGNSQEMQDS IRTFKDGRMK PDCYADKRLA GMPPGVSVLL IMFNRFHNHV AENLALINEG   360
GRFNKPSDLL EGEAREAAWK KYDNDLFQVA RLVTSGLYIN ITLVDYVRNI VNLNRVDTTW   420
TLDPRQDAGA HVGTADGAER GTGNAVSAEF NLCYRWHSCI SEKDSKFVEA QFQNIFGKPA   480
SEVRPDEMWK GFAKMEQNTP ADPGQRTFGG FKRGPDGKFD DDDLVRCISE AVEDVAGAFG   540
ARNVPQAMKV VETMGIIQGR KWNVAGLNEF RKHFHLKPYS TFEDINSDPG VAEALRRLYD   600
HPDNVELYPG LVAEEDKQPM VPGVGIAPTY TISRVVLSDA VCLVRGDRFY TTDFTPRNLT   660
NWGYKEVDYD LSVNHGCVFY KLFIRAFPNH FKQNSVYAHY PMVVPSENKR ILEALGRADL   720
FDFEAPKYIP PRVNITSYGG AEYILETQEK YKVTWHEGLG FLMGEGGLKF MLSGDDPLHA   780
QQRKCMAAQL YKDGWTEAVK AFYAGMMEEL LVSKSYFLGN NKHRHVDIIR DVGNMVVHF   840
ASQVFGLPLK TAKNPTGVFT EQEMYGILAA IFTTIFFDLD PSKSFPLRTK TREVCQKLAK   900
LVEANVKLIN KIPWSRGMFV GKPAKDEPLS IYGKTMIKGL KAHGLSQVDI AWSHVVPTSG   960
AMVPNQAQVF AQAVDYYLSP AGMHYIPEIH MVALQPSTPE TDALLLGYAM EGIRLAGTFG  1020
SYREAAVDDV VKEDNGRQVP VKAGDRVFVS FVDAARDPKH FPDPEVVNPR RPAKKYIHYG  1080
VGPHACLGRD ASQIAITEMF RCLFRRRNVR RVPGPQGELK KVPRPGGFYV YMREDWGGLF  1140
PFPVTMRVMW DDE                                                    1153
```

```
SEQ ID NO: 7                moltype = AA   length = 530
FEATURE                     Location/Qualifiers
source                      1..530
                            mol_type = protein
                            organism = Fusarium oxysporum
SEQUENCE: 7
MKGSATLAFA LVQFSAASQL VWPSKWDEVE DLLYMQGGFN KRGFADALRT CEFGSNVPGT    60
QNTAEWLRTA FHDAITHDAK AGTGGLDASI YWESSRPENP GKAFNNTFGF FSGFHNPRAT   120
ASDLTALGTV LAVGACNGPR IPFRAGRIDA YKAGPAGVPE PSTNLKDTFA APTKAGFTKE   180
EMTAMVACGH AIGGVHSVDF PEIVGIKADP NNDTNVPFQK DVSSFHNGIV TEYLAGTSKN   240
PLVASKNATF HSDKRIFDND KATMKKLSTK AGFNSMCADI LTRMIDTVPK SVQLTPVLEA   300
YDVRPYITEL SLNNKNKIHF TGSVRVRITN NIRDNNDLAI NLIYVGRDGK KVTVPTQQVT   360
FQGGTSFGAG EVFANFEFDT TMDAKNGITK FFIQEVKPST KATVTHDNQQ TGGYKVDDTV   420
LYQLQQSCAV LEKLPNAPLV VTAMVRDARA KDALTLRVAH KKPVKGSIVP RFQTAITNFK   480
ATGKKSSGYT GFQAKTMFEE QSTYFDIVLG GSPASGVQFL TSQAMPSQCS              530

SEQ ID NO: 8                moltype = AA   length = 358
FEATURE                     Location/Qualifiers
source                      1..358
                            mol_type = protein
                            organism = Fusarium graminearum
SEQUENCE: 8
MASATRQFAR AATRATRNGF AIAPRQVIRQ QGRRYYSSEP AQKSSSAWIW LTGAAVAGGA    60
GYYFYGNSAS SATAKVFNPS KEDYQKVYNE IAARLEEKDD YDDGSYGPVL VRLAWHASGT   120
YDKETGTGGS NGATMRFAPE SDHGANAGLA AARDFLQPVK EKFPWITYSD LWILAGVCAI   180
QEMLGPAIPY RPGRSDRDVS GCTPDGRLPD ASKRQDHLRG IFGRMGFNDQ EIVALSGAHA   240
LGRCHTDRSG YSGPWTFSPT VLTNDYFRLL VEEKWQWKKW NGPAQYEDKS TKSLMMLPSD   300
IALIEDKKFK PWVEKYAKDN DAFFKDFSNV VLRLFELGVP FAQGTENQRW TFKPTHQE     358

SEQ ID NO: 9                moltype = AA   length = 122
FEATURE                     Location/Qualifiers
source                      1..122
                            mol_type = protein
                            organism = Chlamydomonas eugametos
SEQUENCE: 9
MSLFAKLGGR EAVEAAVDKF YNKIVADPTV STYFSNTDMK VQRSKQFAFL AYALGGASEW    60
KGKDMRTAHK DLVPHLSDVH FQAVARHLSD TLTELGVPPE DITDAMAVVA STRTEVLNMP   120
QQ                                                                  122

SEQ ID NO: 10               moltype = AA   length = 121
FEATURE                     Location/Qualifiers
source                      1..121
                            mol_type = protein
                            organism = Tetrahymena pyriformis
SEQUENCE: 10
MNKPQTIYEK LGGENAMKAA VPLFYKKVLA DERVKHFFKN TDMDHQTKQQ TDFLTMLLGG    60
PNHYKGKNMT EAHKGMNLQN LHFDAIIENL AATLKELGVT DAVINEAAKV IEHTRKDMLG   120
K                                                                   121

SEQ ID NO: 11               moltype = AA   length = 117
FEATURE                     Location/Qualifiers
source                      1..117
                            mol_type = protein
                            organism = Paramecium caudatum
SEQUENCE: 11
MSLFEQLGGQ AAVQAVTAQF YANIQADATV ATFFNGIDMP NQTNKTAAFL CAALGGPNAW    60
TGRNLKEVHA NMGVSNAQFT TVIGHLRSAL TGAGVAAALV EQTVAVAETV RGDVVTV      117

SEQ ID NO: 12               moltype = AA   length = 147
FEATURE                     Location/Qualifiers
source                      1..147
                            mol_type = protein
                            organism = Aspergillus niger
SEQUENCE: 12
MPLTPEQIKI IKATVPVLQE YGTKITTAFY MNMSTVHPEL NAVFNTANQV KGHQARALAG    60
ALFAYASHID DLGALGPAVE LICNKHASLY IQADEYKIVG KYLLEAMKEV LGDACTDDIL   120
DAWGAAYWAL ADIMINREAA LYKQSQG                                       147

SEQ ID NO: 13               moltype = AA   length = 165
FEATURE                     Location/Qualifiers
source                      1..165
                            mol_type = protein
                            organism = Zea mays
SEQUENCE: 13
MALAEADDGA VVFGEEQEAL VLKSWAVMKK DAANLGLRFF LKVFEIAPSA EQMFSFLRDS    60
DVPLEKNPKL KTHAMSVFVM TCEAAAQLRK AGKVTVRETT LKRLGATHLR YGVADGHFEV   120
TGFALLETIK EALPADMWSL EMKKAWAEAY SQLVAAIKRE MKPDA                   165

SEQ ID NO: 14               moltype = AA   length = 169
```

```
FEATURE                 Location/Qualifiers
source                  1..169
                        mol_type = protein
                        organism = Oryza sativa subsp.japonica
SEQUENCE: 14
MALVEGNNGV SGGAVSFSEE QEALVLKSWA IMKKDSANIG LRFFLKIFEV APSASQMFSF      60
LRNSDVPLEK NPKLKTHAMS VFVMTCEAAA QLRKAGKVTV RDTTLKRLGA THFKYGVGDA     120
HFEVTRFALL ETIKEAVPVD MWSPAMKSAW SEAYNQLVAA IKQEMKPAE                 169

SEQ ID NO: 15           moltype = AA   length = 160
FEATURE                 Location/Qualifiers
source                  1..160
                        mol_type = protein
                        organism = Arabidopsis thaliana
SEQUENCE: 15
MESEGKIVFT EEQEALVVKS WSVMKKNSAE LGLKLFIKIF EIAPTTKKMF SFLRDSPIPA      60
EQNPKLKPHA MSVFVMCCES AVQLRKTGKV TVRETTLKRL GASHSKYGVV DEHFEVAKYA     120
LLETIKEAVP EMWSPEMKVA WGQAYDHLVA AIKAEMNLSN                           160

SEQ ID NO: 16           moltype = AA   length = 147
FEATURE                 Location/Qualifiers
source                  1..147
                        mol_type = protein
                        organism = Pisum sativum
SEQUENCE: 16
MGFTDKQEAL VNSSWESFKQ NLSGNSILFY TIILEKAPAA KGLFSFLKDT AGVEDSPKLQ      60
AHAEQVFGLV RDSAAQLRTK GEVVLGNATL GAIHVQRGVT DPHFVVVKEA LLQTIKKASG     120
NNWSEELNTA WEVAYDGLAT AIKKAMT                                         147

SEQ ID NO: 17           moltype = AA   length = 145
FEATURE                 Location/Qualifiers
source                  1..145
                        mol_type = protein
                        organism = Vigna unguiculata
SEQUENCE: 17
MVAFSDKQEA LVNGAYEAFK ANIPKYSVVF YTTILEKAPA AKNLFSFLAN GVDATNPKLT      60
GHAEKLFGLV RDSAAQLRAS GGVVADAALG AVHSQKAVND AQFVVVKEAL VKTLKEAVGD     120
KWSDELGTAV ELAYDELAAA IKKAY                                           145

SEQ ID NO: 18           moltype = AA   length = 154
FEATURE                 Location/Qualifiers
source                  1..154
                        mol_type = protein
                        organism = Bos taurus
SEQUENCE: 18
MGLSDGEWQL VLNAWGKVEA DVAGHGQEVL IRLFTGHPET LEKFDKFKHL KTEAEMKASE      60
DLKKHGNTVL TALGGILKKK GHHEAEVKHL AESHANKHKI PVKYLEFISD AIIHVLHAKH     120
PSDFGADAQA AMSKALELFR NDMAAQYKVL GFHG                                 154

SEQ ID NO: 19           moltype = AA   length = 154
FEATURE                 Location/Qualifiers
source                  1..154
                        mol_type = protein
                        organism = Sus scrofa
SEQUENCE: 19
MGLSDGEWQL VLNVWGKVEA DVAGHGQEVL IRLFKGHPET LEKFDKFKHL KSEDEMKASE      60
DLKKHGNTVL TALGGILKKK GHHEAELTPL AQSHATKHKI PVKYLEFISE AIIQVLQSKH     120
PGDFGADAQG AMSKALELFR NDMAAKYKEL GFQG                                 154

SEQ ID NO: 20           moltype = AA   length = 154
FEATURE                 Location/Qualifiers
source                  1..154
                        mol_type = protein
                        organism = Equus caballus
SEQUENCE: 20
MGLSDGEWQQ VLNVWGKVEA DIAGHGQEVL IRLFTGHPET LEKFDKFKHL KTEAEMKASE      60
DLKKHGTVVL TALGGILKKK GHHEAELKPL AQSHATKHKI PIKYLEFISD AIIHVLHSKH     120
PGDFGADAQG AMTKALELFR NDIAAKYKEL GFQG                                 154

SEQ ID NO: 21           moltype = AA   length = 152
FEATURE                 Location/Qualifiers
source                  1..152
                        mol_type = protein
                        organism = Nicotiana benthamiana
SEQUENCE: 21
MSSFTEEQEA LVVKSWDSMK KNAGEWGLKL FLKIFEIAPS AKKLFSFLKD SNVPLEQNAK      60
LKPHSKSVFV MTCEAAVQLR KAGKVVVRDS TLKKLGATHF KYGVADEHFE VTKFALLETI     120
KEAVPEMWSV DMKNAWGEAF DQLVNAIKTE MK                                   152
```

```
SEQ ID NO: 22            moltype = AA  length = 132
FEATURE                  Location/Qualifiers
source                   1..132
                         mol_type = protein
                         organism = Bacillus subtilis
SEQUENCE: 22
MGQSFNAPYE AIGEELLSQL VDTFYERVAS HPLLKPIFPS DLTETARKQK QFLTQYLGGP   60
PLYTEEHGHP MLRARHLPFP ITNERADAWL SCMKDAMDHV GLEGEIREFL FGRLELTARH  120
MVNQTEAEDR SS                                                     132

SEQ ID NO: 23            moltype = AA  length = 131
FEATURE                  Location/Qualifiers
source                   1..131
                         mol_type = protein
                         organism = Corynebacterium glutamicum
SEQUENCE: 23
MTTSENFYDS VGGEETFSLI VHRFYEQVPN DDILGPMYPP DDFEGAEQRL KMFLSQYWGG   60
PKDYQEQRGH PRLRMRHVNY PIGVTAAERW LQLMSNALDG VDLTAEQREA IWEHMVRAAD  120
MLINSNPDPH A                                                      131

SEQ ID NO: 24            moltype = AA  length = 124
FEATURE                  Location/Qualifiers
source                   1..124
                         mol_type = protein
                         organism = Synechocystis sp.
SEQUENCE: 24
MSTLYEKLGG TTAVDLAVDK FYERVLQDDR IKHFFADVDM AKQRAHQKAF LTYAFGGTDK   60
YDGRYMREAH KELVENHGLN GEHFDAVAED LLATLKEMGV PEDLIAEVAA VAGAPAHKRD  120
VLNQ                                                              124

SEQ ID NO: 25            moltype = AA  length = 183
FEATURE                  Location/Qualifiers
source                   1..183
                         mol_type = protein
                         organism = Synechococcus sp.
SEQUENCE: 25
MDVALLEKSF EQISPRAIEF SASFYQNLFH HHPELKPLFA ETSQTIQEKK LIFSLAAIIE   60
NLRNPDILQP ALKSLGARHA EVGTIKSHYP LVGQALIETF AEYLAADWTE QLATAWVEAY  120
DVIASTMIEG ADNPAAYLEP ELTFYEWLDL YGEESPKVRN AIATLTHFHY GEDPQDVQRD  180
SRG                                                               183

SEQ ID NO: 26            moltype = AA  length = 118
FEATURE                  Location/Qualifiers
source                   1..118
                         mol_type = protein
                         organism = Nostoc commune
SEQUENCE: 26
MSTLYDNIGG QPAIEQVVDE LHKRIATDSL LAPVFAGTDM VKQRNHLVAF LAQIFEGPKQ   60
YGGRPMDKTH AGLNLQQPHF DAIAKHLGER MAVRGVSAEN TKAALDRVTN MKGAILNK    118

SEQ ID NO: 27            moltype = AA  length = 136
FEATURE                  Location/Qualifiers
source                   1..136
                         mol_type = protein
                         organism = Bacillus megaterium
SEQUENCE: 27
MREKIHSPYE LLGGEHTISK LVDAFYTRVG QHPELAPIFP DNLTETARKQ KQFLTQYLGG   60
PSLYTEEHGH PMLRARHLPF EITPSRAKAW LTCMHEAMDE INLEGPERDE LYHRLILTAQ  120
HMINSPEQTD EKGFSH                                                 136
```